United States Patent
Jones et al.

(10) Patent No.: US 11,988,784 B2
(45) Date of Patent: May 21, 2024

(54) DETECTING AN AUDIO SIGNAL WITH A MICROPHONE TO DETERMINE PRESENCE OF A PLAYBACK DEVICE

(71) Applicant: Sonos, Inc., Santa Barbara, CA (US)

(72) Inventors: Daniel Jones, London (GB); Richard Bannon, Seattle, WA (US); Jake Harwood, Seattle, WA (US); Jonathan Herbst, Seattle, WA (US); Henry Sia, Seattle, WA (US)

(73) Assignee: Sonos, Inc., Santa Barbara, CA (US)

( * ) Notice: Subject to any disclaimer, the term of this patent is extended or adjusted under 35 U.S.C. 154(b) by 233 days.

(21) Appl. No.: 17/460,708

(22) Filed: Aug. 30, 2021

(65) Prior Publication Data
US 2022/0066008 A1 Mar. 3, 2022

Related U.S. Application Data

(60) Provisional application No. 63/072,888, filed on Aug. 31, 2020.

(51) Int. Cl.
*G01S 7/539* (2006.01)
*G01S 7/527* (2006.01)
(Continued)

(52) U.S. Cl.
CPC .............. *G01S 7/539* (2013.01); *G01S 7/527* (2013.01); *G06F 3/165* (2013.01); *G10L 19/008* (2013.01); *H04R 2430/01* (2013.01)

(58) Field of Classification Search
CPC ..... H04R 2420/07; G06F 3/165; G06F 3/162; G06F 3/16; G06F 1/3287; G06F 1/3206
(Continued)

(56) References Cited

U.S. PATENT DOCUMENTS 4,045,616 A   8/1977   Sloane
4,048,074 A   9/1977   Bruenemann et al.
(Continued)

FOREIGN PATENT DOCUMENTS

CN   105790852 A   7/2016
CN   106921650 A   7/2017
(Continued)

OTHER PUBLICATIONS

Non-Final Office Action dated Sep. 7, 2021, issued in connection with U.S. Appl. No. 16/623,160, filed Dec. 16, 2019, 11 pages.
(Continued)

*Primary Examiner* — Alexander Krzystan
(74) *Attorney, Agent, or Firm* — Fortem IP LLP

(57) ABSTRACT

An example involves detecting, during a time period by a receiving device, an audio signal comprising a superposition of a plurality of audio signals transmitted by a plurality of respective playback devices. The example further comprises determining a time-frequency representation of the audio signal and obtaining data associating playback devices with respective reference audio signals, each reference audio signal having a predefined time-frequency representation. The example further comprises, based on the time-frequency representation of the audio signal and the data, determining that the audio signal comprises a superposition of a first audio signal transmitted by a first playback device and a second audio signal transmitted by a second playback device.

20 Claims, 31 Drawing Sheets

(51) Int. Cl.
*G06F 3/16* (2006.01)
*G10L 19/008* (2013.01)

(58) Field of Classification Search
USPC .......................................................... 700/94
See application file for complete search history.

(56) References Cited

U.S. PATENT DOCUMENTS

| | | | |
|---|---|---|---|
| 4,101,885 A | 7/1978 | Blum | |
| 6,133,849 A | 10/2000 | McConnell et al. | |
| 6,163,803 A | 12/2000 | Watanabe | |
| 6,532,477 B1 | 3/2003 | Tang et al. | |
| 6,711,538 B1 | 3/2004 | Omori et al. | |
| 6,766,300 B1 | 7/2004 | Laroche | |
| 6,909,999 B2 | 6/2005 | Thomas et al. | |
| 6,996,532 B2 | 2/2006 | Thomas | |
| 7,058,726 B1 | 6/2006 | Osaku et al. | |
| 7,349,668 B2 | 3/2008 | Ilan et al. | |
| 7,379,901 B1 | 5/2008 | Philyaw | |
| 7,403,743 B2 | 7/2008 | Welch | |
| 7,944,847 B2 | 5/2011 | Trine et al. | |
| 8,494,176 B2 | 7/2013 | Suzuki et al. | |
| 8,594,340 B2 | 11/2013 | Takara et al. | |
| 9,118,401 B1 | 8/2015 | Nieto et al. | |
| 9,137,243 B2 | 9/2015 | Suzuki et al. | |
| 9,270,811 B1 | 2/2016 | Atlas | |
| 9,344,802 B2 | 5/2016 | Suzuki et al. | |
| 10,090,003 B2 | 10/2018 | Wang | |
| 10,186,251 B1 | 1/2019 | Mohammadi | |
| 11,205,437 B1* | 12/2021 | Zhang | G10L 21/0232 |
| 2002/0107596 A1 | 8/2002 | Thomas et al. | |
| 2002/0152388 A1 | 10/2002 | Linnartz et al. | |
| 2002/0184010 A1 | 12/2002 | Eriksson et al. | |
| 2003/0065918 A1 | 4/2003 | Willey | |
| 2003/0195745 A1 | 10/2003 | Zinser, Jr. et al. | |
| 2003/0212549 A1 | 11/2003 | Steentra et al. | |
| 2004/0002858 A1 | 1/2004 | Attias et al. | |
| 2004/0081078 A1 | 4/2004 | McKnight et al. | |
| 2004/0133789 A1 | 7/2004 | Gantman et al. | |
| 2004/0148166 A1 | 7/2004 | Zheng | |
| 2004/0264713 A1 | 12/2004 | Grzesek | |
| 2005/0049732 A1 | 3/2005 | Kanevsky et al. | |
| 2005/0086602 A1 | 4/2005 | Philyaw et al. | |
| 2005/0219068 A1 | 10/2005 | Jones et al. | |
| 2006/0167841 A1 | 7/2006 | Allan et al. | |
| 2006/0253209 A1 | 11/2006 | Hiersbach et al. | |
| 2006/0287004 A1 | 12/2006 | Fuqua | |
| 2007/0063027 A1 | 3/2007 | Belfer et al. | |
| 2007/0121918 A1 | 5/2007 | Tischer | |
| 2007/0144235 A1 | 6/2007 | Werner et al. | |
| 2007/0174052 A1 | 7/2007 | Manjunath et al. | |
| 2007/0192672 A1 | 8/2007 | Bodin et al. | |
| 2007/0192675 A1 | 8/2007 | Bodin et al. | |
| 2007/0232257 A1 | 10/2007 | Otani et al. | |
| 2008/0002882 A1 | 1/2008 | Voloshynovskyy et al. | |
| 2008/0011825 A1 | 1/2008 | Giordano et al. | |
| 2008/0027722 A1 | 1/2008 | Haulick et al. | |
| 2008/0031315 A1 | 2/2008 | Ramirez et al. | |
| 2008/0059157 A1 | 3/2008 | Fukuda et al. | |
| 2008/0112885 A1 | 5/2008 | Okunev et al. | |
| 2008/0232603 A1 | 9/2008 | Soulodre | |
| 2008/0242357 A1 | 10/2008 | White | |
| 2008/0262928 A1 | 10/2008 | Michaelis | |
| 2009/0119110 A1 | 5/2009 | Oh et al. | |
| 2009/0141890 A1 | 6/2009 | Steenstra et al. | |
| 2009/0254485 A1 | 10/2009 | Baentsch et al. | |
| 2010/0030838 A1 | 2/2010 | Atsmon et al. | |
| 2010/0064132 A1 | 3/2010 | Ravikiran Sureshbabu | |
| 2010/0088390 A1 | 4/2010 | Bai et al. | |
| 2010/0134278 A1 | 6/2010 | Srinivasan et al. | |
| 2010/0146115 A1 | 6/2010 | Bezos | |
| 2010/0223138 A1 | 9/2010 | Dragt | |
| 2010/0267340 A1 | 10/2010 | Lee | |
| 2010/0290641 A1 | 11/2010 | Steele | |
| 2011/0173208 A1 | 7/2011 | Vogel | |
| 2011/0276333 A1 | 11/2011 | Wang et al. | |
| 2011/0277023 A1 | 11/2011 | Meylemans et al. | |
| 2012/0084131 A1 | 4/2012 | Bergel et al. | |
| 2012/0214416 A1 | 8/2012 | Kent et al. | |
| 2012/0214544 A1 | 8/2012 | Shivappa et al. | |
| 2013/0010979 A1 | 1/2013 | Takara et al. | |
| 2013/0030800 A1 | 1/2013 | Tracey et al. | |
| 2013/0034243 A1 | 2/2013 | Yermeche et al. | |
| 2013/0077798 A1 | 3/2013 | Otani et al. | |
| 2013/0216058 A1 | 8/2013 | Furuta et al. | |
| 2013/0223279 A1 | 8/2013 | Tinnakornsrisuphap et al. | |
| 2013/0275126 A1 | 10/2013 | Lee | |
| 2014/0028818 A1 | 1/2014 | Brockway, III et al. | |
| 2014/0046464 A1 | 2/2014 | Reimann | |
| 2014/0053281 A1 | 2/2014 | Benoit et al. | |
| 2014/0074469 A1 | 3/2014 | Zhidkov | |
| 2014/0142958 A1 | 5/2014 | Sharma et al. | |
| 2014/0164629 A1 | 6/2014 | Barth et al. | |
| 2014/0172141 A1 | 6/2014 | Mangold | |
| 2014/0172429 A1 | 6/2014 | Butcher et al. | |
| 2014/0258110 A1 | 9/2014 | Davis et al. | |
| 2015/0004935 A1 | 1/2015 | Fu | |
| 2015/0088495 A1 | 3/2015 | Jeong et al. | |
| 2015/0141005 A1 | 5/2015 | Suryavanshi et al. | |
| 2015/0215299 A1 | 7/2015 | Burch et al. | |
| 2015/0349841 A1 | 12/2015 | Mani et al. | |
| 2015/0371529 A1 | 12/2015 | Dolecki et al. | |
| 2015/0382198 A1 | 12/2015 | Kashef et al. | |
| 2016/0098989 A1 | 4/2016 | Ayton et al. | |
| 2016/0291141 A1* | 10/2016 | Han | G01S 5/18 |
| 2017/0279542 A1 | 9/2017 | Knauer et al. | |
| 2018/0106897 A1 | 4/2018 | Shouldice et al. | |
| 2018/0115844 A1 | 4/2018 | Lu et al. | |
| 2020/0029167 A1* | 1/2020 | Bostick | H04R 1/1083 |
| 2020/0105128 A1 | 4/2020 | Frank | |
| 2020/0169327 A1 | 5/2020 | Lin et al. | |
| 2020/0301651 A1* | 9/2020 | Georganti | G06F 3/165 |
| 2021/0029452 A1* | 1/2021 | Tsoi | H04L 65/1083 |
| 2021/0098008 A1 | 4/2021 | Nesfield et al. | |
| 2022/0059123 A1* | 2/2022 | Sheaffer | G10L 25/78 |
| 2022/0322010 A1* | 10/2022 | Seefeldt | H04R 29/001 |

FOREIGN PATENT DOCUMENTS

| | | |
|---|---|---|
| EP | 1760693 A1 | 3/2007 |
| EP | 2334111 A1 | 6/2011 |
| EP | 2916554 A1 | 9/2015 |
| EP | 3275117 A1 | 1/2018 |
| EP | 3526912 A1 | 8/2019 |
| GB | 2369995 A | 6/2002 |
| JP | H1078928 A | 3/1998 |
| JP | 2001320337 A | 11/2001 |
| JP | 2004512765 A | 4/2004 |
| JP | 2004139525 A | 5/2004 |
| JP | 2007121626 A | 5/2007 |
| JP | 2007195105 A | 8/2007 |
| JP | 2008219909 A | 9/2008 |
| WO | 0115021 A2 | 3/2001 |
| WO | 0150665 A1 | 7/2001 |
| WO | 0161987 A2 | 8/2001 |
| WO | 0163397 A1 | 8/2001 |
| WO | 0211123 A2 | 2/2002 |
| WO | 0235747 A2 | 5/2002 |
| WO | 2004002103 A1 | 12/2003 |
| WO | 2005006566 A2 | 1/2005 |
| WO | 2008131181 A2 | 10/2008 |
| WO | 2016094687 A1 | 6/2016 |

OTHER PUBLICATIONS

Notice of Allowance dated Mar. 15, 2018, issued in connection with U.S. Appl. No. 12/926,470, filed Nov. 19, 2010, 10 pages.
Notice of Allowance dated Mar. 19, 2021, issued in connection with U.S. Appl. No. 16/012,167, filed Jun. 19, 2018, 9 pages.
Soriente et al., "HAPADEP: Human-Assisted Pure Audio Device Pairing*" Computer Science Department, University of California Irvine, 12 pages. [Retrieved Online] URLhttps://www.researchgate.

(56) References Cited

OTHER PUBLICATIONS net/publication/220905534_HAPADEP_Human-assisted_pure_audio_device_pairing.

Tarr, E.W. "Processing perceptually important temporal and spectral characteristics of speech", 2013, Available from ProQuest Dissertations and Theses Professional. Retrieved from https://dialog.proquest.com/professional/docview/1647737151?accountid=131444, 200 pages.

United Kingdom Patent Office, United Kingdom Examination Report dated Oct. 8, 2021, issued in connection with United Kingdom Application No. GB2113511.6, 7 pages.

United Kingdom Patent Office, United Kingdom Examination Report dated Jun. 11, 2021, issued in connection with United Kingdom Application No. GB1716909.5, 5 pages.

United Kingdom Patent Office, United Kingdom Examination Report dated Feb. 2, 2021, issued in connection with United Kingdom Application No. GB1715134.1, 5 pages.

United Kingdom Patent Office, United Kingdom Examination Report dated Oct. 29, 2021, issued in connection with United Kingdom Application No. GB1709583.7, 3 pages.

United Kingdom Patent Office, United Kingdom Office Action dated Jan. 22, 2021, issued in connection with United Kingdom Application No. GB1906696.8, 2 pages.

United Kingdom Patent Office, United Kingdom Search Report dated Sep. 22, 2021, issued in connection with United Kingdom Application No. GB2109212.7, 5 pages.

Wang, Avery Li-Chun. An Industrial-Strength Audio Search Algorithm. Oct. 27, 2003, 7 pages. [online]. [retrieved on May 12, 2020] Retrieved from the Internet URL: https://www.researchgate.net/publication/220723446_An_Industrial_Strength_Audio_Search_Algorithm.

Bourguet et al. "A Robust Audio Feature Extraction Algorithm for Music Identification," AES Convention 129; Nov. 4, 2010, 7 pages.

C. Beaugeant and H. Taddei, "Quality and computation load reduction achieved by applying smart transcoding between CELP speech codecs," 2007, 2007 15th European Signal Processing Conference, pp. 1372-1376.

European Patent Office, Decision to Refuse dated Nov. 13, 2019, issued in connection with European Patent Application No. 11773522.5, 52 pages.

European Patent Office, European EPC Article 94.3 mailed on Oct. 8, 2021, issued in connection with uropean Application No. 17790809.2, 9 pages.

European Patent Office, European EPC Article 94.3 mailed on Dec. 10, 2021, issued in connection with European Application No. 18845403.7, 41 pages.

European Patent Office, European EPC Article 94.3 mailed on Oct. 12, 2021, issued in connection with European Application No. 17795004.5, 8 pages.

European Patent Office, European EPC Article 94.3 mailed on Oct. 28, 2021, issued in connection with uropean Application No. 18752180.2, 7 pages.

European Patent Office, European Extended Search Report dated Aug. 31, 2020, issued in connection with European Application No. 20153173.8, 8 pages.

European Patent Office, Summons to Attend Oral Proceedings mailed on Mar. 15, 2019, issued in connection with European Application No. 11773522.5-1217, 10 pages.

Final Office Action dated Oct. 16, 2014, issued in connection with U.S. Appl. No. 12/926,470, filed Nov. 19, 2010, 22 pages.

Final Office Action dated Aug. 17, 2017, issued in connection with U.S. Appl. No. 12/926,470, filed Nov. 19, 2010, 22 pages.

Final Office Action dated Nov. 30, 2015, issued in connection with U.S. Appl. No. 12/926,470, filed Nov. 19, 2010, 25 pages.

Final Office Action dated on Apr. 20, 2020, issued in connection with U.S. Appl. No. 16/012,167, filed Jun. 19, 2018, 21 pages.

Gerasimov et al. "Things That Talk: Using sound for device-to-device and device-to-human communication", Feb. 2000 IBM Systems Journal 39(3.4):530—546, 18 pages. [Retrieved Online] URlhttps://www.researchgate.net/publication/224101904_Things_that_talk_Using_sound_for_device-to-device_and_device-to-human_communication.

Glover et al. "Real-time detection of musical onsets with linear prediction and sinusoidal modeling.", 2011 EURASIP Journal on Advances in Signal Processing 2011, 68, Retrieved from the Internet URL: https://doi.org/10.1186/1687-6180-2011-68, Sep. 20, 2011, 13 pages.

Gomez et al: "Distant talking robust speech recognition using late reflection components of room impulse response", Acoustics, Speech and Signal Processing, 2008. ICASSP 2008. IEEE International Conference On, IEEE, Piscataway, NJ, USA, Mar. 31, 2008, XP031251618, ISBN: 978-1-4244-1483-3, pp. 4581-4584.

Gomez et al., "Robust Speech Recognition in Reverberant Environment by Optimizing Multi-band Spectral Subtraction", 2013 IEEE International Conference on Acoustics, Speech and Signal Processing ICASSP, Jan. 1, 2008, 6 pages.

Goodrich et al., Using Audio inn Secure Device Pairing, International Journal of Security and Networks, vol. 4, No. 1.2, Jan. 1, 2009, p. 57, Inderscience Enterprises Ltd., 12 pages.

International Bureau, International Preliminary Report on Patentability and Written Opinion, dated Apr. 16, 2019, issued in connection with International Application No. PCT/GB2017/053112, filed on Oct. 13, 2017, 12 pages.

International Bureau, International Preliminary Report on Patentability and Written Opinion, dated Apr. 16, 2019, issued in connection with International Application No. PCT/GB2017/053113, filed on Oct. 13, 2017, 8 pages.

International Bureau, International Preliminary Report on Patentability and Written Opinion, dated Dec. 17, 2019, issued in connection with International Application No. PCT/GB2018/051645, filed on Jun. 14, 2018, 7 pages.

International Bureau, International Preliminary Report on Patentability and Written Opinion, dated Mar. 19, 2019, issued in connection with International Application No. PCT/GB2017/052787, filed on Sep. 19, 2017, 7 pages.

International Bureau, International Preliminary Report on Patentability and Written Opinion, dated Jun. 23, 2020, issued in connection with International Application No. PCT/GB2018/053733, filed on Dec. 20, 2018, 7 pages.

International Bureau, International Preliminary Report on Patentability and Written Opinion, dated Sep. 24, 2019, issued in connection with International Application No. PCT/GB2018/050779, filed on Mar. 23, 2018, 6 pages.

International Bureau, International Search Report and Written Opinion dated Apr. 11, 2019, issued in connection with International Application No. PCT/GB2018/053733, filed on Dec. 20, 2018, 10 pages.

International Bureau, International Search Report and Written Opinion dated Oct. 4, 2018, issued in connection with International Application No. PCT/GB2018/051645, filed on Jun. 14, 2018, 14 pages.

International Searching Authority, International Search Report and Written Opinion dated Mar. 13, 2018, issued in connection with International Application No. PCT/GB2017/053112, filed on Oct. 13, 2017, 18 pages.

International Searching Authority, International Search Report and Written Opinion dated Nov. 29, 2017, in connection with International Application No. PCT/GB2017/052787, 10 pages.

International Searching Authority, International Search Report and Written Opinion dated Nov. 30, 2011, in connection with International Application No. PCT/GB2011/051862, 6 pages.

International Searching Authority, International Search Report dated Jan. 18, 2018, issued in connection with International Application No. PCT/GB2017/053113, filed on Oct. 17, 2017, 11 pages.

International Searching Authority, International Search Report dated Jun. 19, 2018, issued in connection with International Application No. PCT/GB2018/050779, filed on Mar. 23, 2018, 8 pages.

Japanese Patent Office, Office Action dated Jun. 23, 2015, issued in connection with JP Application No. 2013-530801, 8 pages.

Japanese Patent Office, Office Action dated Apr. 4, 2017, issued in connection with JP Application No. 2013-530801, 8 pages.

(56) References Cited

OTHER PUBLICATIONS

Japanese Patent Office, Office Action dated Jul. 5, 2016, issued in connection with JP Application No. 2013-530801, 8 pages.
Lopes et al. "Acoustic Modems for Ubiquitous Computing", IEEE Pervasive Computing, Mobile and Ubiquitous Systems. vol. 2, No. 3 Jul.-Sep. 2003, pp. 62-71. [Retrieved Online] URL https://www.researchgate.net/publication/3436996_Acoustic_modems_for_ubiquitous_computing.
Madhavapeddy, Anil. Audio Networking for Ubiquitous Computing, Oct. 24, 2003, 11 pages.
Madhavapeddy et al., Audio Networking: The Forgotten Wireless Technology, IEEE Cs and IEEE ComSoc, Pervasive Computing, Jul.-Sep. 2005, pp. 55-60.
Madhavapeddy et al., Context-Aware Computing with Sound, University of Cambridge 2003, pp. 315-332.
Monaghan et al. "A method to enhance the use of interaural time differences for cochlear implants in reverberant environments.", published Aug. 17, 2016, Journal of the Acoustical Society of America, 140, pp. 1116-1129. Retrieved from the Internet URL: https://asa.scitation.org/doi/10.1121/1.4960572 Year: 2016, 15 pages.
Non-Final Office Action dated Mar. 25, 2015, issued in connection with U.S. Appl. No. 12/926,470, filed Nov. 19, 2010, 24 pages.
Non-Final Office Action dated Mar. 28, 2016, issued in connection with U.S. Appl. No. 12/926,470, filed Nov. 19, 2010, 26 pages.
Non-Final Office Action dated Jan. 6, 2017, issued in connection with U.S. Appl. No. 12/926,470, filed Nov. 19, 2010, 22 pages.
Non-Final Office Action dated Aug. 9, 2019, issued in connection with U.S. Appl. No. 16/012,167, filed Jun. 19, 2018, 15 pages.
Non-Final Office Action dated Feb. 5, 2014, issued in connection with U.S. Appl. No. 12/926,470, filed Nov. 19, 2010, 22 pages.
Non-Final Office Action dated Aug. 12, 2021, issued in connection with U.S. Appl. No. 16/342,060, filed Apr. 15, 2019, 88 pages.
Non-Final Office Action dated Oct. 15, 2021, issued in connection with U.S. Appl. No. 16/496,685, filed Sep. 23, 2019, 12 pages.
Non-Final Office Action dated Sep. 24, 2020, issued in connection with U.S. Appl. No. 16/012,167, filed Jun. 19, 2018, 20 pages.
Non-Final Office Action dated Dec. 27, 2021, issued in connection with U.S. Appl. No. 16/956,905, filed Jun. 22, 2020, 12 pages.
Non-Final Office Action dated Jan. 29, 2021, issued in connection with U.S. Appl. No. 16/342,060, filed Apr. 15, 2019, 59 pages.
Non-Final Office Action dated Feb. 5, 2021, issued in connection with U.S. Appl. No. 16/342,078, filed Apr. 15, 2019, 13 pages.
International Search Report and Written Opinion dated Jan. 5, 2022; International Application No. PCT/US2021/048380; 15 pages.

* cited by examiner

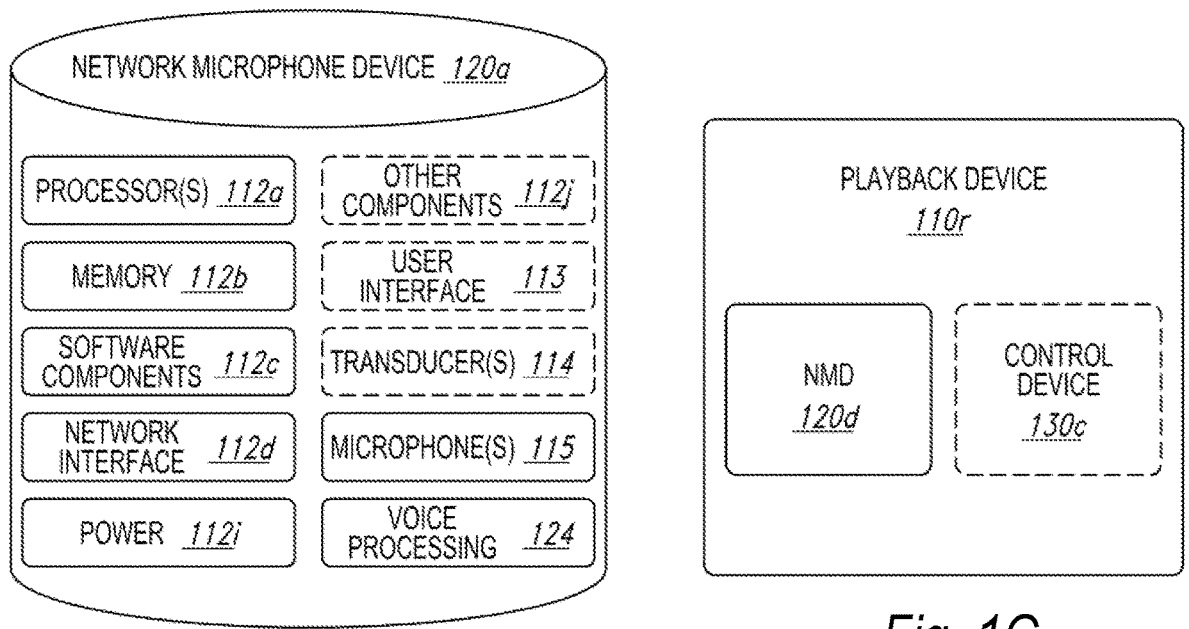
Fig. 1F
Fig. 1G
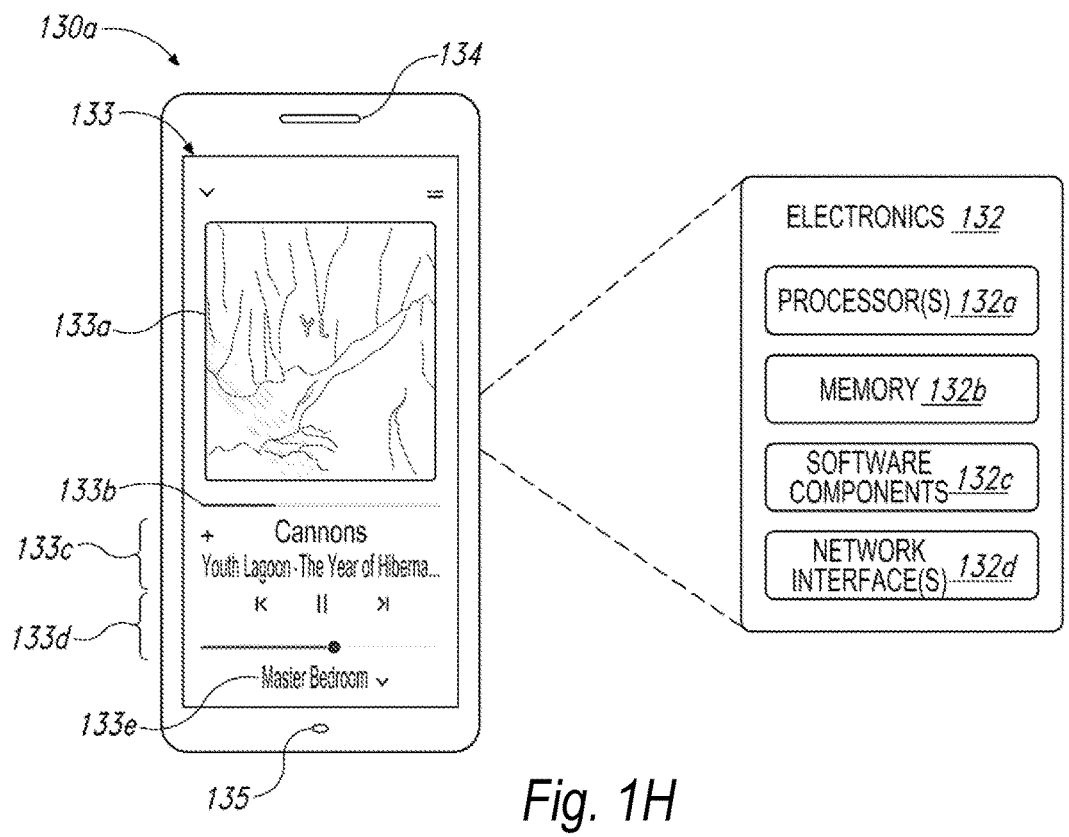
Fig. 1H

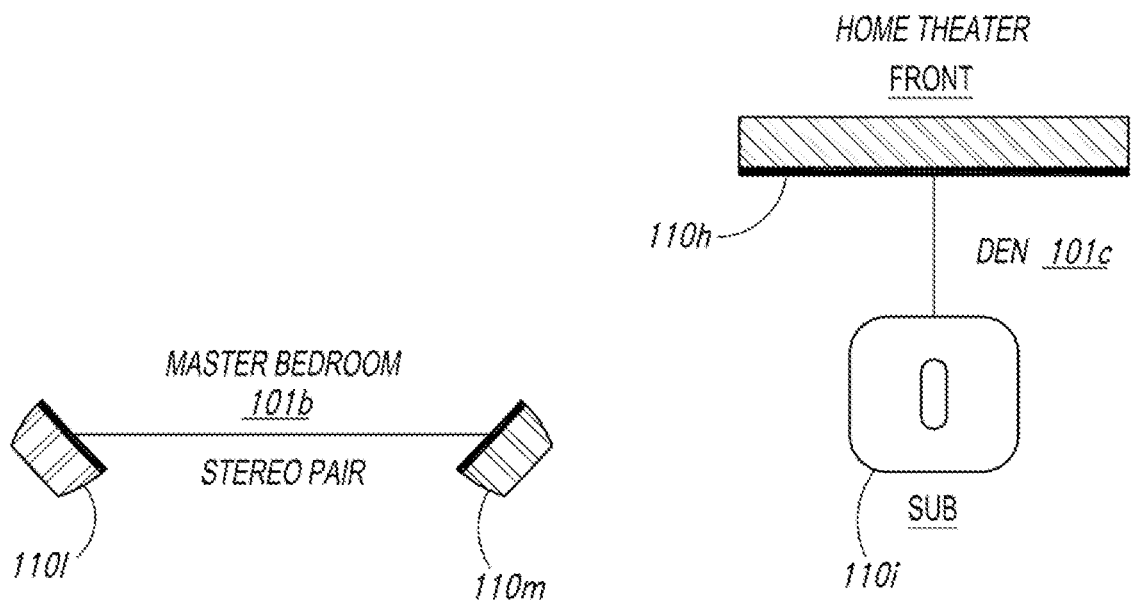
Fig. 1-I
Fig. 1J
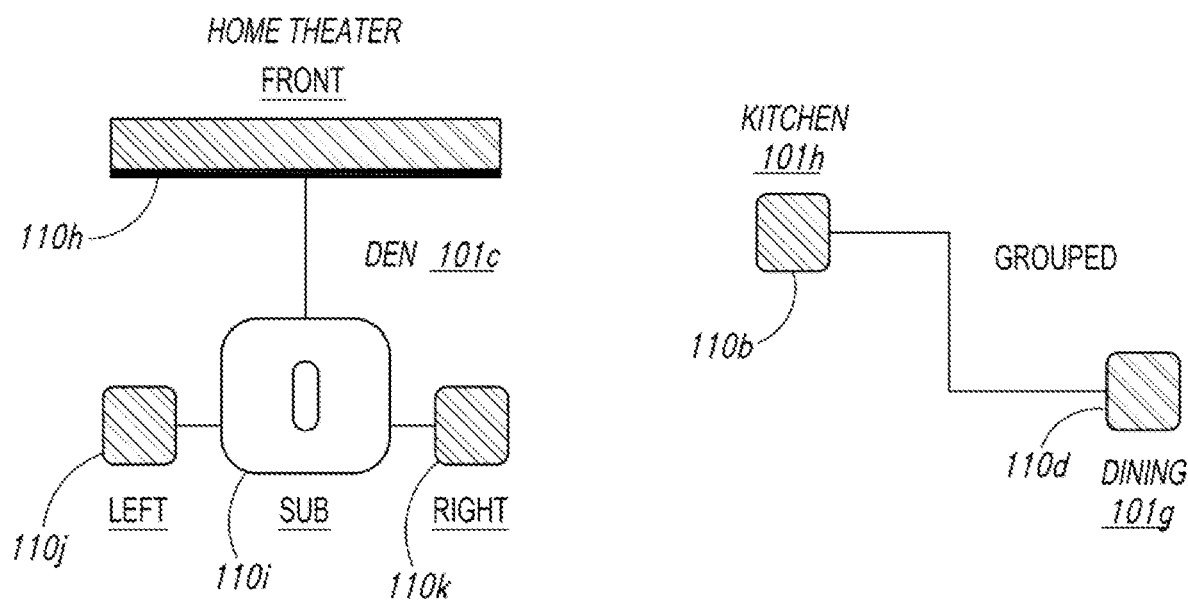
Fig. 1K
Fig. 1L

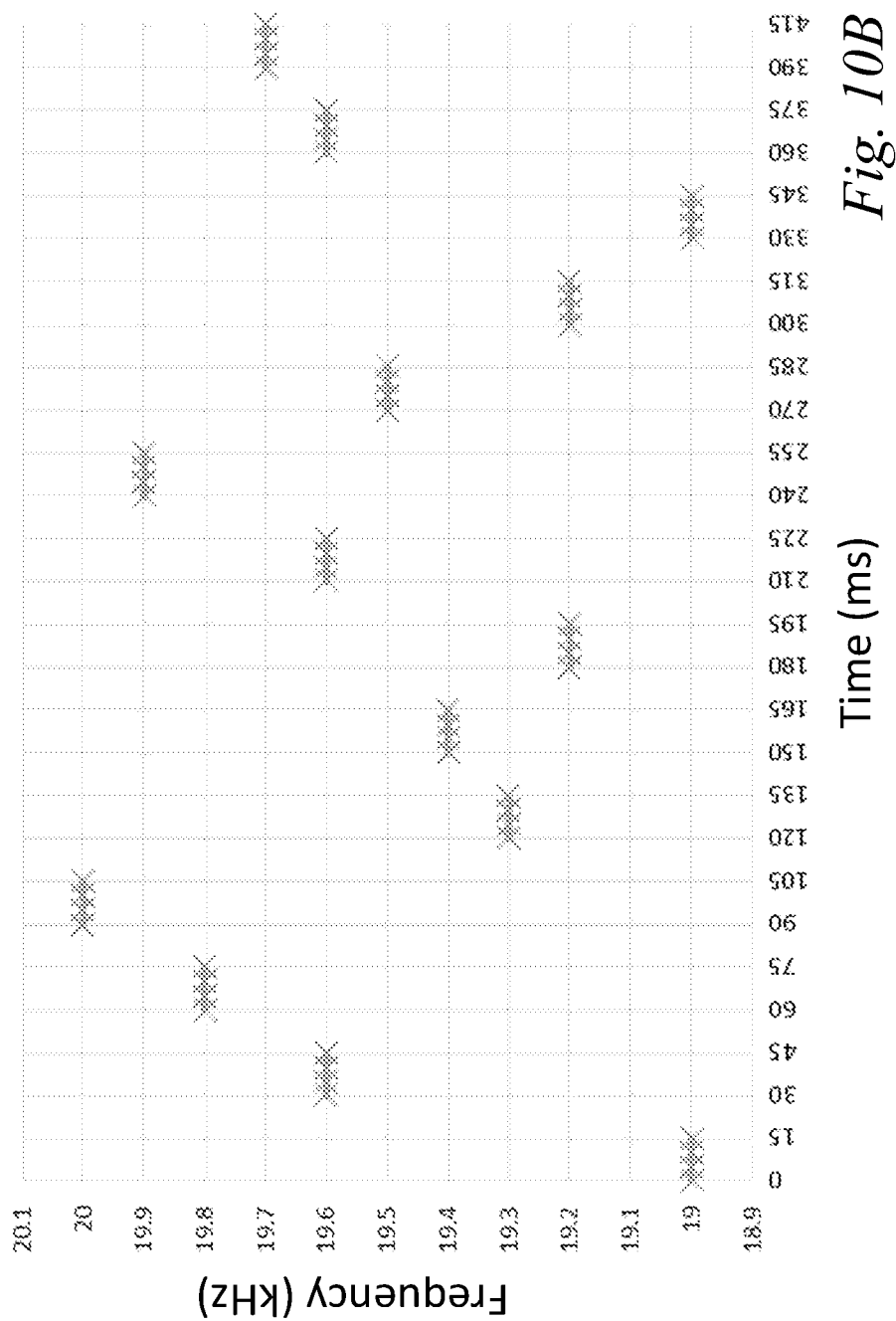

DETECTING AN AUDIO SIGNAL WITH A MICROPHONE TO DETERMINE PRESENCE OF A PLAYBACK DEVICE

CROSS-REFERENCE TO RELATED APPLICATIONS

This application claims the benefit under 35 U.S.C. § 119 of U.S. provisional Patent Application No. 63/072,888, filed on Aug. 31, 2020, entitled "Ultrasonic Transmission for Presence Detection," which is incorporated herein by reference in its entirety.

This application is related to the following applications and the contents of each are incorporated by reference herein in their entirety:

U.S. Application No. 62/811,962 filed on Feb. 28, 2019, entitled "Playback Transitions";

U.S. application Ser. No. 16/805,130 filed on Feb. 28, 2020, entitled "Playback Transitions"; and U.S. application Ser. No. 16/805,182 filed on Feb. 28, 2020, entitled "Playback Transitions".

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIGS. 1-I through 1L are schematic diagrams of corresponding media playback system zones.

FIG. 10B is an example time-frequency representation of a second reference audio signal in accordance with aspects of the disclosed technology.

Figure 1A:
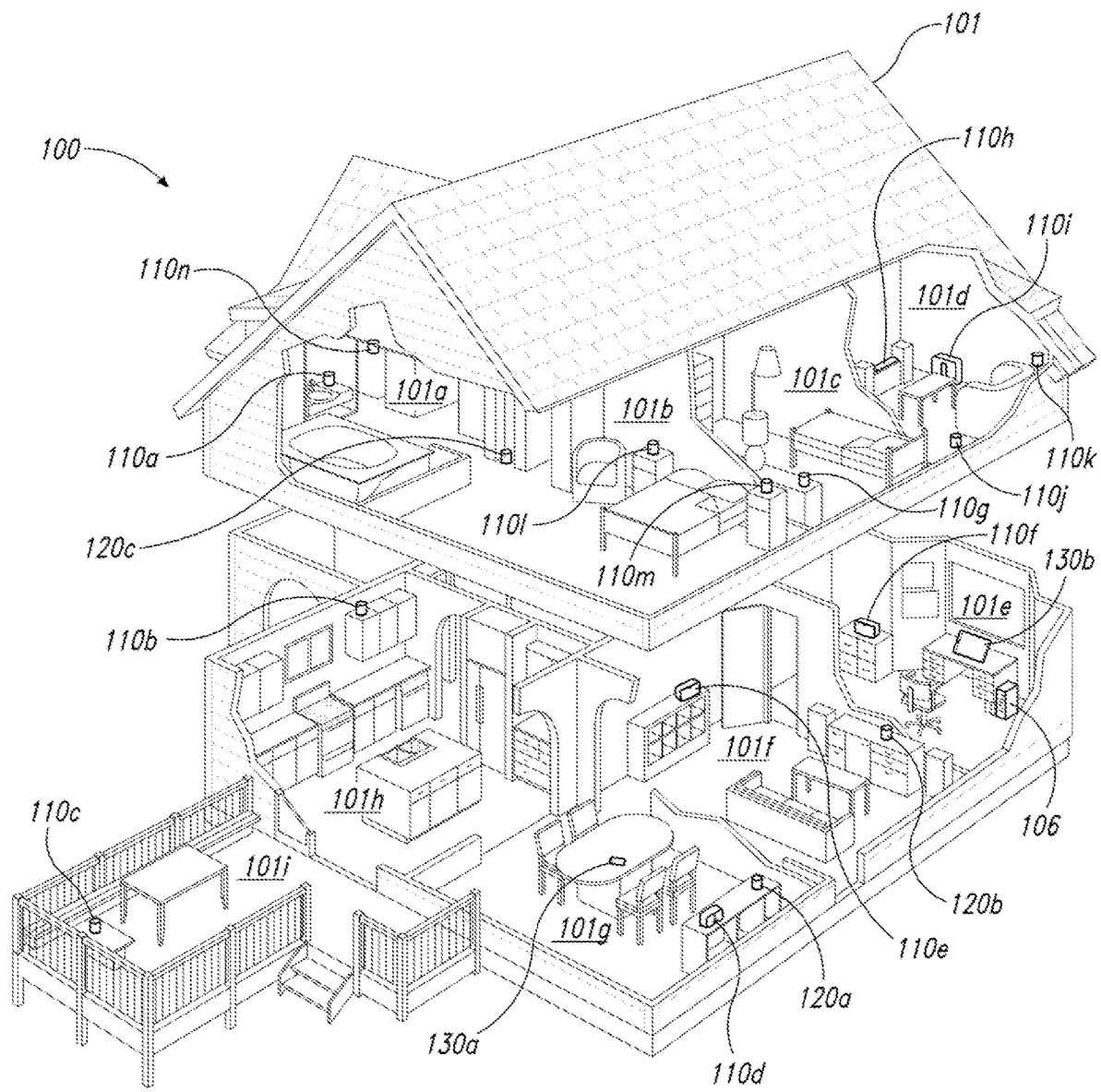
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to the reception of audio signals (by a receiving device) that have been transmitted/output by one or more playback devices for presence detection of nearby playback devices. The audio signals are unique to each playback device within a playback system and, as such, can be analyzed to identify the one or more playback devices and subsequently determine which playback device is nearest to the receiving device. In some examples, this allows the transfer of a playback session between the receiving device and the nearest playback device.

In a first example, audio is currently playing on a portable playback device (such as a pair of headphones), and the playback session can be transferred to another nearby playback device so that the playback device (additionally or alternatively) plays back the audio. To achieve this, a user provides an input to the portable playback device, which causes one or more playback devices to transmit/output different audio signals. Each audio signal may be unique to the playback device.

One or more of these audio signals are detected by the portable playback device (via a microphone, for example) and the one or more playback devices can be identified based on the detected audio signals. In an example, a portable playback device may detect audio signals from a plurality of playback devices. From the detected audio signals, it can be determined which of the plurality of playback devices is closest (based on the strength of the audio signal, for example). Once the nearest playback device has been determined, the playback session can be transferred from the portable playback device to this nearest playback device. In this example, the portable playback device is a receiving device because it receives and detects the audio signals output by the playback devices.

In a second example, audio is currently playing on several playback devices, and a user wishes to transfer the audio from one of these playback devices (such as the nearest playback device) to a portable playback device (such as a pair of headphones). Thus, the playback session can be transferred from the nearest playback device so that the portable playback device (additionally or alternatively) plays back the audio. To achieve this, a user provides an input to the portable playback device, which causes the playback devices to transmit/output separate audio signals.

One or more of these audio signals are detected by the portable playback device (via a microphone, for example) and the one or more playback devices can be identified based on the detected audio signals. In an example, a portable playback device may detect audio signals from a plurality of playback devices. From here, it can be determined which playback device of the plurality of playback devices is closest (based on the strength of the audio signal, for example). Once the nearest playback device has been determined, the playback session can be transferred from this nearest playback device to the portable playback device. Again, the portable playback device is a receiving device because it receives and detects the audio signals output by the playback devices.

Accordingly, in some examples, a method comprises: detecting, during a time period by a receiving device, an audio signal comprising a superposition of a plurality of audio signals transmitted by a plurality of respective playback devices. The method further comprises determining a time-frequency representation of the audio signal and obtaining data associating playback devices with respective reference audio signals, each reference audio signal having a predefined time-frequency representation. Based on the time-frequency representation of the audio signal and the data, the method further comprises determining that the audio signal comprises a superposition of a first audio signal transmitted by a first playback device and a second audio signal transmitted by a second playback device. Thus, in this example method, it is determined that the audio signal is a superposition of audio signals from two playback devices.

A time-frequency representation indicates how constituent frequencies of an audio signal vary over time. The time-frequency representation is therefore a view of the audio signal represented over both time and frequency. Each playback device is configured to output a reference audio signal which has a unique time-frequency representation. For example, a first playback device may output an audio signal of a first frequency at a first time, and a second frequency at a second time, whereas a second playback device may output an audio signal of a third frequency at the first time and a fourth frequency at the second time. If the receiving device detects the first and third frequencies at the first time and the second and fourth frequencies at the second time, it can determine that the first and second playback devices are "nearby". In contrast, if the receiving device detects only the first frequency at the first time and the second frequency at the second time, it may determine that the first playback device is nearby. The reference audio signals therefore identify the particular playback device and can be extracted from the audio signal detected by the receiving device.

Accordingly, in the method, the receiving device receives an audio signal that is a combination/superposition of a plurality of unique reference audio signals output by two or more playback devices. The audio signals can be analyzed, by the receiving device itself or another device, to determine/extract a time-frequency representation of the detected audio signal. Since the audio signal is a superposition of a plurality of reference audio signals, the time-frequency representation of the audio signal comprises a plurality of reference time-frequency representations. The receiving device, or another device, obtains/retrieves data that associates a plurality of reference audio signals (and therefore a plurality of reference time-frequency representations) with respective playback devices and determines which of these reference time-frequency representations combine to produce the detected time-frequency representation of the audio signal.

In some examples, the method is for a receiving device and the receiving device therefore performs all of these steps. In other examples, some of the method steps may be performed by another device, such as a controller device. This can allow certain steps to be performed by another device that has increased processing capability. In a particular example, the receiving device detects the audio signal and transmits data indicative of the audio signal to another device, such as a controller device associated with the receiving device, which performs the remaining steps of the method set out above.

The data associating the playback devices with respective reference audio signals associates a reference audio signal (i.e. a reference time-frequency representation) with data identifying the playback device, such as a device identifier or a device address (such as an IP address). The data may be obtained from memory, such as a computer-readable medium, which may be non-transitory. The data may be obtained from another device, such as a controller device or other playback device.

The receiving device may be a playback device, such as a portable playback device, a wearable device (such as a pair of headphones or earbuds), a mobile phone, software running on a device or a dedicated controller device (such as a remote).

In some examples, determining a time-frequency representation of the audio signal comprises determining a Fourier transform of at least a portion of the audio signal. A Fourier transform of a time-varying signal (such as the detected audio signal) decomposes the signal into its constituent frequencies. Performing a Fourier transform on a portion of the audio signal (i.e. a portion of the audio signal received over a particular time period) identifies the constituent frequencies within the audio signal during that time period.

In an example, the first playback device outputs an audio signal of a first frequency at a first time, and a second frequency at a second time, whereas a second playback device outputs an audio signal of a third frequency at the first time and a fourth frequency at the second time. Performing a first Fourier transform of the portion of the audio signal audio signal during a first time period would identify that the signal comprises components of the first and third frequencies, and performing a second Fourier transform of the portion of the audio signal detected during a second time period would identify that the signal comprises components of the second and fourth frequencies.

In some examples, based on the time-frequency representation of the audio signal and the data, determining that the audio signal comprises a superposition of a first audio signal transmitted by a first playback device and a second audio signal transmitted by a second playback device comprises comparing the time-frequency representation of the audio signal to the data. For example, each of the reference audio signals (or more accurately, each of the reference time-frequency representations) may be individually compared to the time-frequency representation of the audio signal to determine whether it is present. In some examples, combinations of the reference audio signals are compared to the time-frequency representation of the audio signal to determine whether these combinations are present.

As mentioned above, the reference audio signals (and therefore the time-frequency representations) are unique to each playback device. This ensures that each playback device can be identified. The reference audio signals may be unique to each playback device owned by a user, rather than being globally unique. However, in other examples, the reference audio signals are globally unique. Within a playback system, the reference audio signals may be selected to maximize the likelihood of being able to differentiate between the reference audio signals. The reference audio signals may therefore be selected based on the number of playback devices within a playback system.

In some examples, at least part of the reference audio signals are generated via an algorithm, such as a pseudo-random algorithm. The reference audio signals may be based on Gold codes, Walsh/Hadamard codes, etc. In one example, the reference audio signals are generated using a linear-feedback shift register. In other examples, at least part of the reference audio signals are manually generated. The reference audio signals preferably have low or minimal cross-correlation with others of the reference audio signals. Hamming correlation may be used to compare reference audio signals to determine their similarity or cross-correlation, in certain examples. "Generating" the reference audio signals in this context means predefining the reference audio signal for use by a playback device.

In a particular example, the reference audio signals are generated by a manufacturer of the playback devices. One or more of the reference audio signals may be stored memory of the playback device, either during manufacture or at a later date, such as when the user first uses the playback device.

In some examples, when a user first adds a new playback device to their playback system, the playback device associates itself with a particular reference audio signal. The reference audio signal may be retrieved from memory of the playback device, or may be downloaded from another device, such as a remote server or another device of the playback system. The reference audio signal may be selected or allocated from a plurality of reference audio signals to avoid conflict with reference audio signals associated with other playback devices in the playback system.

In certain examples, the time period over which the receiving device receives/detects the audio signal may be known as a listening window.

The audio signal (which varies over time) may be split into a plurality of portions. In a particular example, determining the time-frequency representation of the audio signal comprises: decomposing a first portion of the audio signal into constituent frequencies, wherein the first portion of the audio signal is received during a first portion of the time period and decomposing a second portion of the audio signal into constituent frequencies, wherein the second portion of the audio signal is received during a second portion of the time period. Accordingly, the audio signal can be separated into a plurality of portions (of a particular time bin), and each portion can be decomposed into constituent frequencies. Accordingly, decomposing a portion of the audio signal into constituent frequencies may comprise performing a Fourier transform on the portion of the audio signal to determine constituent frequencies of the portion of the audio signal.

In some examples, the plurality of portions of the audio signal overlap in time. In other examples the portions are sequential in time. Where the plurality of portions overlap, this includes portions which overlap with some but not all of the other portions, for example they may overlap with an immediately adjacent portion (preceding and/or succeeding).

In some examples, the audio signal is divided into a plurality of portions, each having a length in time of between about 10 ms and about 20 ms, such as about 15 ms. Thus, in the above example, the first and second portions of the time period have a duration of between about 10 ms and about 20 ms, such as about 15 ms. In a particular example, the audio signal is divided into a plurality of portions having a length in time substantially equal to a duration of each tone output by each playback device. For example, each reference audio signal, and therefore each audio signal output by the plurality of playback devices, comprises a plurality of tones, wherein each of the plurality of tones has a predefined frequency, initiation time and duration. The playback device therefore outputs a particular frequency at a first initiation time, which has a particular duration, then outputs a different frequency at a second initiation time, which has a particular duration. Thus, in an example, each tone has a duration of between about 10 ms and about 20 ms, such as about 15 ms.

In another example, the audio signal is divided into a plurality of portions, each having a length in time of between about 30 ms and about 50 ms, such as between about 40 ms and 50 ms, such as about 46 ms. In a particular example, the audio signal is divided into a plurality of portions having a length in time greater than a duration of each tone output by each playback device and less than the time difference between adjacent tone initiation times. For example, each tone has a duration of between about 10 ms and about 20 ms, such as about 15 ms, and the initiation times of adjacent tones are about 50 ms apart (i.e. the interval between the end of a first tone and the start of the next tone may be about 35 ms). In a particular example, the audio signal is divided into a plurality of portions based on a sliding window algorithm. For example, a first portion of the audio signal may be analysed, and then a second portion of the audio signal may be analysed by sliding the analysis "window" by a predetermined time offset, such as less than about 10 ms, or less than about 7 ms, or less than about 5 ms, or about 3 ms. The second portion of the audio signal may therefore correspond to a substantial portion of the first portion. This allows a high level of fidelity, which is particularly useful if the tones within the reference audio signals are short in length (such as less than about 20 ms).

The method may further comprise determining that the audio signal is a superposition of the first audio signal and the second audio signal based on the constituent frequencies and a time at which each constituent frequency is received. The time at which each constituent frequency is received is relative to the time at which the audio signal is first detected and may be known as a detection time.

As mentioned above, it may be useful to determine which of the plurality of playback devices is arranged closest to the receiving device. Accordingly, in some examples, the method further comprises, based on the audio signal, determining a first magnitude associated with the first audio signal and a second magnitude associated with the second audio signal, and determining that the first magnitude is greater than the second magnitude. The method may further comprise determining that the first playback device is arranged closer than the second playback device to the receiving device.

The magnitude of an audio signal may be directly proportional to a sound pressure level (volume/loudness) of the audio signal. Thus, by determining a magnitude associated with each of the component audio signals, it may be assumed that the audio signal with the greatest magnitude is associated with the nearest playback device. This of course is based on various assumptions, such as the audio signals being output by both playback devices at substantially the same sound pressure level. In a particular example, the magnitude of an audio signal is determined via the Fourier transform. The magnitude may be an average magnitude of the audio signal over time. The magnitude may be a magnitude at a particular frequency to account for frequency variations of the magnitude. In a particular example, the magnitude is measured at the peak of the frequency tone to account for ramp up and ramp down in volume during each tone.

As mentioned above, in some examples, it can be useful to determine the nearest/closest playback device so that a playback session can be transitioned between the receiving device and the nearest playback device. This assumes, for example, that the user is situated closest to the playback device that they wish to perform a playback session swap with. Accordingly, in one example, the first playback device (which is determined to be nearest the receiving device) is playing back audio content in a playback session, and the method further comprises transitioning the playback session from the first playback device to the receiving device, such that the receiving device plays back the audio content. The audio content and playback session is therefore "pulled" from the first playback device (or whichever playback device is determined to be nearest) to the receiving device. The transitioning of a playback session may be referred to as a playback session swap because the playback session is swapped between two devices.

In another example, the receiving device is playing back audio content in a playback session, and the method further comprises transitioning the playback session from the receiving device to the first playback device, such that the first playback device plays back the audio content. The audio content and playback session is therefore "pushed" to the first playback device (or whichever device is determined to be nearest).

In some examples, after or during a transition of the playback session, the first playback device (or the receiving device) stops playing back the audio content after the transition. In some examples, the method comprises forming a group with the receiving device and the first playback device and muting the device which is initially playing the audio content in the playback session. After the transition of the playback session (i.e. after the device starts playing back the audio content), the device that is muted is removed from the group.

As briefly mentioned above, each reference audio signal comprises a plurality of tones, wherein each of the plurality of tones has a predefined frequency and initiation time. Thus, each audio signal output by the plurality of playback devices corresponds to a reference audio signal associated with the playback device. The reference audio signals therefore comprise a plurality of tones spaced in time, and each tone begins at a corresponding initiation time. A "tone" may be an audio signal of a particular single frequency, and may be known as a simple or pure tone. The initiation time is the time at which the tone is played back within the reference audio signal and is relative to the start time of the reference signal. As mentioned above, each of the plurality of tones is output by the playback device for a particular duration.

In some examples, the reference audio signal comprises two or more tones per unit of time. For example, a tweeter and woofer of the same playback device may output different tones which may overlap fully or partially in time. In other examples, two or more tones may be output by a same speaker driver or transducer.

In some examples, at least some of the plurality of tones are spaced apart in time by an interval of time. Thus, there may be an interval of time between some or each tone. During the interval, the playback device does not output any sound. This "pause" in audio playback can avoid interference between successive tones, due to reverberation and/or echo from the previously output tone. Accordingly, each playback device outputs one or more tones during a first period of time, pauses for a particular interval of time, then outputs one or more further tones. In other examples, at least some of the tones may be sequential in time.

The interval of time may be same between each tone in the reference audio signal or may be irregular. It has been found that irregular intervals can increase the orthogonality or "uniqueness" of each reference audio signal therefore increasing the likelihood of recognizing a reference audio signal from a detected audio signal that comprises a superposition of many reference audio signals. Thus, in some examples, a first interval of time within the reference audio signal differs to at least another interval of time within the reference audio signal.

In one example, the interval of time is between about 10 ms and 50 ms, such as about 40 ms.

In some examples, the predefined frequencies are selected from a predefined set of frequencies. For example, they may be selected from a set of 5, 10, 15 or 20 different frequencies. Preferably, the number of frequencies within the predefined set of frequencies is a power of 2, to simplify bit slicing. For example, there may be 8, 16 or 32 predefined frequencies within the set of frequencies.

In some examples, the predefined frequencies are selected from a predefined set of frequencies, and wherein a frequency difference between each frequency within the predefined set of frequencies is greater than about 50 Hz. It has been found that a frequency offset of at least 50 Hz between selectable frequencies means that the audio signal is resilient to Doppler shift as the receiving device moves throughout an environment. For example, if the receiving device is a portable playback device, such as a pair of headphones, the user may carry the headphones throughout an environment as the audio signals are being received from nearby playback devices. This motion causes the audio signals to be Doppler shifted, and one or more frequencies within each audio signal may be misinterpreted by the receiving device. For example, if a playback device transmits a tone of 20.000 kHz, and the receiving device is moving at a speed of 0.4 m/s, the tone may be detected to have a frequency of 20.023 kHz (i.e. 20.000 kHz+23 Hz). If the predefined frequency is selected from the following set of frequencies: 20.000 kHz, 20.030 kHz, 20.060 kHz, it would not be possible to determine whether the transmitted frequency was 20.000 kHz or 20.030 kHz because the frequencies are separated by less than 43 Hz (i.e. twice the Doppler shifted frequency). Accordingly, in this example, the frequency difference between each frequency within the predefined set of frequencies would need to be greater than at 43 Hz, such as greater than about 50 Hz to ensure that frequency offset due to Doppler shift is less that signals can be interpreted correctly. For example, if the predefined frequency is selected from the following set of frequencies: 20.000 kHz, 20.050 kHz, 20.100 kHz then it would be assumed that a detected signal of 20.023 kHz was initially transmitted with a frequency of 20.000 kHz.

In other examples, the frequency difference between each frequency within the predefined set of frequencies is preferably greater than about 75 Hz (to account for movement speeds of up to about 0.65 m/s), or greater than about 100 Hz (to account for movement speeds of up to about 0.9 m/s), or greater than about 120 Hz (to account for movement speeds of up to about 1 m/s), or greater than about 150 Hz (to account for movement speeds of up to about 1.3 m/s), such as about 160 Hz (to account for movement speeds of up to about 1.4 m/s), or greater than about 175 Hz (to account for movement speeds of up to about 1.5 m/s).

In other examples, the frequency difference between each frequency within the predefined set of frequencies is preferably between about 50 Hz and about 175 Hz, or between about 125 Hz and about 175 Hz, such as between about 150 Hz and about 160 Hz.

In certain examples, the predefined frequencies are ultrasonic, or near ultrasonic. This can be useful because the frequencies are generally outside of the hearing range of humans, so may go unnoticed by the user. In a particular example, the predefined frequencies are selected from a predefined set of frequencies, and wherein each frequency within the predefined set of frequencies is greater than about 18 kHz, greater than about 19 kHz, or greater than about 20 kHz.

In a particular example, the predefined frequencies are selected from a predefined set of frequencies, and wherein each frequency within the predefined set of frequencies is between about 18 kHz and about 20 kHz. The upper bound of 20 kHz is useful because it can be rendered and received successfully by a majority of consumer loudspeakers, microphones, and DACs/ADCs.

It may be desirable for each reference audio signal to have tones that have a substantially equal likelihood of having any one of the frequencies within the predefined set of frequencies, or more generally have tones spread over a range of frequencies. This can avoid frequency-specific interference. For example, a room may attenuate or amplify audio signals with a particular frequency, so by having a wide spread of frequencies within each reference audio signal can avoid any one reference audio signal being attenuated more than another reference audio signal. Accordingly, each reference audio signal preferably has a flat frequency distribution.

In one example, each of the plurality of tones has a duration of between about 10 ms and about 20 ms. Tones of this duration are short enough to ensure that the entire detection process of multiple tones occurs in a relatively short period of time, while also ensuring that the audio signal has enough energy to achieve a reasonable signal-to-noise ratio, which allows receiving devices to more confidently classify it as a detected tone rather than background noise.

In some examples, each reference audio signal has a duration of between about 400 ms and about 800 ms, such as between about 600 ms and about 800 ms. Thus, each signal output by the respective playback devices has a duration of between about 400 ms and about 800 ms. This provides a balance between minimizing consumer waiting times for the process to occur, while also ensuring the reference audio signals are long enough to be uniquely recognized.

In some examples, each tone, when generated by a playback device, has an envelope length of between about 1 ms and about 5 ms, where the envelope length is the time it takes for the audio signal to ramp up to its maximum magnitude.

In one example, the method further comprises causing the plurality of playback devices to output respective reference audio signals. For example, the receiving device transmits a command to the plurality of playback devices causing them to output respective reference audio signals for detection. The reference audio signals may be output at substantially the same time. As mentioned above, the reference audio signals are specific to each playback device and identify each device. In some examples, causing the plurality of playback devices to output respective reference audio signals occurs after (or responsive to) receiving an input from the user, such as a playback session swap input.

In some examples, the reference audio signals output by the playback devices may be output at the same time as audio content, e.g. the reference audio signal may be superimposed onto the audio signal. For example, a playback device may be playing back audio content (such as a song) while simultaneously outputting a reference audio signal. This avoids interrupting the audio playback.

In another aspect, a receiving device comprises a microphone configured to receive an audio signal comprising a superposition of a plurality of audio signals transmitted by a plurality of respective playback devices; one or more processors; and non-transitory, computer-readable medium storing instructions that, when executed by the one or more processors, instruct the receiving device to: determine a time-frequency representation of the audio signal received by the microphone; obtain data associating playback devices with respective reference audio signals, each reference audio signal having a predefined time-frequency representation; and based on the time-frequency representation of the audio signal and the data, determine that the audio signal comprises a superposition of a first audio signal transmitted by a first playback device and a second audio signal transmitted by a second playback device.

In some examples, the instructions further instruct the receiving device to, based on the audio signal, determine a first magnitude associated with the first audio signal and a second magnitude associated with the second audio signal; determine that the first magnitude is greater than the second magnitude; determine that the first playback device is arranged in closer proximity than the second playback device to the receiving device; and transition a playback session between the receiving device and the first playback device.

In certain examples, the first playback device is playing back audio content in the playback session and wherein instructing the receiving device to transition the playback session between the receiving device and the first playback device comprises instructing the receiving device to: transition the playback session from the first playback device to the receiving device, such that the receiving device plays back the audio content. The receiving device may comprise one or more speakers to output the audio content, for example.

In other examples, the receiving device is playing back audio content in the playback session and wherein instructing the receiving device to transition the playback session between the receiving device and the first playback device comprises instructing the receiving device to: transition the playback session from the receiving device to the first playback device, such that the first playback device plays back the audio content.

In some examples, the receiving device further comprises a network interface configured to transmit, to the plurality of playback devices, a command to cause the plurality of playback devices to output respective reference audio signals concurrently or simultaneously. In other words, the devices each output their respective reference audio signal at the same time as other devices. The audio signals may be output to at least partially overlap in time. In certain examples, the playback devices output the audio in synchrony, such that the time at which the playback devices output the audio signals is synchronized.

In another aspect, a receiving device comprises a microphone configured to receive an audio signal comprising a superposition of a plurality of audio signals transmitted by a plurality of respective playback devices; one or more processors; and non-transitory, computer-readable medium storing instructions that, when executed by the one or more processors, instruct the receiving device to perform the method steps described above.

In another aspect, there is provided a non-transitory computer-readable medium having computer program instructions embodied thereon, wherein the computer program instructions, when executed by one or more processors of a receiving device, instruct the receiving device to: detect, during a time period, an audio signal comprising a superposition of a plurality of audio signals transmitted by a plurality of respective playback devices; determine a time-frequency representation of the audio signal; obtain data associating playback devices with respective reference audio signals, each reference audio signal having a predefined time-frequency representation; and based on the time-frequency representation of the audio signal and the data, determine that the audio signal comprises a superposition of a first audio signal transmitted by a first playback device and a second audio signal transmitted by a second playback device.

The instructions may further cause the receiving device to perform any of the method steps described above or herein.

In another aspect, a method for a playback system is provided, wherein the playback system comprises a first playback device and a second playback device. The method comprises receiving, by the first playback device, a command to output a first reference audio signal to identify the first playback device; receiving, by the second playback device, a command to output a second reference audio signal to identify the second playback device; outputting, by the first playback device, the first reference audio signal, the first reference audio signal having a first time-frequency representation; outputting, by the second playback device, the second reference audio signal, the second reference audio signal having a second time-frequency representation; and receiving, by one of the first playback device and the second playback device, an instruction to one of: transition a playback session from the one of the first playback device and the second playback device to a receiving device, such that the receiving device plays back audio content; and transition a playback session from a receiving device to the one of the first playback device and the second playback device, such that the one of the first playback device and the second playback device plays back audio content. The outputting of the reference audio signals occurs after, or responsive to, receiving the command.

The method may further comprise: detecting, by the receiving device during a time period, an audio signal comprising a superposition of the first reference audio signal and the second reference audio signal; determining a time-frequency representation of the audio signal; obtaining data associating playback devices with respective reference audio signals, each reference audio signal having a predefined time-frequency representation; and based on the time-frequency representation of the audio signal and the data, determining that the audio signal comprises a superposition of the first reference audio signal transmitted by the first playback device and the second reference audio signal transmitted by a second playback device.

The method may further comprise transmitting, by the receiving device to the first playback device, the command to output the first reference audio; and transmitting, by the receiving device to the second playback device, the command to output the second reference audio.

According to another aspect, a method for a playback device, comprises receiving, by the playback device, a command to output a first reference audio signal to identify the first playback device; outputting, by the playback device, the first reference audio signal, the first reference audio signal having a first time-frequency representation; receiving, by the playback device, an instruction to one of: transition a playback session from the playback device to a receiving device, such that the receiving device plays back audio content; and transition a playback session from a receiving device to the playback device such that the playback device plays back audio content.

In another aspect, there is provided an audio signal for identifying a playback device, wherein the audio signal comprises a plurality of tones, wherein each of the plurality of tones has a predefined frequency and initiation time. In some examples, at least some of the plurality of tones are spaced apart in time by an interval of time. In some examples, the interval of time is between about 10 ms and about 50 ms. In some examples, a first interval of time within the reference audio signal differs to, or is different from, at least another interval of time within the reference audio signal. In some examples, the predefined frequencies are selected from a predefined set of frequencies and wherein a frequency difference between each frequency within the predefined set of frequencies is greater than about 50 Hz. In some examples, the predefined frequencies are selected from a predefined set of frequencies, and wherein each frequency within the predefined set of frequencies is greater than about 18 kHz. In some examples, each of the plurality of tones has a duration of between about 10 ms and about 20 ms. In some examples, the audio signal has a duration of between about 400 ms and about 800 ms.

In another aspect, a system is provided. The system comprises a receiving device having any of or all the features described above, a first playback device and a second playback device.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
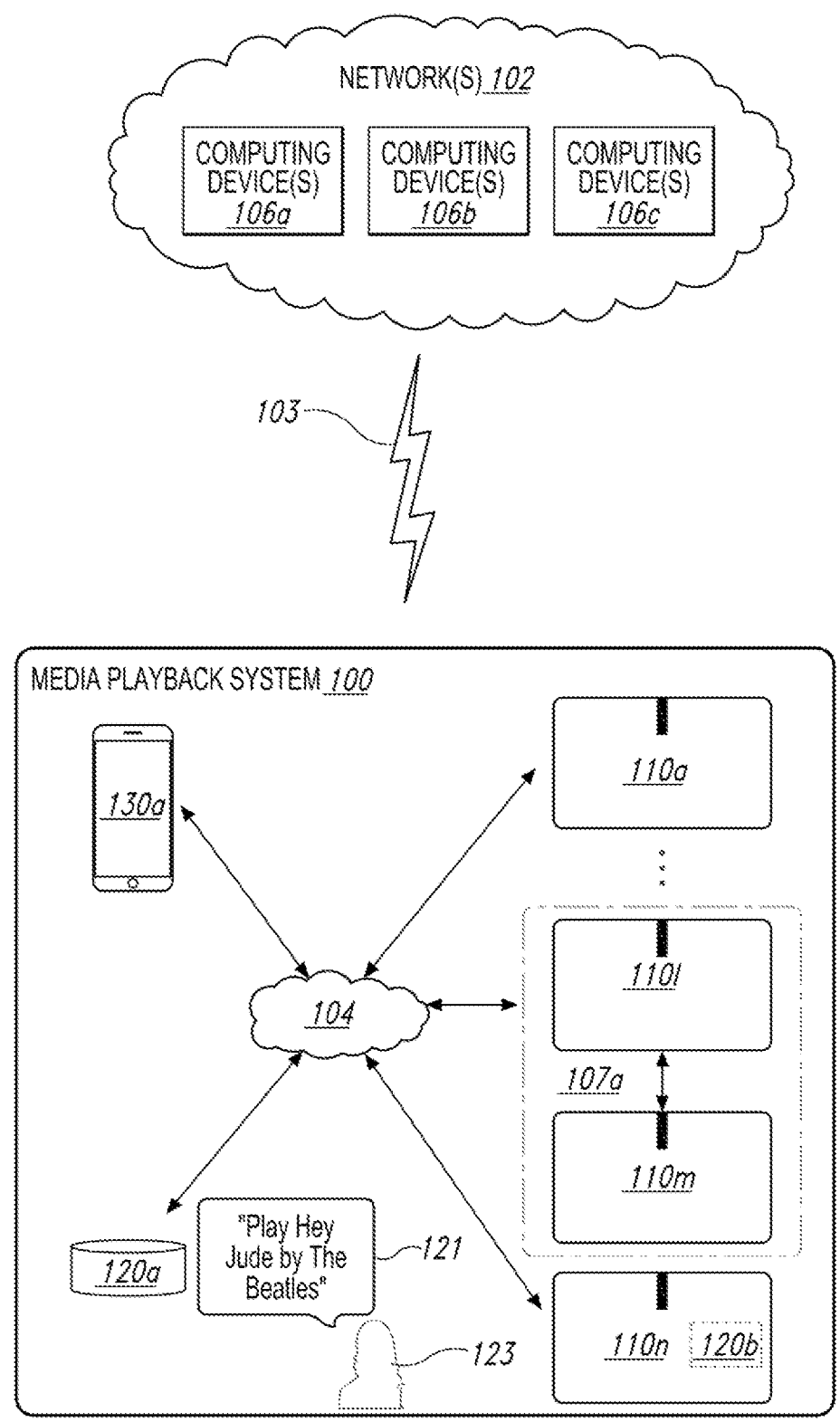
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120b, each comprising one or more microphones configured to receive voice utterances from a user. In the illustrated embodiment of FIG. 1B, the NMD 120a is a standalone device and the NMD 120b is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
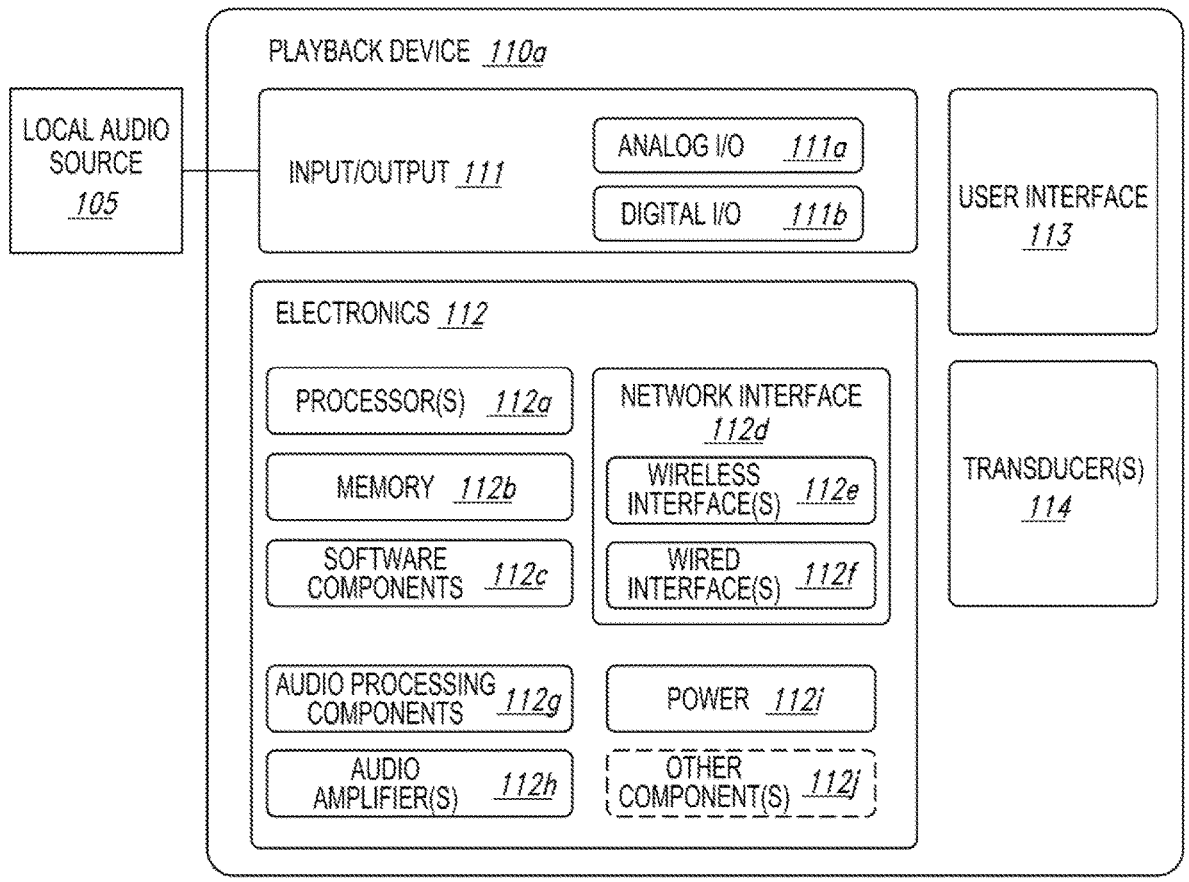
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
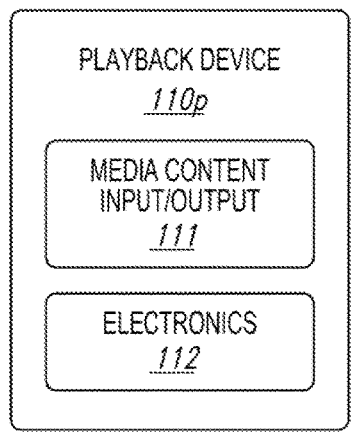
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
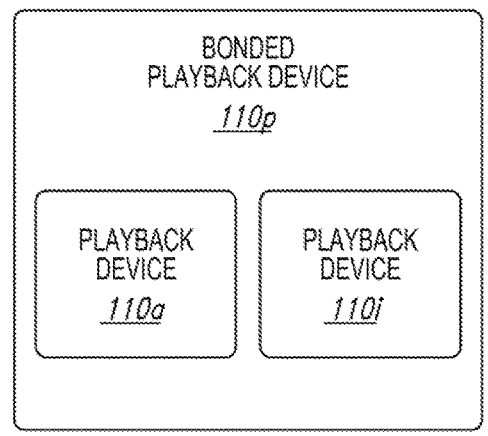
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

FIGS. 1-I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone B. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Figure 1M:
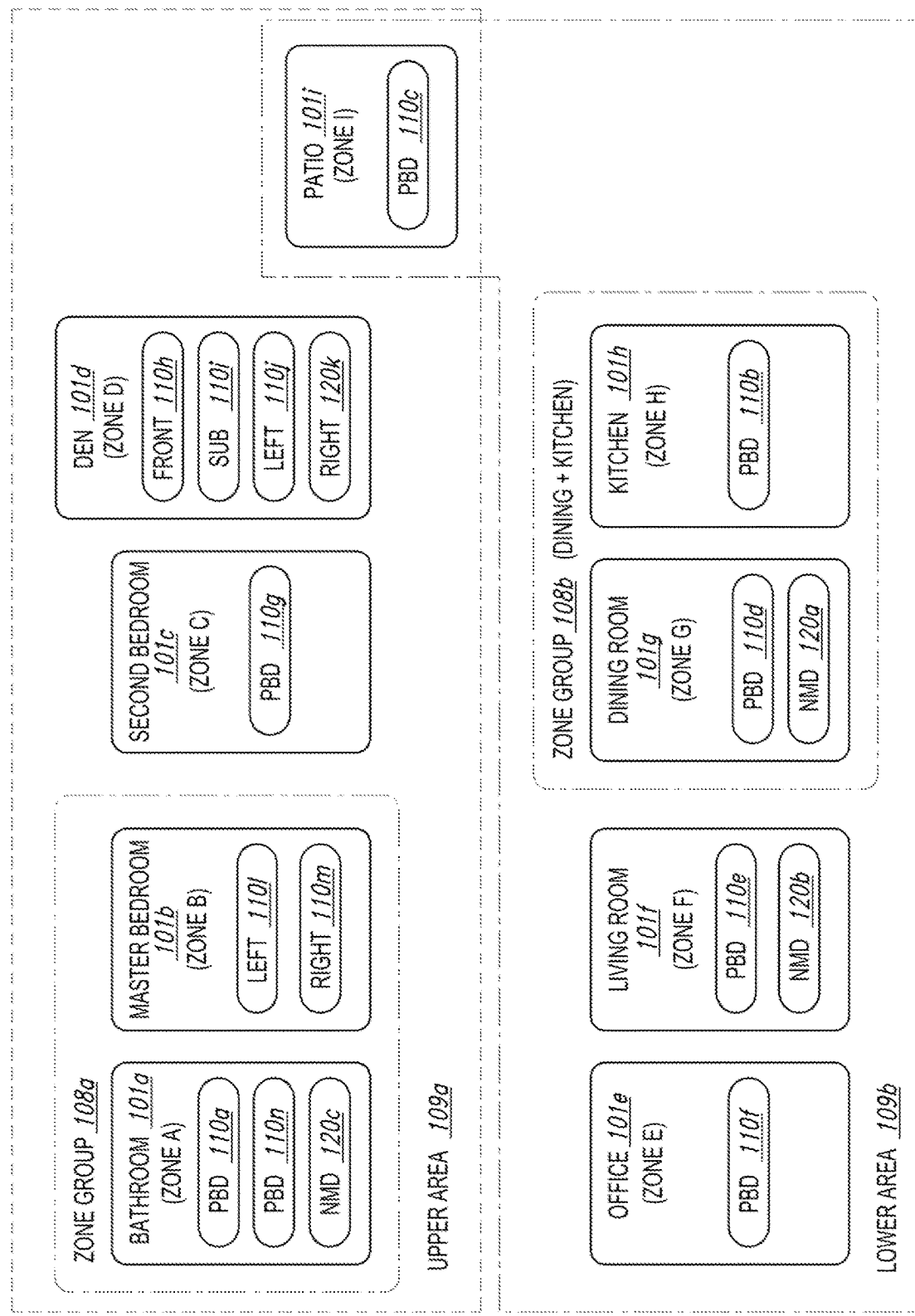
FIG. 1M is a schematic diagram of media playback system areas.

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n in the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
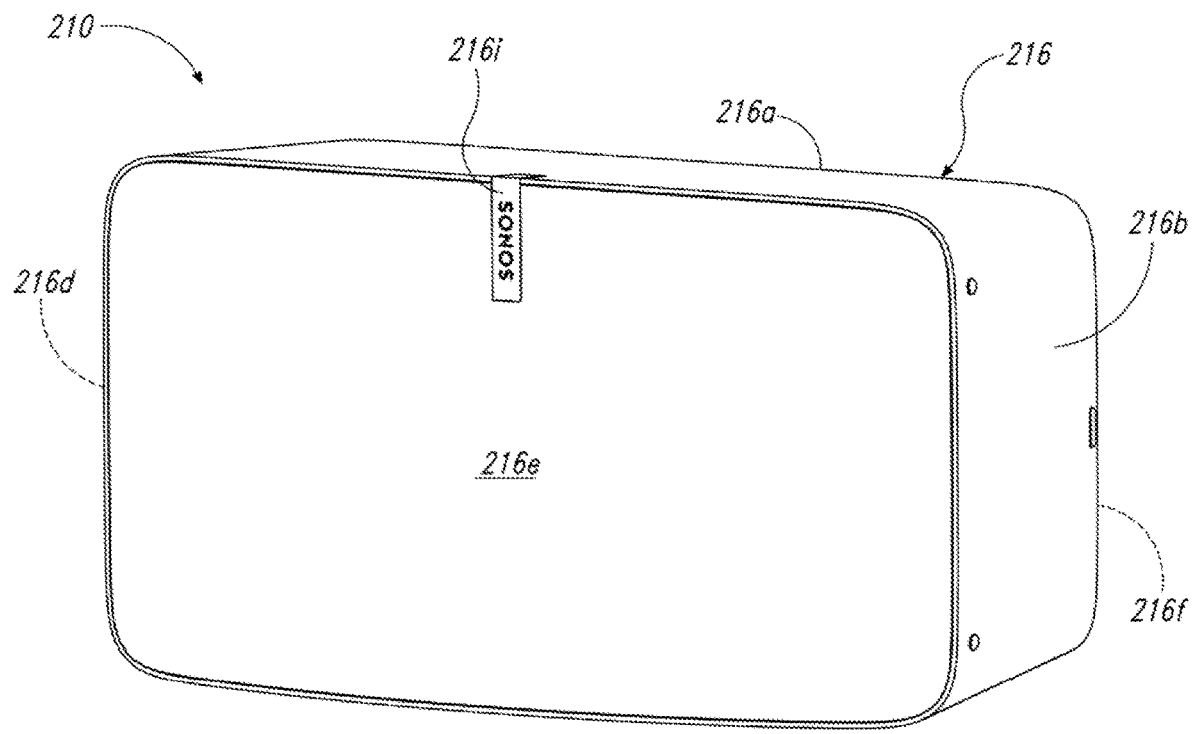
FIG. 2A is a front isometric view of a playback device configured in accordance with aspects of the disclosed technology.
Figure 2B:
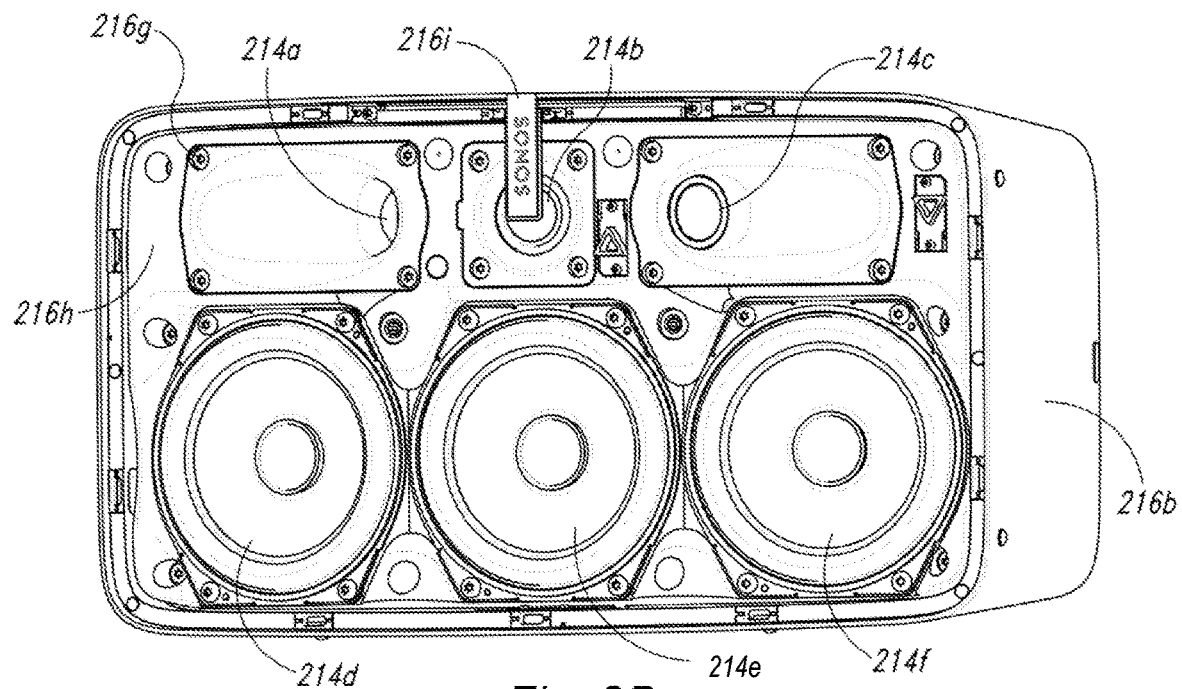
FIG. 2B is a front isometric view of the playback device of FIG. 3A without a grille.
Figure 2C:
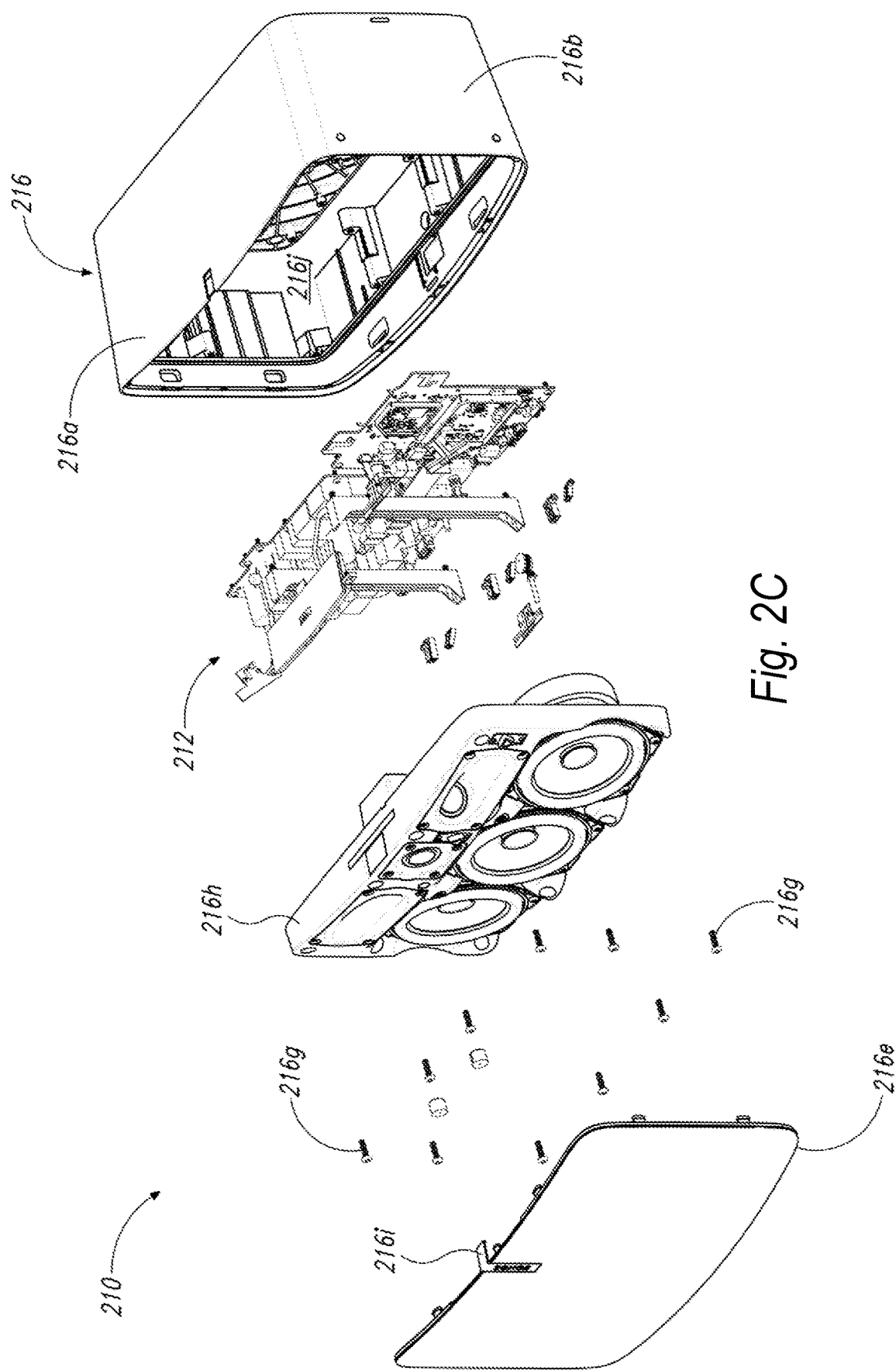
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
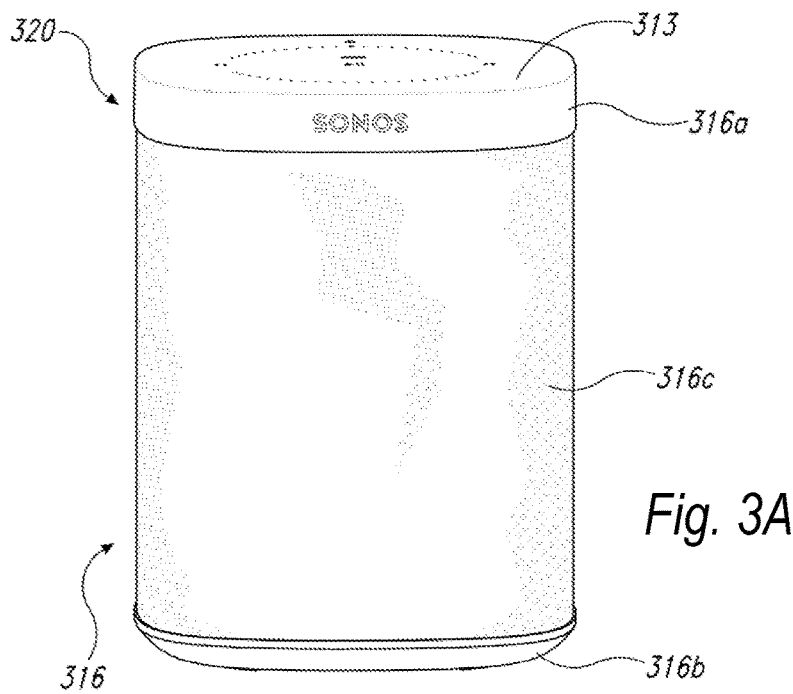
FIG. 3A is a front view of a network microphone device configured in accordance with aspects of the disclosed technology.
Figure 3B:
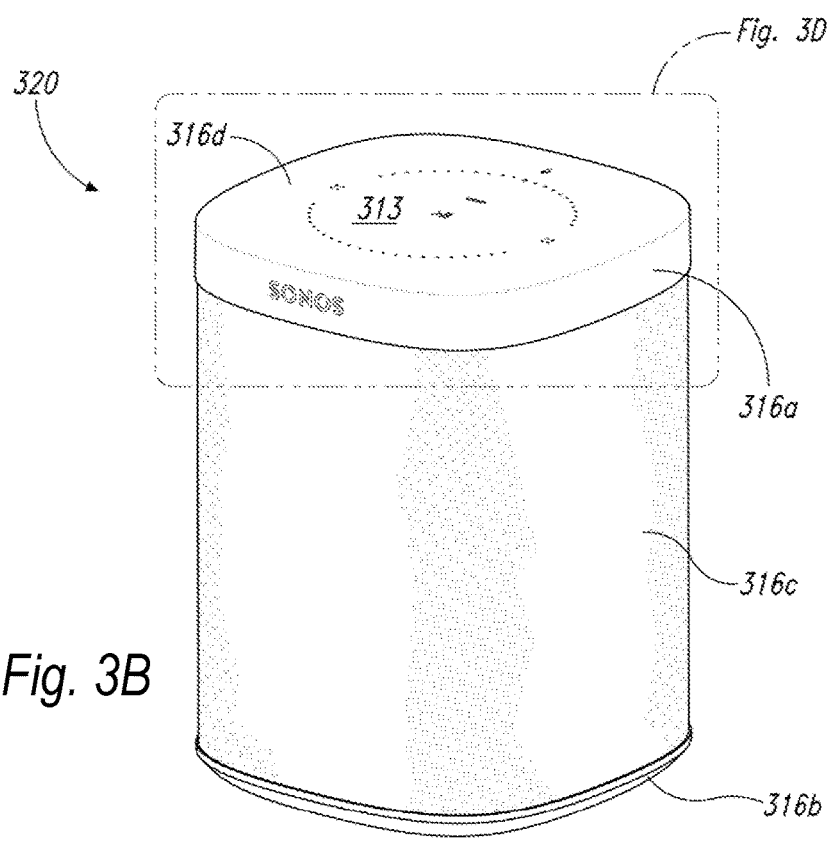
FIG. 3B is a side isometric view of the network microphone device of FIG. 3A.
Figure 3C:
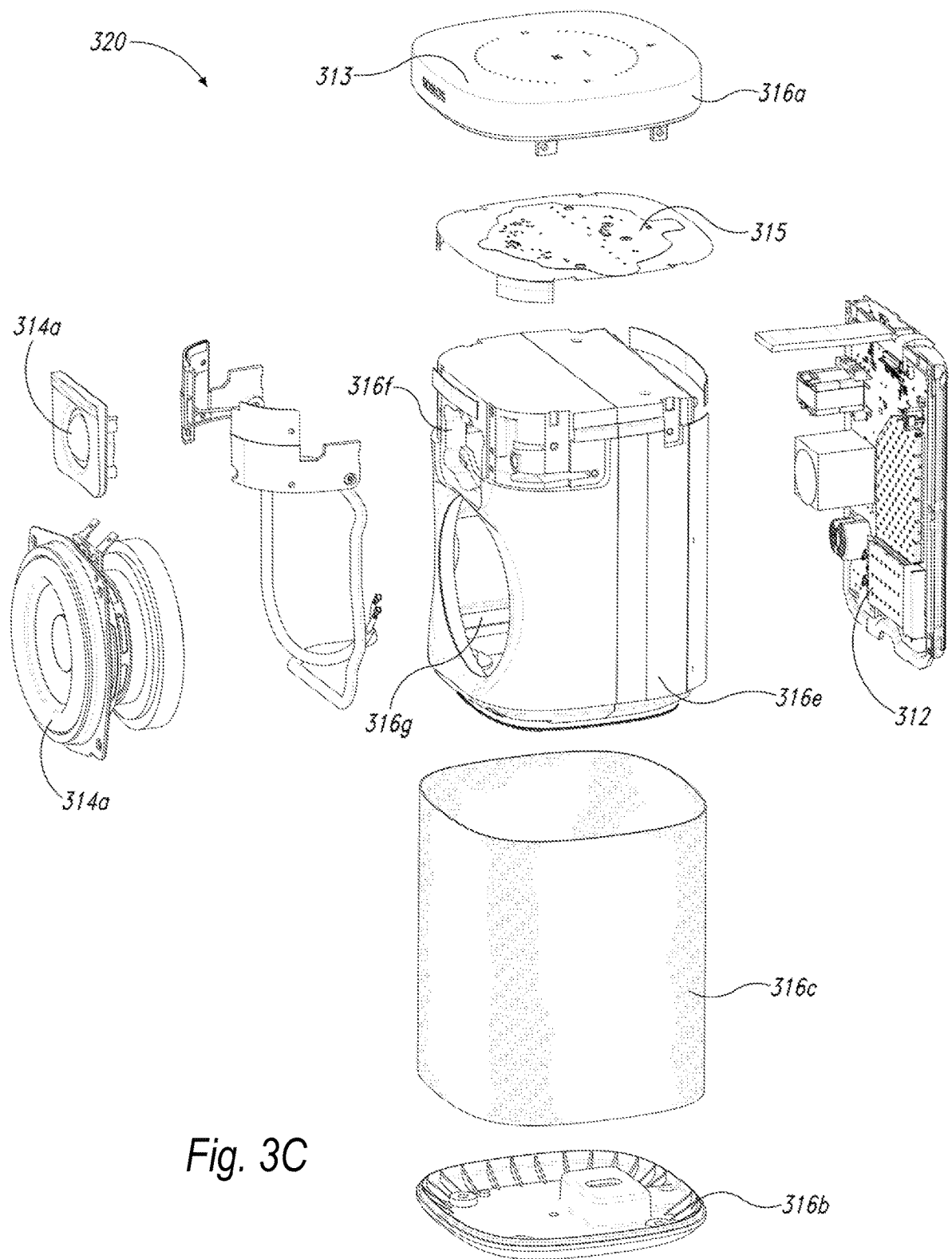
FIG. 3C is an exploded view of the network microphone device of FIGS. 3A and 3B.
Figure 3D:
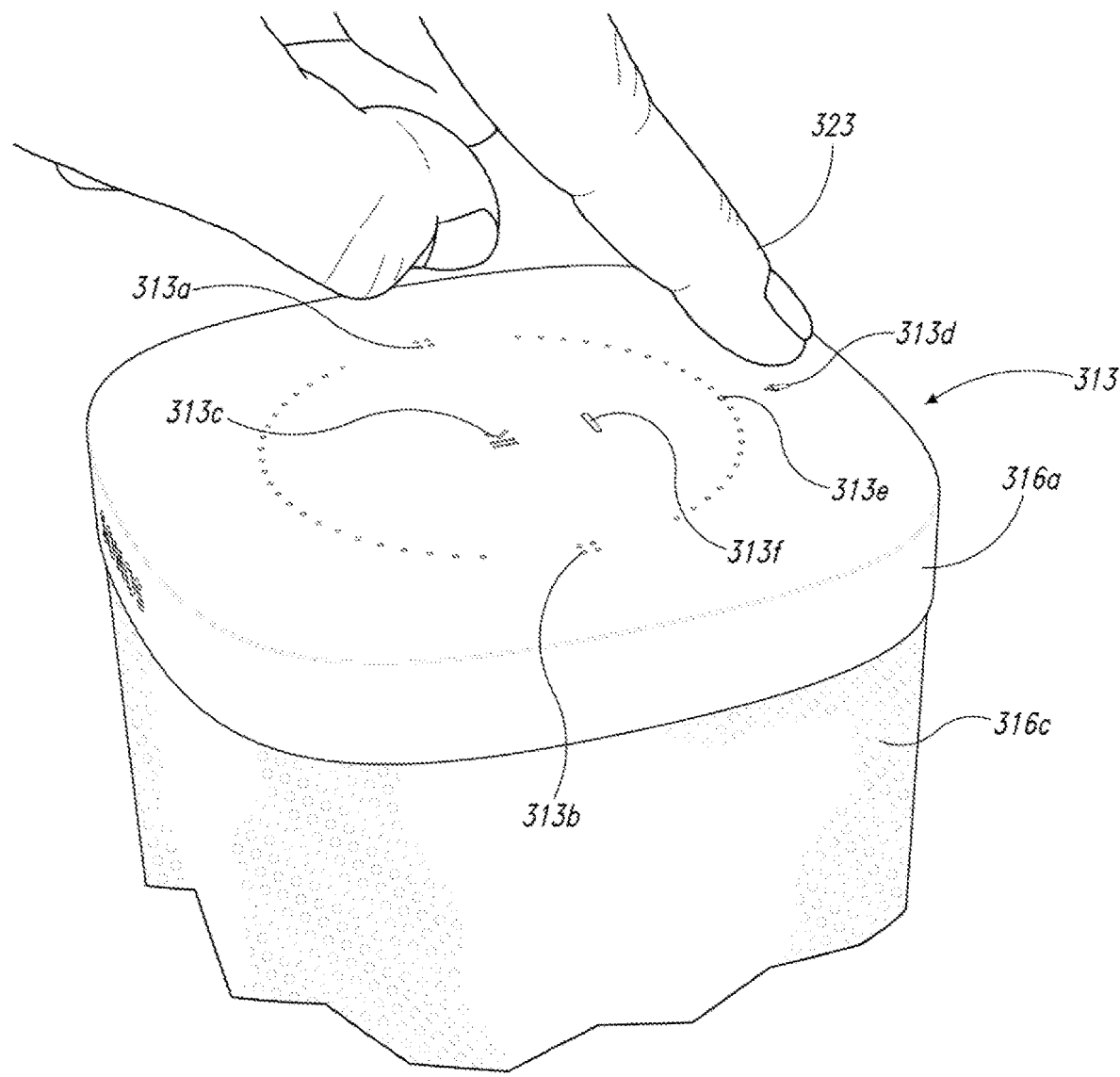
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 315 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternatively, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
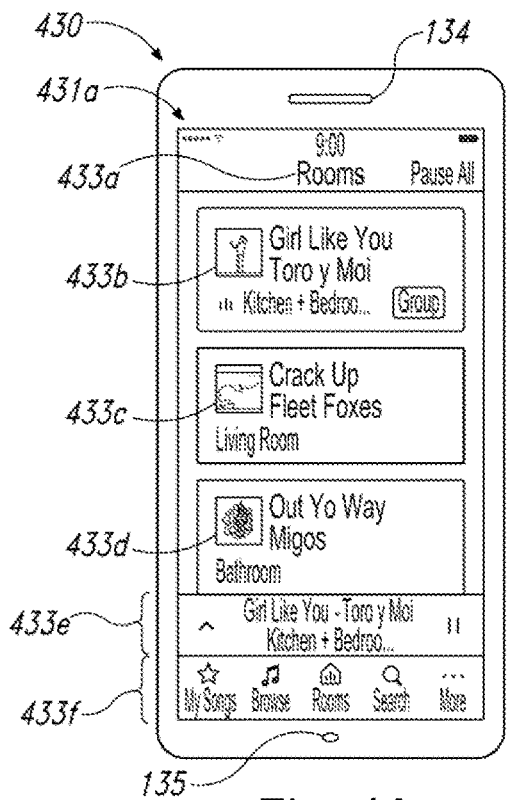
FIGS. 4A, 4B, 4C, and 4D are schematic diagrams of a control device in various stages of operation in accordance with aspects of the disclosed technology.
Figure 4B:
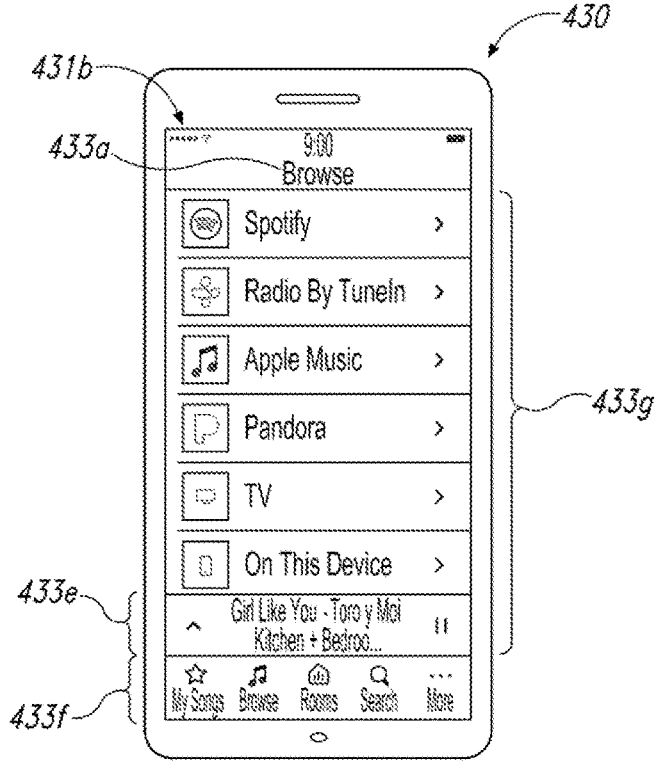
Figure 4C:
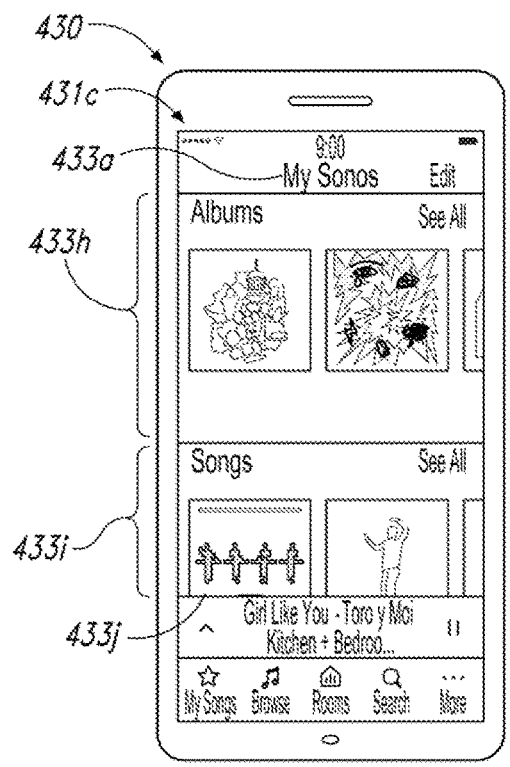
Figure 4D:
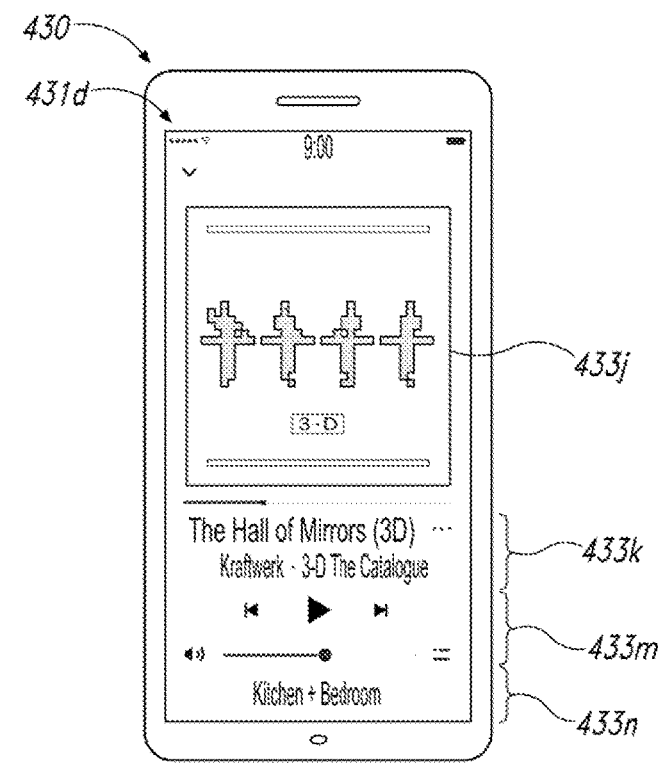

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
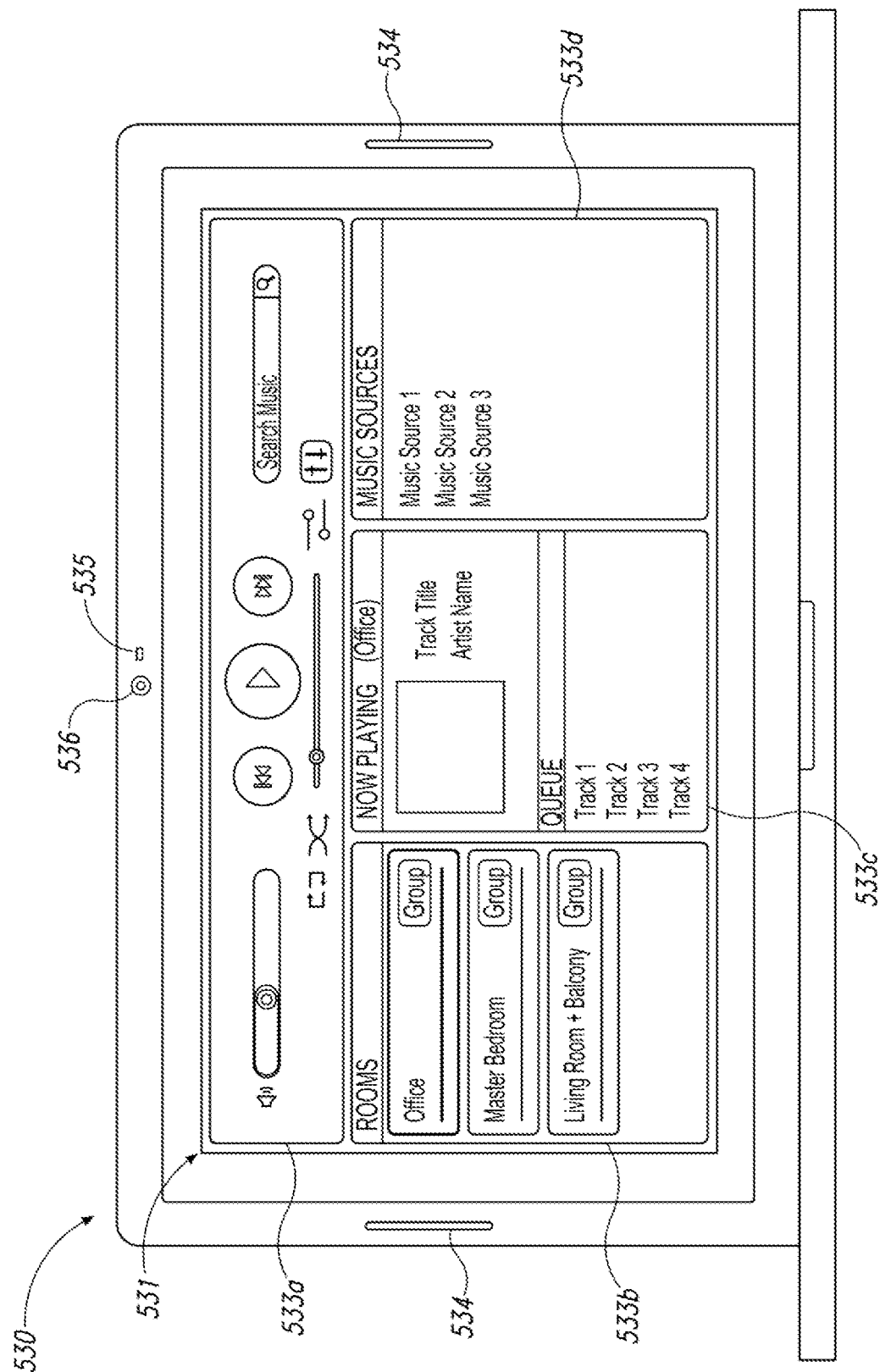
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
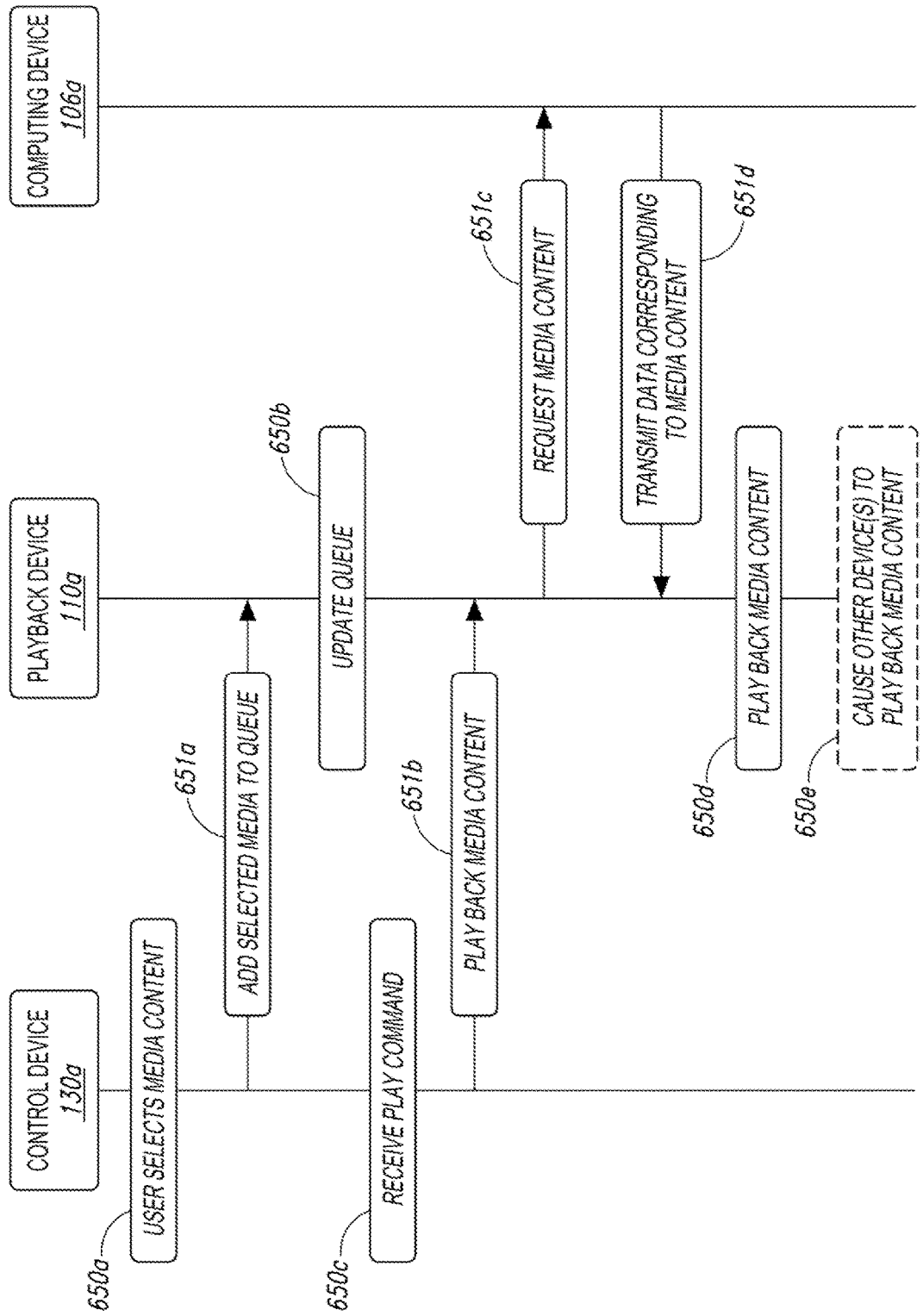
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

IV. Example Synchrony Grouping Techniques

Example synchrony techniques involve a group coordinator providing audio content and timing information to one or more group members to facilitate synchronous playback among the group coordinator and the group members. In some embodiments, at least some aspects of the technical solutions derive from the technical structure and organization of the audio information, playback timing, and clock timing information that the playback devices use to play audio content from audio sources in synchrony with each other, including how different playback devices generate playback timing based on clock timing (local clock timing or remote clock timing) and play audio content based on playback timing (generated locally or remotely) and clock timing (generated locally or remotely). Therefore, to aid in understanding certain aspects of the disclosed technical solutions, certain technical details of the audio information, playback timing, and clock timing information, as well as how playback devices generate and/or use playback timing and clock timing for playing audio content in different configurations, are described below.

a. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In operation, a "sourcing" playback device obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

A playback device that receives or otherwise obtains audio content from an audio source for playback and/or distribution to other playback devices is sometimes referred to herein as the "sourcing" playback device, "master" playback device, or "group coordinator." One function of the "sourcing" playback device is to process received audio content for playback and/or distribution to other playback devices. In some embodiments, the sourcing playback device transmits the processed audio content to all the playback devices that are configured to play the audio content. In some embodiments, the sourcing playback device transmits the processed audio content to a multicast network address, and all the other playback devices configured to play the audio content receive the audio content via that multicast address. In some embodiments, the sourcing playback device alternatively transmits the processed audio content to each unicast network address of each other playback device configured to play the audio content, and each of the other playback devices configured to play the audio content receive the audio content via its unicast address.

In some embodiments, the "sourcing" playback device receives audio content from an audio source in digital form, e.g., as a stream of packets. In some embodiments, individual packets in the stream of packets have a sequence number or other identifier that specifies an ordering of the packets. Packets transmitted over a data packet network (e.g., Ethernet, WiFi, or other packet networks) may arrive out of order, so the sourcing playback device uses the sequence number or other identifier to reassemble the stream of packets in the correct order before performing further packet processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out.

In some embodiments, the sourcing playback device does not change the sequence number or identifier of the received packets during packet processing. In some embodiments, the sourcing playback device reorders at least a first set packets in a packet stream based on each packet's sequence identifier, extracts audio content from the received packets, reassembles a bitstream of audio content from the received packets, and then repacketizes the reassembled bitstream into a second set of packets, where packets in the second set of packets have sequence numbers that differ from the sequence numbers of the packets in the first set of packets. In some embodiments, individual packets in the second set of packets are a different length (i.e., shorter or longer) than individual packets in the first set of packets. In some embodiments, reassembling a bitstream from the incoming packets and then subsequently repacketizing the reassembled bitstream into a different set of packets facilitates uniform processing and/or transmission of audio content by the sourcing playback device and by other playback devices that receive the audio content from the sourcing playback device. However, for some delay-sensitive audio content, reassembly and repacketization may be undesirable, and therefore, in some embodiments, the sourcing playback device may not perform reassembly and repacketization for some (or all) audio content that it receives before playing the audio content and/or transmitting the audio content to other playback devices.

In some embodiments an audio source provides audio content in digital form to a sourcing playback device, e.g., via a digital line-in interface. In such embodiments, the sourcing playback device packetizes the digital audio into packets of audio content before transmitting the audio content to other playback devices. In some embodiments, individual packets of the audio content comprise a sequence number or other identifier so that, when other playback devices receive the audio content, those other playback devices will be able to reliably arrange the received packets in the correct order before performing further packet processing.

In some embodiments an audio source provides audio content in analog form to a sourcing playback device, e.g., via an analog line-in interface. In such embodiments, the sourcing playback device converts the received analog audio into digital audio and packetizes the digital audio into packets of audio content before transmitting the audio content to other playback devices. In some embodiments, individual packets of the audio content comprise a sequence number or other identifier so that, when other playback devices receive the audio content, those other playback devices will be able to reliably arrange the received packets in the correct order before performing further packet processing.

After obtaining audio content from an audio source or from another playback device, a playback device in some embodiments one or more of (i) plays the audio content individually, (ii) plays the content in synchrony with one or more additional playback devices, and/or (iii) transmits the audio content to one or more other playback devices.

b. Playback Timing

The playback devices disclosed and described herein use playback timing to play audio content in synchrony with each other. An individual playback device can generate playback timing and/or playback audio content according to playback timing, based on the playback device's configuration in the media playback network. The sourcing playback device that generates the playback timing for audio content also transmits that generated playback timing to all the playback devices that are configured to play the audio content. In some embodiments, the sourcing playback device transmits the playback timing to a multicast network address, and all the other playback devices configured to play the audio content receive the playback timing via that multicast address. In some embodiments, the sourcing playback device alternatively transmits the playback timing to each unicast network address of each other playback device configured to play the audio content, and each of the other playback devices configured to play the audio content receive the playback timing via its unicast address.

In operation, a playback device (or a computing device associated with the playback device) generates the playback timing for audio content based on clock timing (described below), which can be "local" clock timing (i.e., clock timing generated by the sourcing playback device) or "remote" clock timing received from a different playback device (or different computing device).

In some embodiments, the playback timing is generated for individual frames (or packets) of audio content. As described above, in some embodiments, the audio content is packaged in a series of frames (or packets) where individual frames (or packets) comprise a portion of the audio content. In some embodiments, the playback timing for the audio content includes a playback time for each frame (or packet) of audio content. In some embodiments, the playback timing for an individual frame (or packet) is included within the frame (or packet), e.g., in the header of the frame (or packet), in an extended header of the frame (or packet), and/or in the payload portion of the frame (or packet).

In some embodiments, the playback time for an individual frame (or packet) is identified within a timestamp or other indication. In such embodiments, the timestamp (or other indication) represents a time to play audio content within that individual frame (or packet). In operation, when the playback timing for an individual frame (or packet) is generated, the playback timing for that individual frame (or packet) is a future time relative to a current clock time of a reference clock at the time that the playback timing for that individual frame (or packet) is generated. The reference clock can be a "local" clock at the playback device or a "remote" clock at a separate network device, e.g., another playback device, a computing device, or another network device configured to provide clock timing for use by playback devices to generate playback timing and/or playback audio content.

In operation, a playback device tasked with playing particular audio content will play the portion(s) of the particular audio content within an individual frame (or packet) at the playback time specified by the playback timing for that individual frame (or packet), as adjusted to accommodate for clocking differences between the sourcing playback device, the clock timing, and the playback device that is tasked with playing the audio content, as describe in more detail below.

c. Clock Timing

The playback devices disclosed and described herein use clock timing to generate playback timing for audio content and to play the audio content based on the generated playback timing. In some embodiments, the sourcing playback device uses clock timing from a reference clock (e.g., a device clock, a digital-to-audio converter clock, a playback time reference clock, or any other clock) to generate playback timing for audio content that the sourcing playback device receives from an audio source. For an individual playback device, the reference clock can be a "local" clock at the playback device or a "remote" clock at a separate network device, e.g., another playback device, a computing device, or another network device configured to provide clock timing for use by playback devices to generate playback timing and/or playback audio content.

In some embodiments, all of the playback devices tasked with playing particular audio content in synchrony use the same clock timing from the reference clock to play back that particular audio content. In some embodiments, playback devices use the same clock timing to play audio content that was used to generate the playback timing for the audio content.

In operation, the network device that generates the clock timing also transmits the clock timing to all the playback devices in the network that need to use the clock timing for generating playback timing and/or playing back audio content. In some embodiments, the network device that generates the clock timing transmits the clock timing to a multicast network address, and all the other playback devices configured to generate playback timing and/or play audio content receive the clock timing via that multicast address. In some embodiments, the network device alternatively transmits the clock timing to each unicast network address of each other playback device configured to play the audio content, and each of the other playback devices configured to play the audio content receive the clock timing via its unicast address.

d. Generating Playback Timing with Clock Timing from a Local Clock

In some embodiments, a sourcing playback device (i) generates playback timing for audio content based on clock timing from a local clock at the sourcing playback device, and (ii) transmits the generated playback timing to all other playback devices configured to play the audio content. In operation, when generating playback timing for an individual frame (or packet), the "sourcing" playback device adds a "timing advance" to the current clock time of the local clock of the sourcing playback device that the sourcing playback device is using for generating the playback timing.

In some embodiments, the "timing advance" is based on an amount of time that is greater than or equal to the sum of (i) the network transit time required for frames and/or packets comprising audio content transmitted from the sourcing playback device to arrive at all other playback devices that are configured to use the playback timing for playing the audio content in synchrony and (ii) the amount of time required for all the other playback devices configured to use that playback timing for synchronous playback to process received frames/packets from the sourcing playback device for playback.

In some embodiments, the sourcing playback device determines a timing advance by sending one or more test packets to one or more (or perhaps all) of the other playback devices configured to play the audio content that the sourcing device is transmitting, and then receiving test response packets back from those one or more of the other playback devices. In some embodiments, the sourcing playback device and the one or more other playback devices negotiate a timing advance via multiple test and response messages. In some embodiments with more than two additional playback devices, the sourcing playback device determines a timing advance by exchanging test and response messages with all of the playback devices, and then setting a timing advance that is sufficient for the playback device having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined. In other embodiments, the playback device that generates the playback timing can change the timing advance in response to a request from a receiving device indicating that a greater timing advance is required (e.g., because the receiving device is not receiving packets comprising portions of audio content until after other devices have already played the portions of audio content) or a shorter timing advance would be sufficient (e.g., because the receiving device is buffering more packets comprising portions of audio content than necessary to provide consistent, reliable playback).

As described in more detail below, all the playback devices configured to play the audio content in synchrony will use the playback timing and the clock timing to play the audio content in synchrony with each other.

e. Playing Audio Content Using Local Playback Timing and Local Clock Timing

In some embodiments, the sourcing playback device is configured to play audio content in synchrony with one or more other playback devices. And if the sourcing playback device is using clock timing from a local clock at the sourcing playback device to generate the playback timing, then the sourcing playback device will play the audio content using locally-generated playback timing and the locally-generated clock timing. In operation, the sourcing playback device plays an individual frame (or packet) comprising portions of the audio content when the local clock that the sourcing playback device used to generate the playback timing reaches the time specified in the playback timing for that individual frame (or packet).

For example, recall that when generating playback timing for an individual frame (or packet), the sourcing playback device adds a "timing advance" to the current clock time of the reference clock used for generating the playback timing.

In this instance, the reference clock used for generating the playback timing is a local clock at the sourcing playback device. So, if the timing advance for an individual frame is, for example, 30 milliseconds, then the sourcing playback device plays the portion (e.g., a sample or set of samples) of audio content in an individual frame (or packet) 30 milliseconds after creating the playback timing for that individual frame (or packet).

In this manner, the sourcing playback device plays the audio content using locally-generated playback timing and clock timing from a local reference clock. As described further below, by playing the portion(s) of the audio content of an individual frame and/or packet when the clock time of the local reference clock reaches the playback timing for that individual frame or packet, the sourcing playback device plays that portion(s) of the audio content in that individual frame and/or packet in synchrony with other playback devices.

f. Playing Audio Content Using Remote Playback Timing and Remote Clock Timing

Recall that, in some embodiments, the sourcing playback device transmits the audio content and the playback timing for the audio content to one or more other playback devices. And further recall that, in some embodiments, the network device providing the clock timing can be a different device than the sourcing playback device. Playback devices that receive the audio content, the playback timing, and the clock timing from another playback device are configured to playback the audio content using the playback timing from the sourcing playback device (i.e., remote playback timing) and clock timing from a clock at another playback device (i.e., remote clock timing). In this manner, the receiving playback device in this instance plays audio content using remote playback timing and remote clock timing.

To play an individual frame (or packet) of the audio content in synchrony with every other playback device tasked with playing the audio content, the receiving playback device (i) receives the frames (or packets) comprising the portions of the audio content from the sourcing playback device, (ii) receives the playback timing for the audio content from the sourcing playback device (e.g., in the frame and/or packet headers of the frames and/or packets comprising the portions of the audio content or perhaps separately from the frames and/or packets comprising the portions of the audio content), (iii) receives the clock timing from another network device, e.g., another playback device, a computing device, or another network device configured to provide clock timing for use by playback devices to generate playback timing and/or playback audio content, and (iv) plays the portion(s) of the audio content in the individual frame (or packet) when the local clock that the receiving playback device uses for audio content playback reaches the playback time specified in the playback timing for that individual frame (or packet) received from the sourcing playback device, as adjusted by a "timing offset."

In operation, after the receiving playback device receives clock timing from the other network device, the receiving device determines a "timing offset" for the receiving playback device. This "timing offset" comprises (or at least corresponds to) a difference between the "reference" clock at the network device that the network device used to generate the clock timing and a "local" clock at the receiving playback device that the receiving playback device uses to play the audio content. In operation, each playback device that receives the clock timing from another network device calculates its own "timing offset" based on the difference between its local clock and the clock timing, and thus, the "timing offset" that each playback determines is specific to that particular playback device.

In some embodiments, when playing back the audio content, the receiving playback device generates new playback timing (specific to the receiving playback device) for individual frames (or packets) of audio content by adding the previously determined "timing offset" to the playback timing for each frame (or packet) received from the sourcing playback device. With this approach, the receiving playback device converts the playback timing for the audio content received from the sourcing playback device into "local" playback timing for the receiving playback device. Because each receiving playback device calculates its own "timing offset," each receiving playback device's determined "local" playback timing for an individual frame is specific to that particular playback device.

And when the "local" clock that the receiving playback device is using for playing back the audio content reaches the "local" playback time for an individual frame (or packet), the receiving playback device plays the audio content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving playback device plays frames (or packets) comprising portions of the audio content according to the playback timing as adjusted by the "timing offset" relative to the clock timing, and because the sourcing playback generated the playback timing for those frames (or packets) relative to the clock timing and plays the same frames (or packets) comprising portions of the audio content according to the playback timing and its determined "timing offset," the receiving playback device and the sourcing playback device play the same frames (or packets) comprising the same portions of the audio content in synchrony, i.e., at the same time or at substantially the same time.

Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

V. Example Portable Playback Devices

Figure 7A:
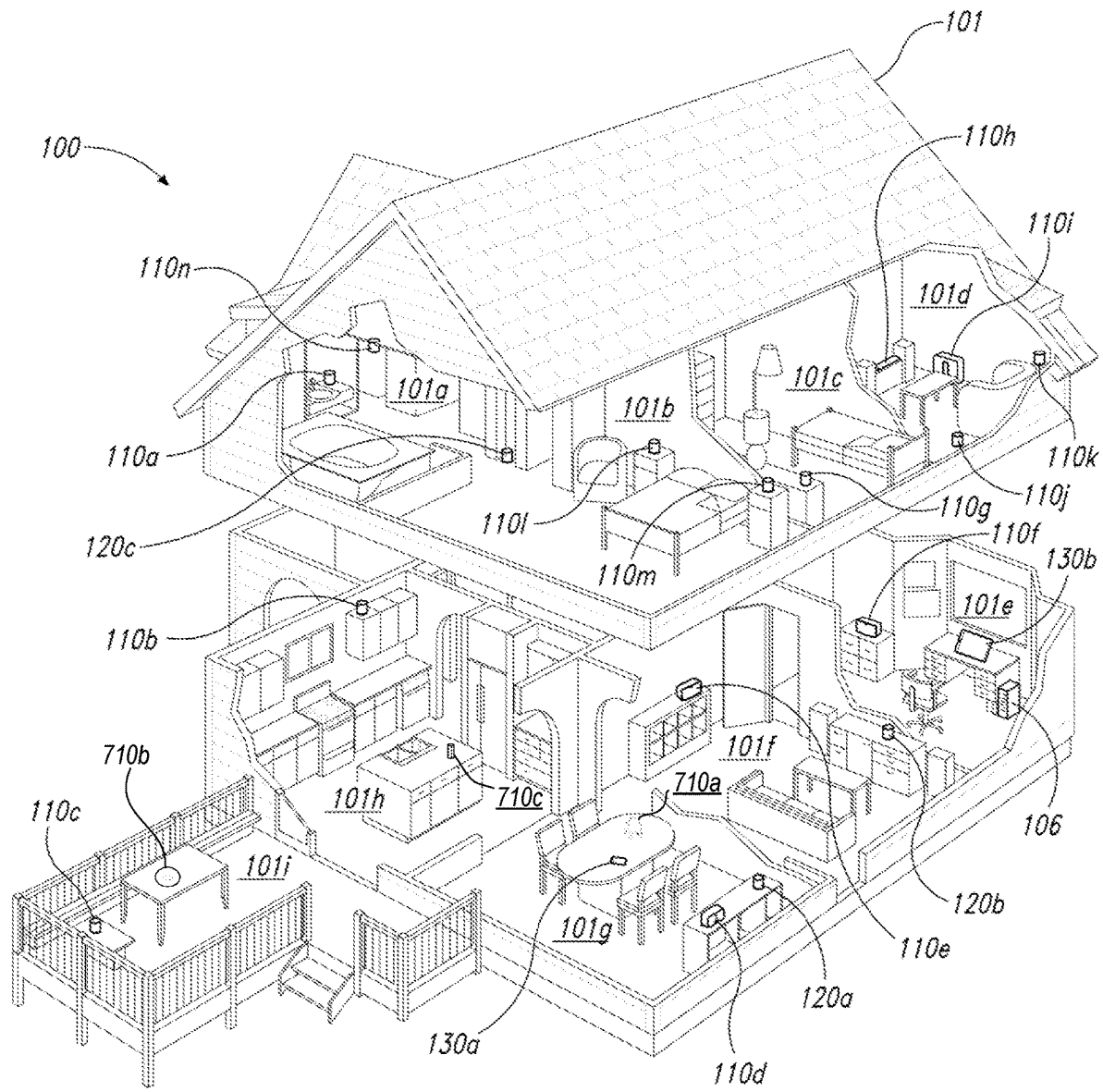
FIG. 7A is a partial cutaway view of an environment having a media playback system configured in accordance with aspects of the disclosed technology.

As noted above, certain playback device implementations may be configured for portable use. These portable implementations include wearable playback devices, such as headphones and earbuds, generally designed for personal listening by one user at a time, and portable devices designed for out loud playback. FIG. 7A is a partial cutaway view of the media playback system 100 with the inclusion of one or more portable playback devices 710 (identified individually as portable playback devices 710a, 710b, and 710c). The portable playback devices 710 are similar to the playback devices 110, but are configured for portable use. While they are shown in the home in FIG. 7A, the portable playback devices 710 are configured to play back audio content while in the home and while "on the go."

Figure 7B:
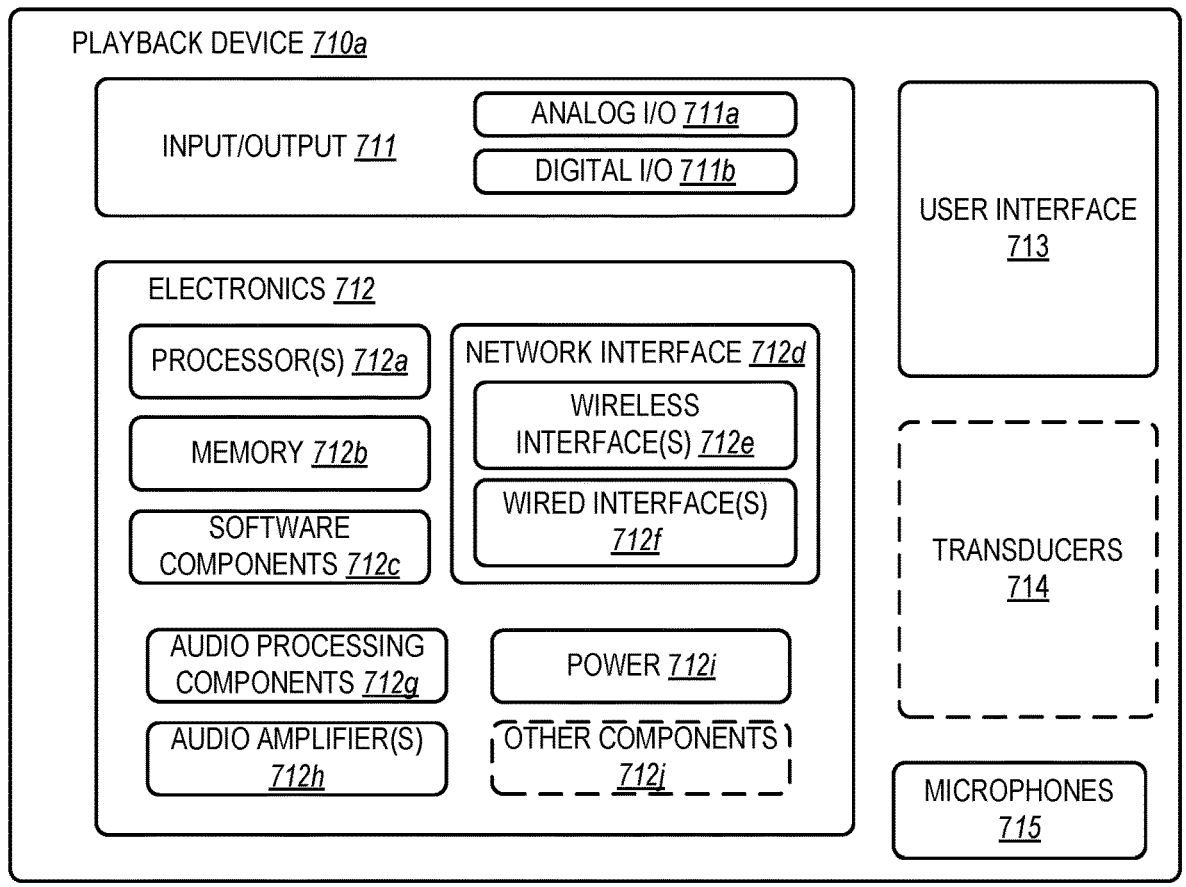
FIG. 7B is a block diagram of a portable playback device configured in accordance with aspects of the disclosed technology.

As shown in the block diagram of FIG. 7B, a portable playback device 710a includes the same or similar components as the playback device 110a. However, to facilitate portable use, the playback device 710a may be implemented in a certain form factor (e.g., headphones or earbuds) and includes one or more batteries in power 712i to provide portable power.

Referring to FIG. 7B, the portable playback device 710a includes an input/output 711, which can include an analog I/O 711a and/or a digital I/O 711b similar to the components of the playback device 110. To facilitate portable usage, the input/output 711 of the portable playback device 710a may include an interface (such as a Bluetooth interface) to facilitate connection to a bridge device (e.g., a mobile device), which the portable playback device 710a may use to stream audio content and otherwise communicate with the bridge device.

The playback device 710a further includes electronics 712, a user interface 713 (e.g., one or more buttons, knobs, dials, touch-sensitive surfaces, displays, touchscreens), and one or more transducers 714 (referred to hereinafter as "the transducers 714"). The electronics 712 is configured to receive audio from an audio source via the input/output 711, one or more of the computing devices 106a-c via the network 104 (FIG. 1B), amplify the received audio, and output the amplified audio for playback via one or more of the transducers 714.

In some embodiments, the playback device 710a optionally includes one or more microphones 715 (e.g., a single microphone, a plurality of microphones, a microphone array) (hereinafter referred to as "the microphones 715"). In some examples, the microphones 715 may include one or more voice microphones to facilitate voice input for telephone calls and the like. In certain embodiments, for example, playback device 710a can operate as an NMD (similar to the NMD 120 of FIG. 1F) configured to receive voice input from a user using the voice microphones and correspondingly perform one or more operations based on the received voice input. In further examples, the microphones 715 may include one or more acoustic noise cancelling (ANC) microphones which, in operation, capture ambient noise in the environment to facilitate cancelling of this ambient noise by the playback device 710a.

In the illustrated embodiment of FIG. 7B, the electronics 712 include one or more processors 712a (referred to hereinafter as "the processors 112a"), memory 712b, software components 712c, a network interface 712d, one or more audio processing components 712g (referred to hereinafter as "the audio components 712g"), one or more audio amplifiers 712h (referred to hereinafter as "the amplifiers 712h"), and power 712i (e.g., one or more power supplies, power cables, power receptacles, batteries, induction coils, Power-over Ethernet (POE) interfaces, and/or other suitable sources of electric power). In some embodiments, the electronics 712 optionally include one or more other components 712j (e.g., one or more sensors, video displays, touchscreens).

The network interface 712d is configured to facilitate a transmission of data between the playback device 710a and one or more other devices on a data network such as, for example, the links 103 and/or the network 104 (FIG. 1B). The network interface 712d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 712d can parse the digital packet data such that the electronics 712 properly receives and processes the data destined for the playback device 110a.

In the illustrated embodiment of FIG. 7B, the network interface 712d includes one or more wireless interfaces 712e (referred to hereinafter as "the wireless interface 712e"). The wireless interface 712e (e.g., a suitable interface comprising one or more antennae) can be configured to wirelessly communicate with one or more other devices (e.g., one or more of the playback devices 110, NMDs 120, control devices 130, other portable playback devices 710, as well as other devices disclosed herein, such as bridge devices) that are communicatively coupled to the network 104 (FIG. 1B) in accordance with a suitable wireless communication protocol (e.g., WiFi, Bluetooth, LTE). In some embodiments, the network interface 712d optionally includes a wired interface 712f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In some embodiments, the electronics 712 excludes the network interface 712d altogether and transmits and receives media content and/or other data via another communication path (e.g., the input/output 711).

The audio components 712g are configured to process and/or filter data comprising media content received by the electronics 712 (e.g., via the input/output 711 and/or the network interface 712d) to produce output audio signals. In some embodiments, the audio processing components 712g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 712g can comprise one or more subcomponents of the processors 712a. In some embodiments, the electronics 712 omits the audio processing components 712g. In some aspects, for example, the processors 712a execute instructions stored on the memory 712b to perform audio processing operations to produce the output audio signals.

The amplifiers 712h are configured to receive and amplify the audio output signals produced by the audio processing components 712g and/or the processors 712a. The amplifiers 7712h can comprise electronic devices and/or components configured to amplify audio signals to levels sufficient for driving one or more of the transducers 714. In some embodiments, for example, the amplifiers 712h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 712h comprise a suitable combination of two or more of the foregoing types of power amplifiers. Moreover, in some embodiments, individual ones of the amplifiers 712h correspond to individual ones of the transducers 714. In other embodiments, however, the electronics 712 includes a single one of the amplifiers 712h configured to output amplified audio signals to a plurality of the transducers 714.

The transducers 714 (e.g., one or more speakers and/or speaker drivers) receive the amplified audio signals from the amplifier 712h and render or output the amplified audio signals as sound (e.g., audible sound waves having a frequency between about 20 Hertz (Hz) and 20 kilohertz (kHz)). In some embodiments, the transducers 714 can comprise a single transducer. In other embodiments, however, the transducers 714 comprise a plurality of audio transducers. In some embodiments, the transducers 714 comprise more than one type of transducer. For example, the transducers 714 can include one or more low frequency transducers (e.g., subwoofers, woofers), mid-range frequency transducers (e.g., mid-range transducers, mid-woofers), and one or more high frequency transducers (e.g., one or more tweeters).

Figure 7C:
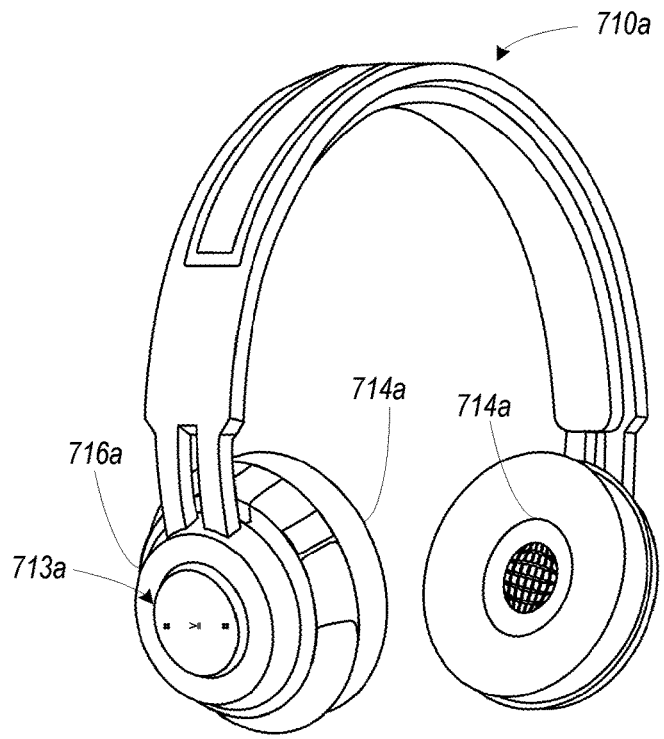
FIG. 7C is a front isometric view of a portable playback device implemented as headphones configured in accordance with aspects of the disclosed technology.

FIG. 7C is a front isometric view of the portable playback device 710a configured in accordance with aspects of the disclosed technology. As shown in FIG. 7C, the portable playback device 710a is implemented as headphones to facilitate more private playback as compared with the out loud playback of the playback device(s) 110. As shown, the portable playback device 710a (also referred to as headphones 710a) includes a housing 716a to support a pair of transducers 714a on or around user's head over the user's ears.

The headphones 710a also include a user interface 713a with a touch-sensitive region to facilitate playback controls such as transport and/or volume controls. The touch-sensitive region of the user interface 713a may support gesture controls. For instance, a swipe forward or backward across the touch-sensitive region may skip forward or backwards, respectively. Other gestures include a touch-and-hold, as well as a touch-and-continued hold, which may correspond to various swapping and grouping functions, as described in further detail below. In some implementations, the user interface 713a may include respective touch-sensitive regions on the exterior of each earcup.

Figure 7D:
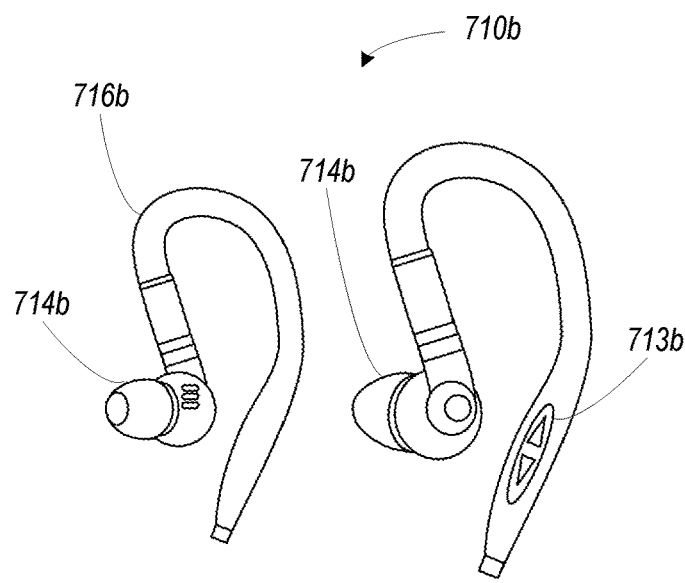
FIG. 7D is a front isometric view of a portable playback device implemented as earbuds configured in accordance with aspects of the disclosed technology.

FIG. 7D is a front isometric view of the portable playback device 710b configured in accordance with aspects of the disclosed technology. As shown in FIG. 7D, the portable playback device 710b is implemented as earbuds to facilitate more private playback as compared with the out loud playback of the playback device(s) 110, similar to the headphones 710a. As shown, the portable playback device 710b (also referred to as earbuds 710b) includes a housing 716b to support a pair of transducers 714b within a user's ears. The earbuds 710b also include a user interface 713b with a touch-sensitive region to facilitate playback controls such as transport and/or volume controls. The earbuds 9710b can be in the form of wired, wireless, or true wireless earbuds.

Figure 7E:
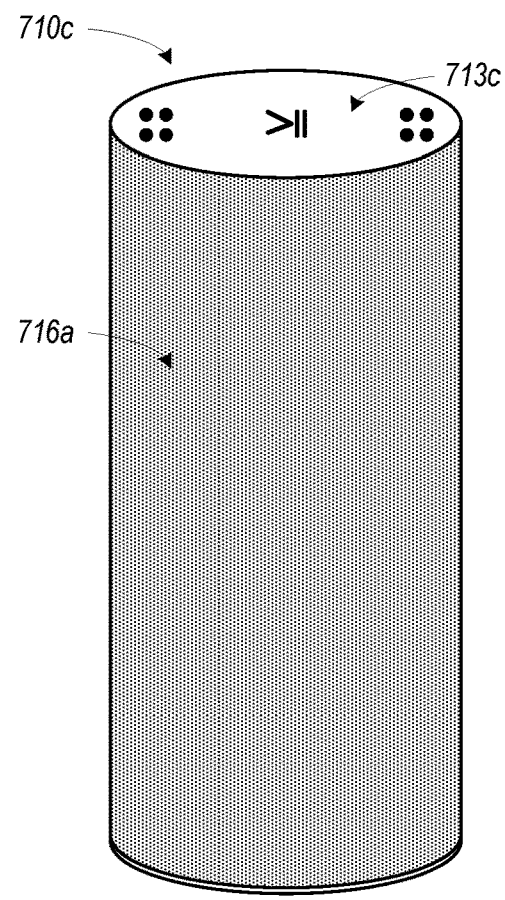
FIG. 7E is a front isometric view of a portable playback device configured in accordance with aspects of the disclosed technology.

FIG. 7E is a front isometric view of the portable playback device 710c. As compared with the headphones 710a and the earbuds 710b, the portable playback device 710c includes one or more larger transducers to facilitate out loud audio content playback. A speaker grill 716a covers the transducers. Relative to the playback device(s) 110, the portable playback device 710c may include less powerful amplifier(s) and/or smaller transducer(s) to balance battery life, sound output capability, and form factor (i.e., size, shape, and weight) of the portable playback device 710c. The portable playback device 710c includes a user interface 713c with a touch-sensitive region to facilitate playback controls such as transport and/or volume controls.

Figure 7F:
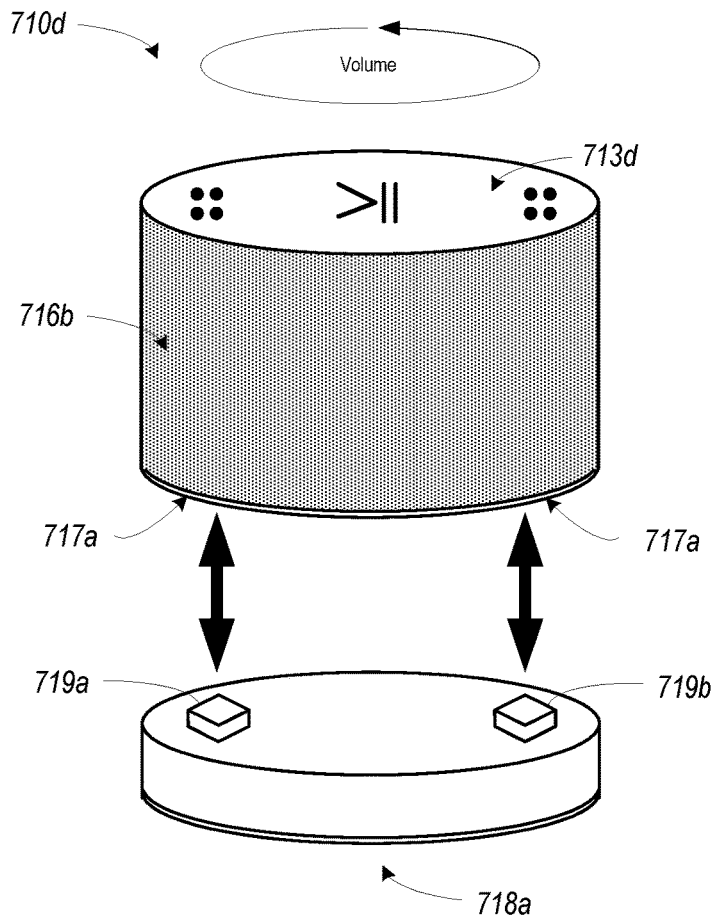
FIG. 7F is a front isometric view of a portable playback device with a device base configured in accordance with aspects of the disclosed technology.

Some portable playback devices 710 are configured to be placed upon a device base 718. To illustrate, FIG. 7F is a front isometric view of the portable playback device 710d, which is configured to be placed upon a device base 718a. Like the portable playback device 710c, as compared with the headphones 710a and the earbuds 710b, the portable playback device 710d includes one or more larger transducers to facilitate out loud audio content playback. A speaker grill 716b covers the transducers. The portable playback device 710c includes a user interface 713d with a touch-sensitive region to facilitate playback controls such as transport and/or volume controls.

The device base 718a includes protrusions 719a and 719b, which align with recesses 717a and 717b on the portable playback device 710c. Such protrusions and recesses may facilitate placing the portable playback device 710c on the device base 718a and may improve stability of the playback device while it is positioned on the device base 718a.

In example implementations, the portable playback device 710c is rotatable about the device base 718a to control volume of the portable playback device 710c. For instance, the portable playback device 710c may rotate with respect to the device base 718a, which may generate a volume control signal in a sensor of the portable playback device 710c and/or device base 718a. In another example, a first portion of the device base 718a is rotatable with respect to a second portion of the device base 718a. Rotation of these two portions generates a volume control signal in a sensor of the device base 718a that controls volume of the portable playback device 710c when the portable playback device 710c is placed upon the device base 718a.

The device base 718a includes a device charging system. When the playback device 710c is placed on device base 718a, the playback device 710c may draw current from the charging system to charge one or more of its batteries. In some examples, the charging system of the device base 718a includes an inductive charging circuit (e.g., a coil that induces a current in a corresponding coil in the playback device 710c that wirelessly charges one or more batteries of the playback device 710c). Alternatively, the charging system of the device base 718a includes conductive terminals by which the playback device 710c may draw current from the device base 718.

Within examples, the device base 718a carries an identifier that distinguishes that device base 718a from at least some other device bases (e.g., other device bases of the media playback system 100, or perhaps other devices bases more broadly). In some implementations, the device base 718a may passively communicate this identifier to the playback device 710c when it is placed upon the device base 718a. For instance, a charging circuit of the device base 718 may include a current or voltage signature (i.e., a pattern) that is unique as compared to other device bases. The playback device 710c may use this unique signature to identify the device base 718. Alternatively, a charging circuit may superimpose a signal onto the current delivered from the device base 718a (e.g., current from the device base 718a may include a higher frequency signal carrying the identifier of the device base 718a). In further examples, the device base 718a includes an RFID tag, QR code, or other identifying component that is read by the playback device 710c when the playback device 710c is placed upon the device base 718a.

In some implementations, the device base(s) 718 of the media playback system 100 are associated with respective zones. Placing a portable playback device 710 on a device base causes the device base to join the associated zone. Additional details regarding device bases can be found, for example, in U.S. Pat. No. 9,544,701 entitled, "Base Properties in a Media Playback System," which is incorporated herein by reference in its entirety.

In some implementations, the device base 718a includes a control system. Example control systems of the device base 718a include one or more processors and memory. The processor(s) may be clock-driven computing components that process input data according to instructions stored in the memory. Example operations include communicating via a communications interface (e.g., a BLUETOOTH® interface) with playback device 710c (e.g., to cause the playback device 710c to join an associated zone via one or more instructions) and causing the charging system to supply current to playback device 710c, among other examples.

Within example implementations, the playback device 710 may operate in one of a first mode and a second mode. Generally, the playback device 710 operates in the first mode while in the physical proximity of the media playback system 100 (e.g., while in the home and connected to the network 104) to facilitate interoperability with the playback devices 110a-n of the media playback system 100 and operates in the second mode while "on the go," but the playback device 710 may also be operable in the second mode while in the physical proximity of the media playback system 100. The portable playback device 710 may switch between modes manually (e.g., via user input to a user interface 713) or automatically (e.g., based on proximity to one or more playback devices 110a-n, connection to the network 104, and/or based on the location of the mobile device).

The playback device 710 may operate in the first mode while connected to a wireless local area network (e.g., the network 104). Through the connection to the wireless local area network, the playback device 710 may stream audio content from one or more audio sources, including local and remote (e.g., cloud) network locations. Further, in the first mode, the portable playback device 710 may interface with other devices of the media playback system 100. For instance, the portable playback device 710 may form synchrony groupings or other arrangements with the playback devices 110a-n and/or other portable playback devices 710 in the first mode. Further, in the first mode, the portable playback device 710 may be controlled by the control device(s) 130 in the same or similar manner as the playback device(s) 110.

The playback device 710 may operate in a second mode when connected via BLUETOOTH (802.15) to a mobile device. In some aspects, in the second mode, the portable device operates similarly to conventional BLUETOOTH speakers or wearable devices. That is, the playback device 710 may pair with a mobile device, such as a smartphone or tablet, and the user may play back the audio output of the mobile device. Similarly, the microphones 715a of the portable playback device 710 may provide audio input to the mobile device. As noted above, this mode can be utilized "on the go" to facilitate playback away from the media playback system 100, for example, outside the range of a home network. Further, this mode can be used in proximity to the media playback system 100, which may facilitate more private use of the portable playback device 710a or provide convenient access to content on the mobile device for playback.

Figure 7G:
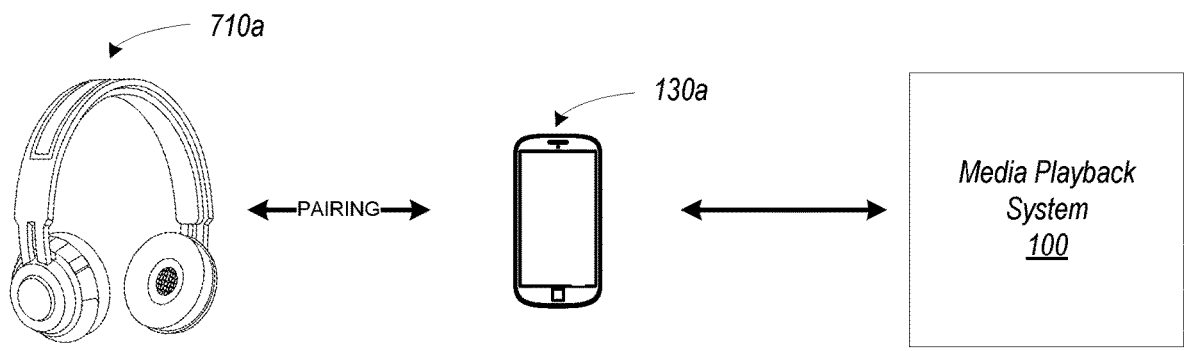
FIG. 7G is a schematic diagram illustrating an example pairing configuration between a portable playback device and a control device.

FIG. 7G illustrates an example pairing arrangement between the headphones 710a and a mobile device configured as a control device 130a. As noted above, a mobile device may become a control device 130 via the installation of control application software, which may further provide bridging features to facilitate the control device 130a operating as an interface between the headphones 710a and the media playback system 100.

The control device 130a may include communications interface(s), processing capabilities, and/or other features that are not necessarily implemented in the portable playback device 710a. By "pairing" the portable playback device 710a to the control device 130a, the portable playback device 710 is able to utilize some of these features. This arrangement may permit the portable playback device 710a to be smaller and more portable, to draw less power, and/or to be less expensive, among other possible benefits.

For instance, in various implementations, the portable playback device 710a may be implemented with or without a communications interface to connect to the Internet while "on the go" (e.g., a cellular data connection). By pairing the portable playback device 710a to the control device 130a via a personal area connection such as Bluetooth® (IEEE 802.15) or a wireless local area network connection (IEEE 802.11), the portable playback device 710a may stream music via an Internet connection of the control device 130a and the pairing connection. In embodiments that include a wireless local area network interface, the portable playback device 710a may connect directly to a wireless local area network (e.g., the network 104 (FIG. 1B)) if available.

Similarly, in various implementations, the portable playback device 710a may be implemented with or without a wireless local area network interface. By pairing the portable playback device 710 to the control device 130a via a personal area connection such as Bluetooth® (IEEE 802.15), the portable playback device 710a may stream music via an Internet connection of the control device 130a and the pairing connection. In this example, the Internet connection of the bridge device 860 may be a wireless local area network having a gateway to the Internet or via a cellular data connection.

In an example implementation, the control device 130a is bonded or defaults to a particular playback device (e.g., playback device 110c), bonded zone of playback device (e.g., playback devices 110l and 110m) or group of playback devices e.g., a "Kitchen+Dining Room" Group). Alternatively, if the home graph hierarchy is utilized, the control device 130a may be bonded to or defaults to joining a particular Set, Room, or Area. Then, in this configuration, control of the bonded playback device(s) 110 via a NMD 120 or a control device 130 also controls the paired portable playback device 710a.

Alternatively, the control device 130a may itself form a zone or Set. For instance, in one example, control device 130a may be configured as a "Anne's Portable" zone or an "Anne's Headphones" Set. Configuring the control device 130a as a zone or Set facilitates control of the paired headphones 710a with the NMD(s) 120 and/or the control device(s) 130 of the media playback system 100.

In an alternative implementation, the portable playback device 710a may independently interface with the media playback system 100 as its own zone or Set. Such an implementation of the portable playback device 710a may include a cellular data connection to facilitate portable streaming (i.e., streaming away from the media playback system 100 and/or the network 104). In this example, the portable playback device 710a may join the media playback system 100 as a zone or Set when connected to the network 104 or otherwise in proximity to the playback device(s) 110.

VI. Example Swap Techniques

As noted above, example techniques described herein relate to transitions (or "swaps") of a playback session between a portable playback device 710 and one or more playback device(s) 110. During a playback session swap, playback of audio content stops at a "source" playback device and starts at a "target" playback device at the same or substantially the same offset within the audio content. For instance, the media playback system 100 may swap playback between a "source" portable playback device 710 and the one or more "target" playback device(s) 110. In further examples, the media playback system 100 may swap playback between one or more "source" playback device(s) 110 and a "target" portable playback device 710.

To illustrate, a user may begin listening to audio content via the headphones 710a or earbuds 710b while "on the go" and then swap playback of the audio content to one or more playback devices 110a-n to continue listening to the audio content out loud at home. In another example, a user may begin listening to audio content via the headphones 710a or earbuds 710b at home (perhaps so as not to disturb another person in the home) and then swap to one or more playback devices 110a-n to continue listening to the audio content out loud. In a third example, a user may begin listening to audio content out loud via the portable playback device 710c and then swap to one or more one or more playback devices 110a-n, as the target playback device(s) may have greater sound output capabilities (e.g., due to more powerful amplifier(s) and/or larger transducer(s)), be located in a different room, be configured in a synchrony group, or for any other reason.

Similarly, a user may be listening to audio content via one or more playback devices 110a-n and then swap playback of the audio content to the portable playback device 710. For example, a user may be listening to television audio in the den 101d (including playback devices 110h, 110i, 110j, and 110k) and then swap playback to earbuds 710b for more personal listening. As another example, a user may be listening to an Internet radio station in the kitchen 101h (including playback device 110b) and then swap playback to headphones 710a to continue listening on the go. As a third example, a user may be listening to music in the bedroom 101c (including playback device 110g) and swap playback to portable playback device 710c to take the music out to the yard.

A playback device that has an on-going playback session may maintain or have access to playback session data that defines and/or identifies the playback session. The playback session data may include data representing a source of the audio content (e.g., a URI or URL indicating the location of the audio content), as well as an offset indicating a position within the audio content to start playback. The offset may be defined as a time (e.g., in milliseconds) from the beginning of the audio track or as a number of samples, among other examples. In example implementations, the offset may be set to a playback position in the audio content of the current playback position to allow time for the target device to start buffering the audio content. Then, the source playback device stops playback of the audio content at the offset and the target playback device starts playback of the audio content at the offset.

The playback session data may include data representing a source of the audio content (e.g., a URI or URL indicating the location of the audio content), as well as an offset indicating a position within the audio content to start playback. The offset may be defined as a time (e.g., in milliseconds) from the beginning of the audio track or as a number of samples, among other examples.

The playback session data may further include data representing playback state. Playback state may include a playback state of the session (e.g., playing, paused, or stopped). If the playback session implements a playback queue, the playback session data may include the playback queue state, such as the current playback position within the queue.

The playback queue state may also include a queue version. For example, in a cloud queue embodiment, the cloud queue server and the media playback system 100 may use the queue version to maintain consistency. The queue version may be incremented each time the queue is modified and then shared between the media playback system 100 and cloud queue server to indicate the most recent version of the queue.

Further, the playback session data may also include authorization data, such as one or more keys and/or tokens. Such authorization data may include a token associated with the user account. During a playback session swap, the media playback system 100 may verify that the token is authorized on both the source and target playback devices. The authorization data may further include a token associated with the streaming audio service, which may enable the target playback device to access the audio content at the source. Yet further, the authorization data may include a token associate with the playback session, which enables the target playback device to access the session. Other example authorization data is contemplated as well In some implementations, an input to a playback device triggers a swap. This input may be referred to as a "playback session swap input." Within examples, a playback session swap input may be provided to a user interface on the playback device, such as the user interface 313 on the playback device 320 (FIG. 7D) or the user interface 713a of the headphones 710 (FIG. 7B). Alternatively, the playback session swap input may be provided to a user interface on a control device 130, such as the user interface 430 (FIGS. 4A-4D) when the user interface 430 is controlling a particular playback device or device(s) (e.g., a zone or zone group).

The playback device receiving a playback session swap input may be referred to as the "initiating playback device." Within examples, the initiating playback device is either the source or the target for the swap. When a portable playback device 710 has a playback session on-going (e.g., the portable playback device is actively playing back audio content, or has an active, but paused, playback session) and receives a playback session swap input, the portable playback device 710 may assume that the user wants to "push" the playback session to a nearby playback device 110. Accordingly, the portable playback device 710 is identified as the source of the swap and the nearby playback device 110 is identified as the target.

Figure 8A:
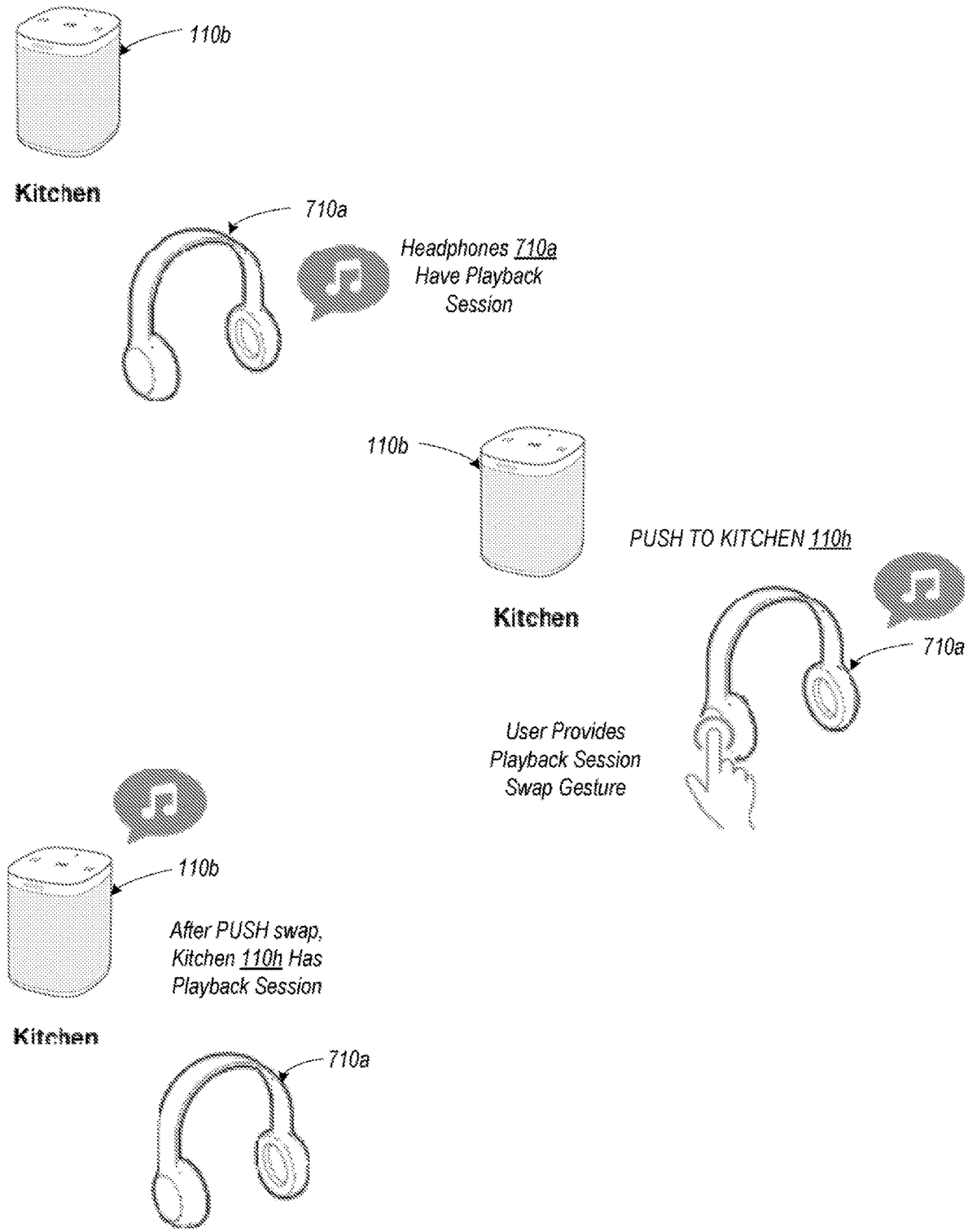
FIG. 8A is a schematic diagram illustrating an example push swap in accordance with aspects of the disclosed technology.

To illustrate, FIG. 8A is a schematic diagram illustrating an example push swap between the headphones 710a (FIG. 7C) and the playback device 110b in the Kitchen 110h zone (FIG. 7A). As shown in FIG. 8A, initially, the headphones 710a have a playback session on-going. Then, the user provides a playback session swap gesture to the headphones 710a. The playback session on the headphones 710a is pushed to the playback device 110b. After the push, the Kitchen 110h zone receives information about the playback session and continues playback of the playback session, which is on-going on the playback device 110b.

Figure 8B:
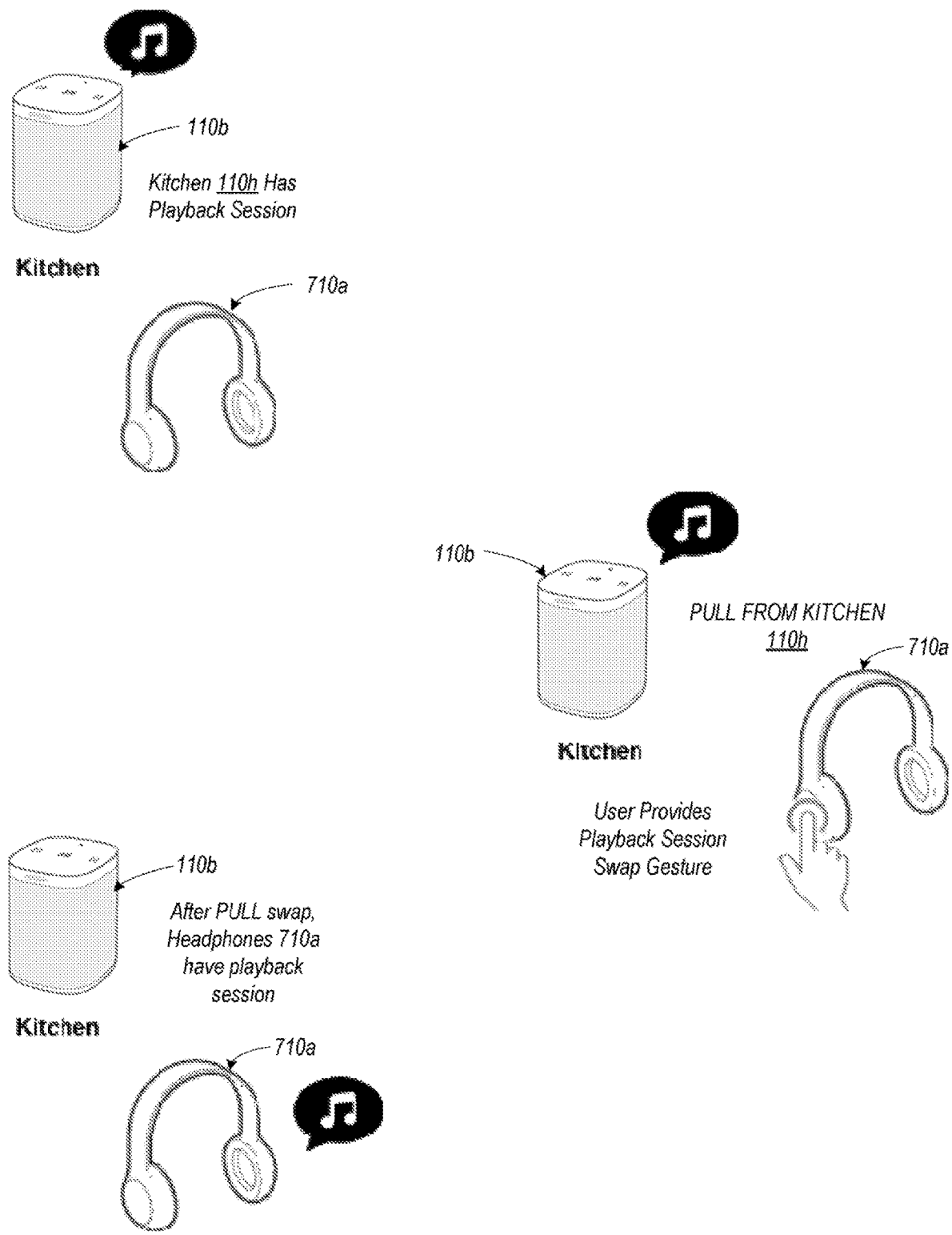
FIG. 8B is a schematic diagram illustrating an example pull swap in accordance with aspects of the disclosed technology.

Conversely, if the portable playback device 710 does not have a playback session on-going and receives a playback session swap input, the portable playback device 710 will assume that the user wants to "pull" a playback session from a nearby playback device 110. Here, the portable playback device 710 is identified as the target of the swap and the nearby playback device 110 is identified as the source. To illustrate, FIG. 8B is a schematic diagram illustrating an example pull swap between the headphones 710a (FIG. 7C) and the playback device 110b in the Kitchen 110h zone (FIG. 7A). As shown in FIG. 8B, initially, the playback device 110b has a playback session on-going. Then, the user provides a playback session swap gesture to the headphones 710a. The playback session on the playback device 110b is pushed to the headphones 710a. After the push, the headphones 710a have the playback session.

Figure 8C:
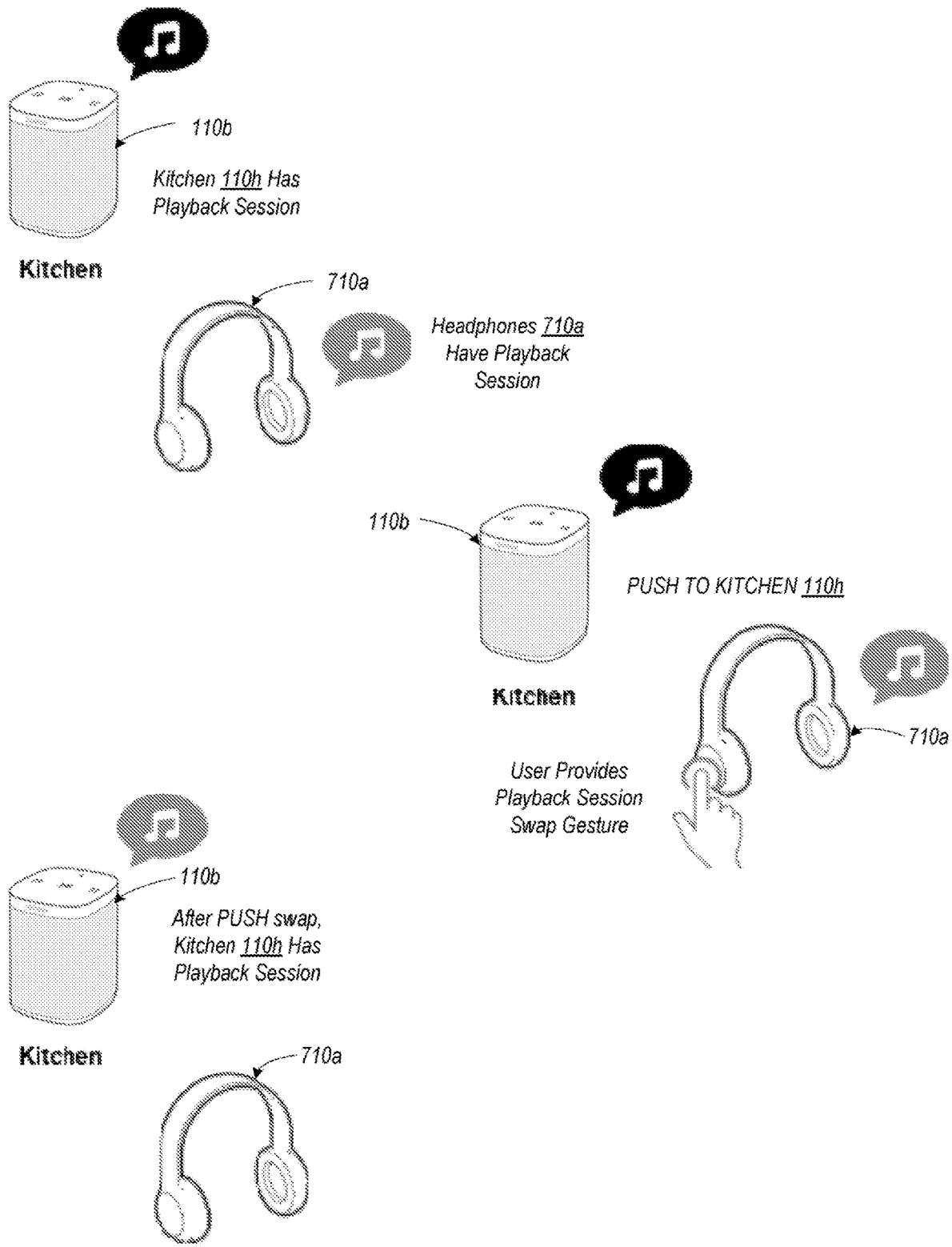
FIG. 8C is a schematic diagram illustrating an example push swap in accordance with aspects of the disclosed technology.

If both the portable playback device 710 and the nearby playback device 110 have on-going playback sessions, it may be unclear whether the user wants to push the playback session on the portable playback device 710 to the nearby playback device 110 or pull the playback session on the nearby playback device 110 to the portable playback device 710. In some implementations the portable playback device 710 may assume that the user would like to "push" the playback session to a nearby playback device 110. To illustrate, FIG. 8C is a schematic diagram illustrating an example push swap between the headphones 710a (FIG. 7C) and the playback device 110b in the Kitchen 110h zone (FIG. 7A). As shown in FIG. 8C, initially, both the headphones 710a and the playback device 110b have a playback session on-going. Then, the user provides a playback session swap gesture to the headphones 710a. The playback session on the headphones 710a is pushed to the playback device 110b. After the push, the Kitchen 110h zone has the playback session from the headphones 710a, which is on-going on the playback device 110b. If the user would instead like to "pull" the playback session on the nearby playback device 110 instead, the user may stop the playback session on the portable playback device 710 first, then provide a playback session swap input to the portable playback device 710. In alternate implementations, the portable playback device 710 may be configured to make the opposite assumption.

In the FIG. 8A-8C examples, the initiating device is the headphones 710a. In other examples, the user may provide a playback session swap input to one of the playback devices 110, such as the playback device 110b. In this scenario, similar assumptions may apply in designating the source and target of the swap. In particular, when the playback device 110b has a playback session on-going and receives a playback session swap input, the playback device 110b may assume that the user wants to "push" the playback session to a nearby portable playback device 710. Conversely, if the playback device 110b does not have a playback session on-going and receives a playback session swap input, the playback device 110b will assume that the user wants to "pull" a playback session from a nearby portable playback device 710.

Within examples, the initiating playback device of a swap may identify the other playback devices in the swap based on proximity to the initiating playback device. That is, the initiating playback device may identify one or more nearby playback devices as targets for a push swap from the initiating playback device or as a source for a pull swap to the initiating playback device. After or based on receiving a playback session swap input, the initiating playback device may identify such nearby playback devices automatically (i.e., without necessarily receiving further user input from the playback session swap input).

VII. Identifying Presence of Nearby Playback Devices Using Audio Signals

Some example techniques for identifying the presence of nearby playback devices involve audio-based identification. In exemplary audio-based identification techniques, the initiating playback device requests that swap-eligible playback devices emit an identifiable sound audio signal (such as an audio chirp), which can be detected by one or more microphones of the initiating playback device. The initiating playback device may then identify nearby playback devices based on the characteristics of the detected audio signal(s). In certain examples, the initiating playback device is known as a receiving device, and may be, for example, a portable playback device.

Figure 9:
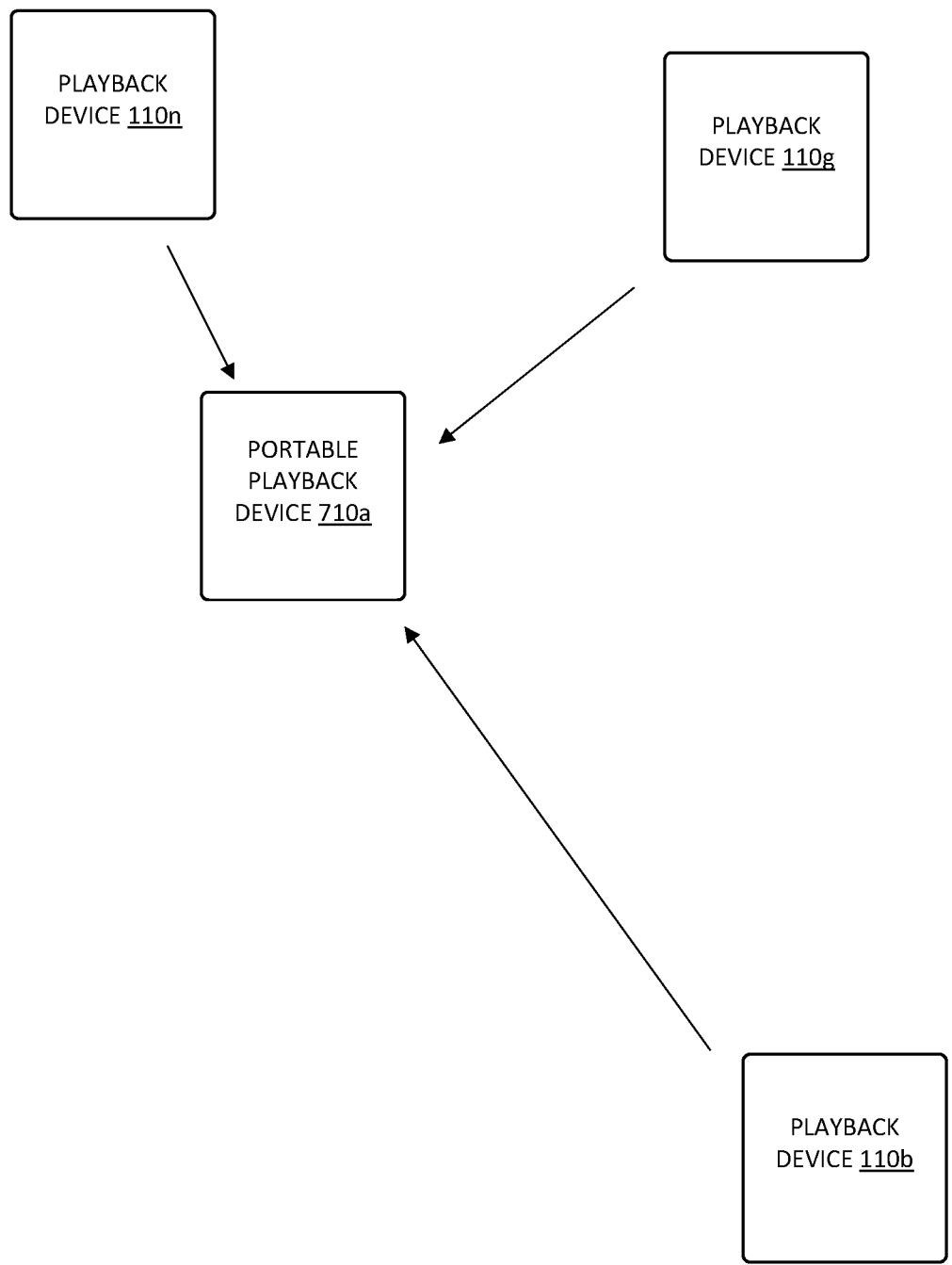
FIG. 9 is a schematic diagram illustrating an example audio-based identification technique in accordance with aspects of the disclosed technology.

To illustrate, FIG. 9 is a schematic diagram illustrating an audio-based identification technique using audio signals, such as audio chirps. An audio signal can be represented by a time-frequency representation, having identifiable acoustic characteristics or patterns (such as one or more tones of particular frequencies or symbols) over time. The audio signal may be an identifier or a code for the playback device playing the audio signal.

Each tone or symbol can be in the form of a pulse where the tone has a duration, envelope length, and a guard interval. The duration of a particular tone can be the time between the beginning and end of the pulse (e.g., 5-15 milliseconds), and the envelope length can be the length of time that pulse takes to reach maximum magnitude from zero (e.g., 1-10 milliseconds). The guard interval (i.e. an interval of time) is a period of silence between each tone or before the following tone (e.g., 10-50 milliseconds, such as between about 30-50 milliseconds).

In some instances, the identifier of the playback device may be mapped to a pseudorandom code in a code division multiple access (CDMA) modulation scheme. In another example, at least part of the reference audio signals are generated via an algorithm, such as a pseudorandom algorithm. The reference audio signals may be based on Gold codes, Walsh/Hadamard codes, etc. In one example, the reference audio signals are generated using a linear-feedback shift register. In other examples, at least part of the reference audio signals are manually generated. The reference audio signals maybe be configured to have low or minimal cross-correlation with other reference audio signals. Hamming correlation may be used to compare reference audio signals to determine their similarity or cross-correlation, in certain examples.

To enable identification of the transmitting playback device, the time-frequency representation of an audio signal can be unique to each playback device transmitting the audio signal. In the example of FIG. 9, a user has initiated a swap on a portable playback device 710 (headphones 710a in this example). From hereafter, the portable playback device 710a is referred to as a receiving device 710a because it subsequently receives/detects audio signals, as will be further described. In some instances, the initiating device and the receiving device are the same device.

As noted above, if a playback session is on-going on the receiving device 710a when the playback session swap input is received, the receiving device 710a will assume that the user desires to push the playback session to one or more nearby playback devices (such as the nearest playback device). Otherwise, the receiving device 710a will assume that the user desires to pull a playback session from one or more nearby playback devices (such as the nearest playback device) to the receiving device 710a. The receiving device 710a may be configured to operate on other assumptions in alternative examples.

After or based on receiving a playback session swap input (such as a button press on the receiving device 710a), the receiving device 710a may identify swap-eligible playback devices in the media playback system 100. For a push swap, the set of swap-eligible playback devices may include playback devices of a certain type or that are assigned a certain role in the media playback system 100. For instance, other portable playback devices may be configured as ineligible for swap. As another example, only the master in a bonded zone (e.g., a stereo pair or surround sound configuration) may be considered swap eligible. For a pull swap, the set of swap-eligible playback devices include playback devices that have on-going playback sessions. This set may be further narrowed based on other factors, such as those noted above.

As noted above, the playback devices 110 in the media playback system 100 may maintain or have access to state variables representing the state of the playback devices and other configuration information. This state information is updated periodically or on an event-based basis (e.g., when state changes), such as via subscriptions to certain types of events or statuses (e.g., playback event, grouping event, topology change event, player volume event, group volume event, playback metadata event) and notifications of specific events. The protocol used for the subscriptions may be uPnP based, a proprietary event notification protocol, or an API.

Portable playback devices 710, including the receiving device 710a and earbuds 719b, may similarly maintain or have access to these state variables and determine the set of swap-eligible playback devices based on the information in the state variables. The state variables may be received from another playback device in the media playback system and/or received from state information stored in a remote computing system in the cloud. In FIG. 9 example, the receiving device 710a has identified the playback device 110b, the playback device 110g, and the playback device 100n as swap-eligible playback devices.

After identifying the swap-eligible playback devices, the receiving device 710a, causes the swap-eligible playback devices to emit respective audio signals. For example, the receiving device 710a may send commands to the playback device 110b, the playback device 110g, and the playback device 100n to cause these playback devices to emit audio signals. In some examples, swap-eligible playback devices are not identified, and instead all devices within the playback system receive a command to output a respective audio signal.

In some examples, the audio signals may be ultrasonic (e.g., greater than 20 kHz) or near-ultrasonic (e.g., 18-20 kHz). Audio signals in such frequencies may avoid propagation of the audio signal outside the proximity of the emitting playback device. Further, such signals may also avoid user distraction.

Each audio signal may include data in the form of an encoded identifier. Each encoded identifier may be different and encoded as a set of tones, which is known to the receiving device 710a. The audio signals can be transmitted by the swap-eligible playback devices simultaneously, concurrently, sequentially or when the particular playback device receives the command/instruction to transmit the audio signal. In some examples, a device in the media playback system may provide timing information as to when to transmit the audio signal for each of the playback devices and/or a duration of the audio signal.

After instructing the swap-eligible playback devices to emit the audio signal, the receiving device 710a attempts to detect the emitted audio signals via one or more microphones (e.g., the microphones 715). For instance, the receiving device 710a may attempt to detect the emitted audio signals via one or more voice microphones in the housing of the receiving device 710a. Alternatively, the receiving device 710a may attempt to detect the emitted audio signals via one or more ANC microphones in the housing of the receiving device 710*a*. In some instances, particular microphones (ANC or voice) may be selected or tuned to be sensitive to the ultrasonic or near-ultrasonic range such that these microphones are particularly suited to receiving the audio signals. Other examples are possible as well, such as a dedicated microphone selected or tuned to receiving the audio signals.

To identify the closest/nearest playback device, the receiving device 710*a* may compare the detected audio signals. For instance, the receiving device 710*a* may compare various metrics such as sound pressure levels and/or signal-to-noise ratios of the detected audio signals to identify the "loudest" audio signal (e.g., based on detected sound pressure level), which may be assumed to have been emitted by the playback device that is physically nearest to the receiving device 710*a*. In example implementations, the receiving device 710*a* may list or otherwise rank the swap-eligible playback devices by relative signal strength (e.g., SNR) and then select the highest ranked swap-eligible playback device as the source or target for the swap.

To facilitate comparison between the detected audio signals, the swap-eligible playback devices may emit the audio signals at the same or substantially the same volume level. In some cases, the instructions to emit the audio signals include instructions to change to a certain volume level (e.g., decibel, volume level setting). Since different playback devices have different types of transducers and/or amplifiers, the volume level for each playback device emitting the signal may vary based on the type of device. Alternatively, the playback devices may be pre-configured to emit audio signals at the certain volume level taking into account these differences.

The playback session swap input may take various forms. For instance, a particular input to user interface 713*a* of the headphones 710 (FIG. 7B) such as a tap or gesture to the touch sensitive region (or a portion thereof) may trigger the swap. In further examples, the portable playback device 710 may include a physical button to trigger the swap. Yet further, a pattern of touch-inputs (e.g. short, long, short) or a tracing pattern (e.g., a shape such as a zig-zag or triangle) may trigger a swap. Other types of inputs are contemplated as well.

The process of identifying the closest/nearest playback device will now be described in more detail. As mentioned above, the swap-eligible playback devices output respective audio signals which can be used to identify the playback device. These audio signals correspond to respective reference audio signals, where each reference audio signal is associated with a playback device. These audio signals may be unique to each playback device in existence, or may be unique to each playback device within a playback system. Each reference audio signal can be represented by a time-frequency representation.

Figure 10A:
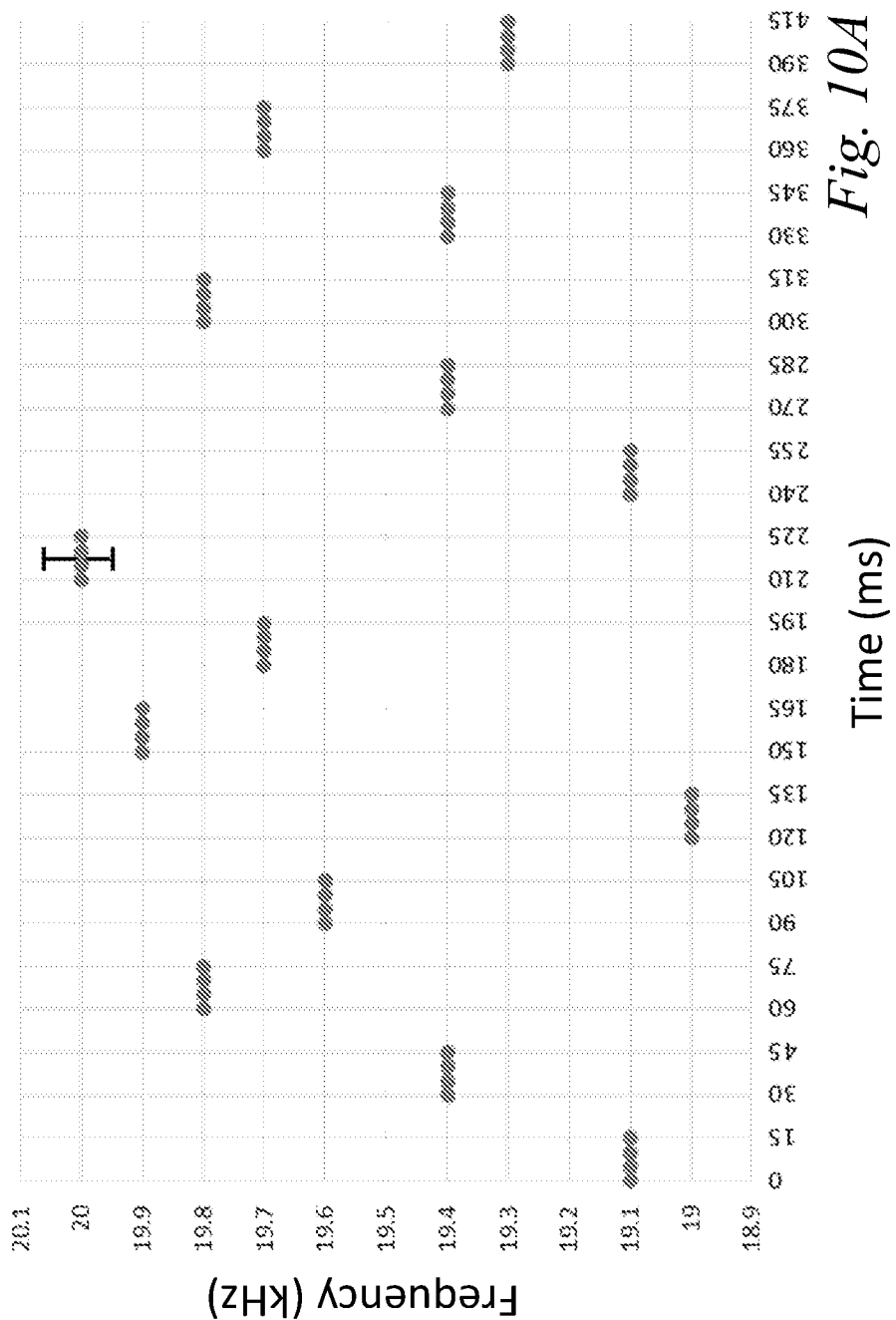
FIG. 10A is an example time-frequency representation of a first reference audio signal in accordance with aspects of the disclosed technology.
Figure 10C:
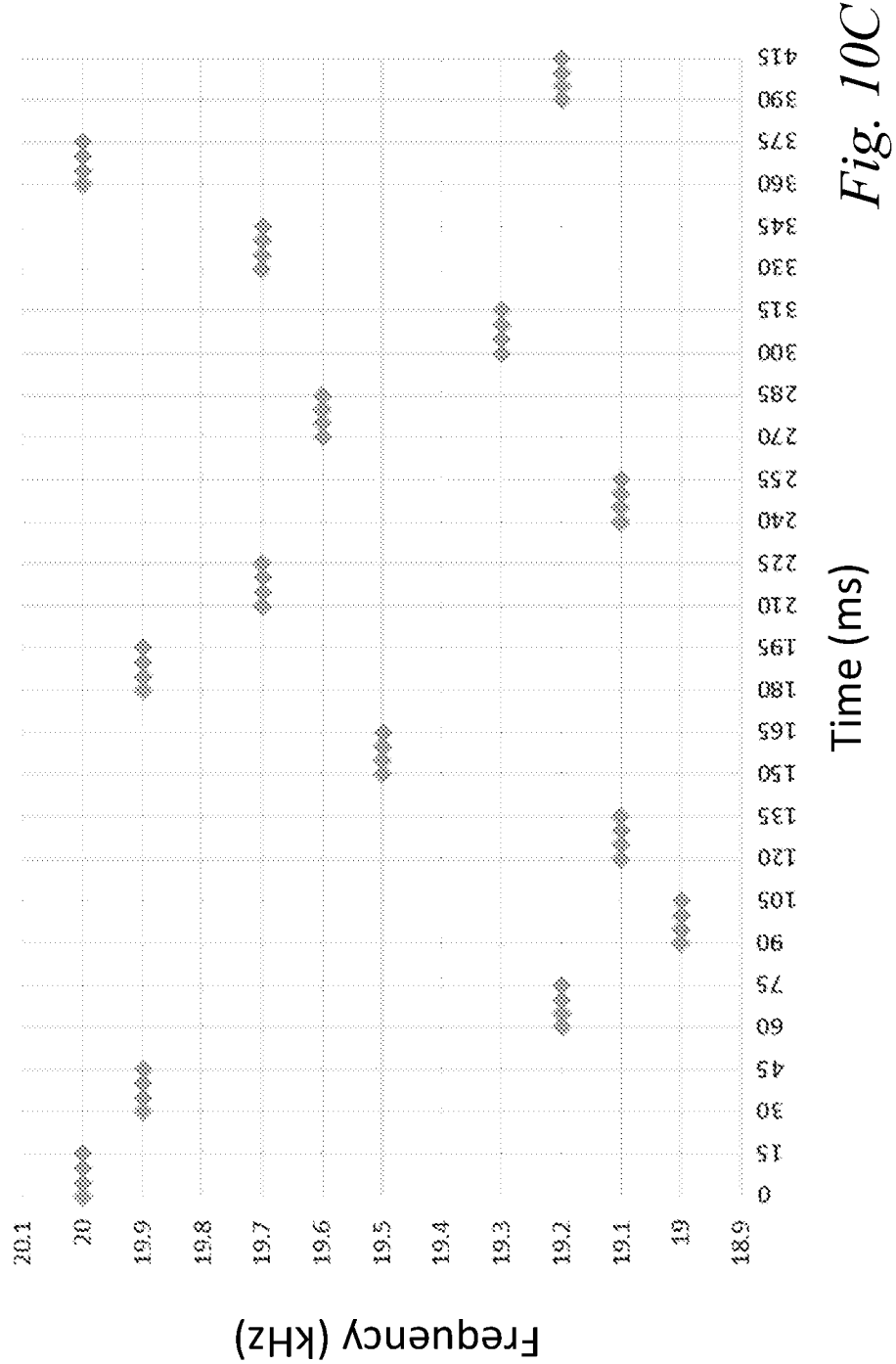
FIG. 10C is an example time-frequency representation of a third reference audio signal in accordance with aspects of the disclosed technology.

FIG. 10A depicts a first time-frequency representation associated with a first reference audio signal. The first reference audio signal may be output by a first playback device, such as playback device 110*n* in FIG. 9. FIG. 10B depicts a second time-frequency representation associated with a second reference audio signal. The second reference audio signal may be output by a second playback device, such as playback device 110*g* in FIG. 9. FIG. 10C depicts a third time-frequency representation associated with a third reference audio signal. The third reference audio signal may be output by a third playback device, such as playback device 110*b* in FIG. 9.

As can be seen in each of FIGS. 10A, 10B and 10C, a time-frequency representation indicates how the constituent frequencies of an audio signal vary over time. The time-frequency representation is therefore a view of an audio signal represented over both time and frequency. The reference audio signals differ for each playback device, and can therefore be used to identify the transmitting playback device.

As shown, each reference audio signal comprises a plurality of tones, where each tone has a predefined frequency. Referring to FIG. 10A, the example reference audio signal has 14 tones, each with a frequency between 19.0 kHz and 20 kHz. In this particular example, between 0ms and 15 ms, the first playback device 110*n* would output an audio signal having a frequency of 19.1 kHz and between 30 ms and 45 ms the first playback device 110*n* would output an audio signal having a frequency of 19.4 kHz. The first tone output by the first playback device 110*n* therefore has a frequency of 19.1 kHz, an initiation time of 0ms after the start of the reference audio signal, and a duration of 15 ms. The second tone output by the first playback device 110*n* has a frequency of 19.4 kHz, an initiation time of 30 ms after the start of the reference audio signal, and a duration of 15 ms.

Similarly, referring to FIG. 10B, between 0ms and 15 ms, the second playback device 110*g* would output an audio signal having a frequency of 19.0 kHz and between 30 ms and 45 ms the second playback device 110*g* would output an audio signal having a frequency of 19.6 kHz. The first tone output by the second playback device 110*g* therefore has a frequency of 19.0 kHz, an initiation time of 0ms after the start of the reference audio signal, and a duration of 15 ms. The second tone output by the second playback device 110*g* has a frequency of 19.6 kHz, an initiation time of 30 ms after the start of the reference audio signal, and a duration of 15 ms.

Similarly, referring to FIG. 10C, between 0ms and 15 ms, the third playback device 110*b* would output an audio signal having a frequency of 20.0 kHz and between 30 ms and 45 ms the third playback device 110*b* would output an audio signal having a frequency of 19.9 kHz. The first tone output by the third playback device 110*b* therefore has a frequency of 20.0 kHz, an initiation time of 0ms after the start of the reference audio signal, and a duration of 15 ms. The second tone output by the third playback device 110*b* therefore has a frequency of 19.9 kHz, an initiation time of 30 ms after the start of the reference audio signal, and a duration of 15 ms.

As shown in FIGS. 10A-10C, each reference audio signal comprises a plurality of tones, where each tone has a predefined frequency, duration and initiation time. The initiation time is the output time of a tone relative to the start of the audio signal. In these examples, the entire reference audio signals have a duration of 415 ms and each of the plurality of tones has a duration of 15 ms. In other examples, the reference audio signals may have a different duration, such as between about 400 ms and about 800 ms. Similarly, in other examples, the tones may have a duration of between about 10 ms and about 20 ms.

In addition, the plurality of tones are spaced apart in time by an interval of time. Preferably the interval of time is between about 10 ms and about 50 ms. In the examples of FIGS. 10A-10C, each tone is spaced apart by an interval of 15 ms. Thus, there is a pause or gap of 15 ms between successive tones. Having an interval between each tone can reduce interference from reverb and/or echo from previously transmitted tones. In the examples of FIGS. 10A-10C, the intervals are the same between each tone (i.e. all are 15 ms), but in other examples, the intervals may be irregular. For example, within a reference audio signal, at least one interval of time may differ to at least another interval of time. This can add to the orthogonality of the reference audio signal.

Within each reference audio signal, the frequencies of each tone are selected from a predefined set of frequencies. For example, as shown in FIGS. 10A-10C, the frequency of each tone is be selected from the following set of frequencies: 19.0 kHz, 19.1 kHz, 19.2 kHz, 19.3 kHz, 19.4 kHz, 19.5 kHz, 19.6 kHz, 19.7 kHz, 19.8 kHz, 19.9 kHz, 20.0 kHz. In other examples, each frequency within the predefined set of frequencies is between about 18 kHz and about 20 kHz. In this example, the frequency difference between each frequency within the predefined set of frequencies is 100 Hz.

The frequency difference should ideally be greater than about 50 Hz to account for the Doppler shift of the tones in case a user is moving the receiving device 710a towards or away from the playback devices 110n, 110g, 110b. In an example, a tone having a frequency of 20 kHz would be Doppler shifted by ±43 Hz if the receiving device 710a is being moved with a typical walking velocity of 0.75 m/s. Thus, referring to FIG. 10A as an example, the tone of 20.0 kHz may be detected with a frequency of 20.0±43 Hz, as shown by the error bar. Accordingly, in this example, tones should be spaced at a minimum of 86 Hz (such as 100 Hz) to remove ambiguity during detection.

As another example, a tone having a frequency of 20 kHz would be Doppler shifted by ±60 Hz if the receiving device 710a is being moved with a typical walking velocity of 1 m/s. Accordingly, to account for walking speeds of 1 m/s, tones should be spaced at a minimum of 120 Hz (such as 150 Hz) to remove ambiguity during detection. Accordingly, at walking speeds of around 1 m/s, a frequency difference of 100 Hz would not be adequate to allow accurate detection of tone frequencies. A tone of 19.9 kHz may be incorrectly detected as a tone of 20.0 kHz if Doppler shifted by 120 Hz, for example. As such, it is preferred that the frequency difference between each frequency within the predefined set of frequencies is greater than about 150 kHz.

Assuming that all three playback devices 110n, 110g, 110b are located in the same room, and they output respective reference audio signals, the resulting audio signals may combine into a single audio signal that is a superposition of all three reference audio signals. However, if the third playback device 110b, for example, is located in a different room to the first and second playback devices 110n, 110g, then its reference audio signal may not be detected and the audio signal may be a superposition of only the first and second reference audio signals output by the first and second playback devices 110n, 110g respectively.

As the three playback devices 110n, 110g, 110b output their respective reference audio signals, the (possibly combined) audio signal can be detected by the receiving device 710a to determine which playback devices are in the vicinity of the receiving device 710a.

Figure 11:
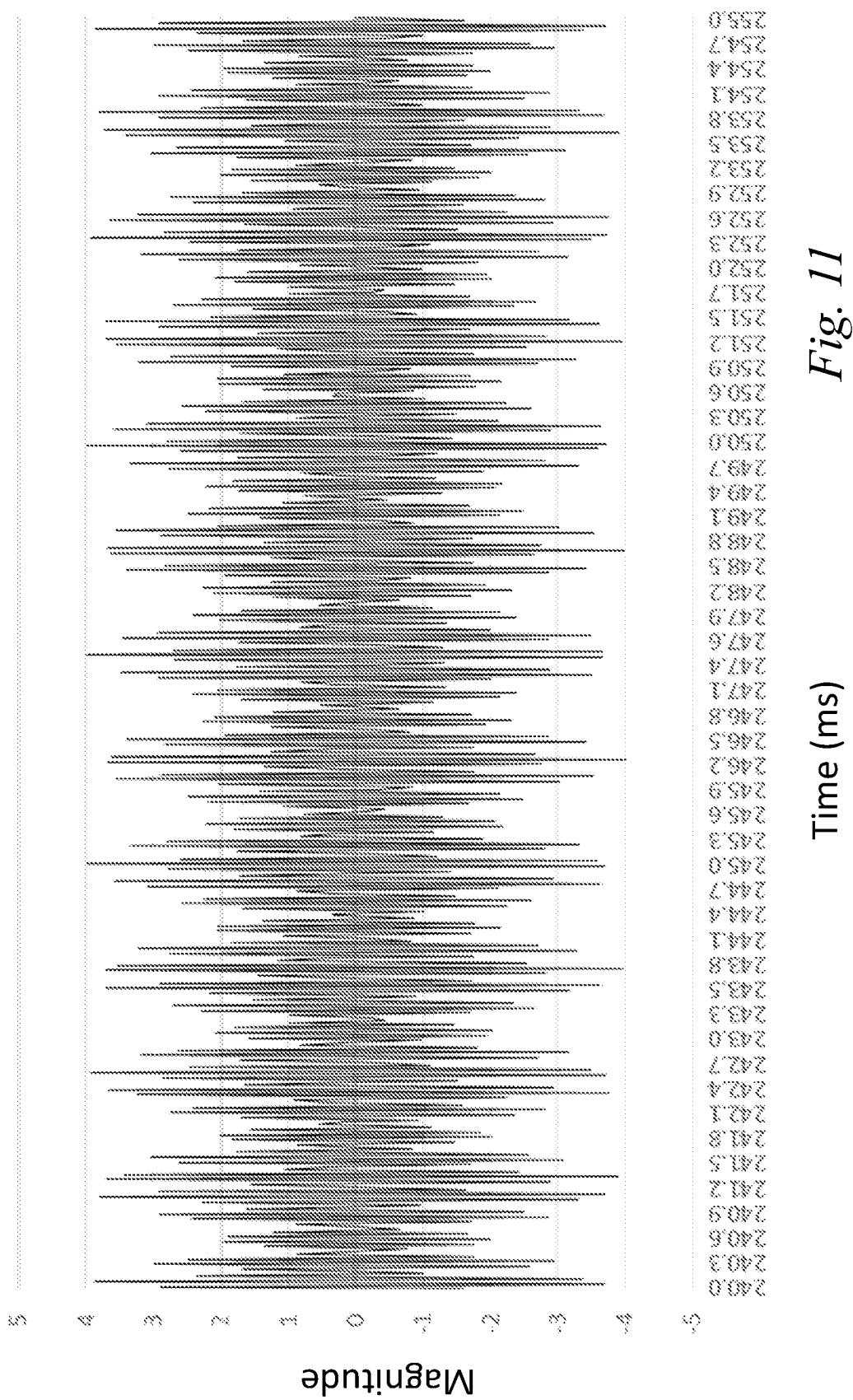
FIG. 11 is a portion of a detected audio signal in accordance with aspects of the disclosed technology.

FIG. 11 depicts a portion of an audio signal detected by the receiving device 710a during a particular time period. In this example, the audio signal is a portion of the audio signal received between 240 ms and 255 ms after the audio signal is first detected. Accordingly, the "complete" audio signal detected by the receiving device 710a would comprise a plurality of portions similar to this example portion. Each portion of the audio signal is associated with a detection time and has a particular duration. In FIG. 11, the portion of the audio signal has a detection time of 240 ms and a duration of 15 ms.

Figure 12:
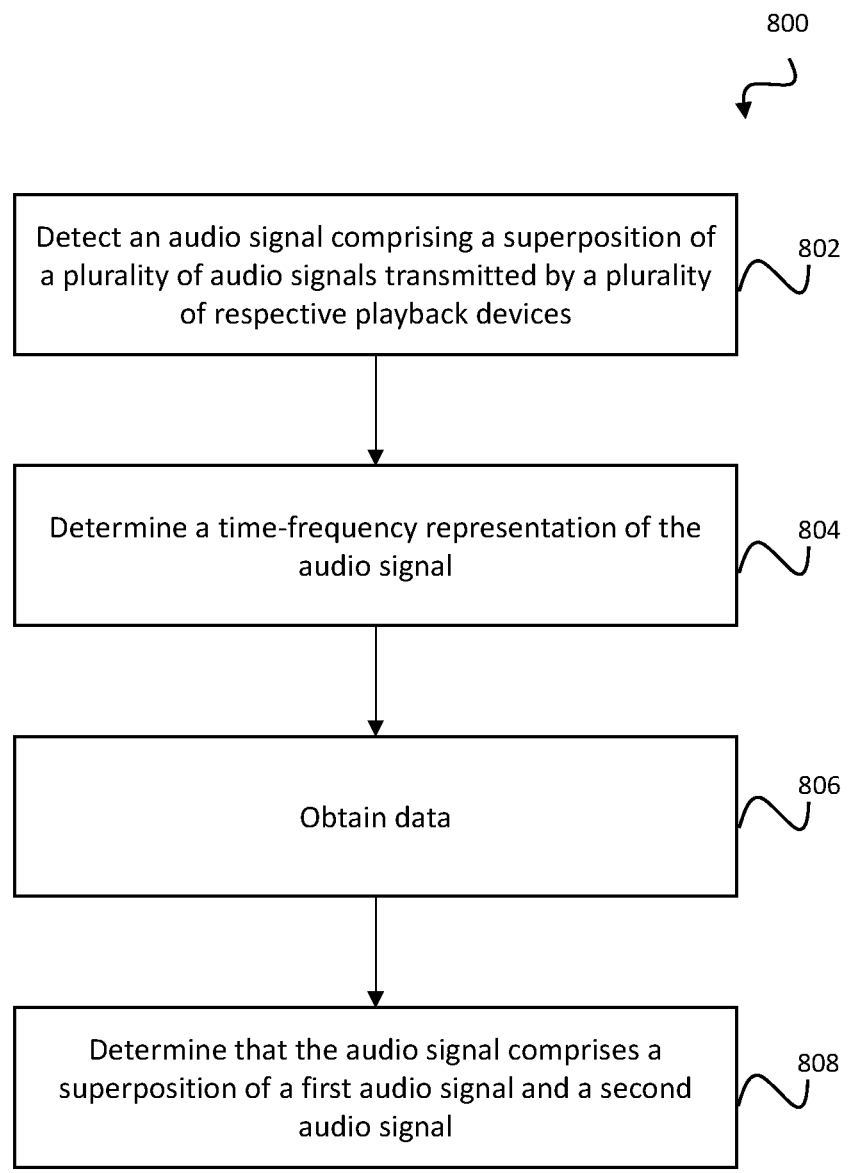
FIG. 12 is a flow diagram of a method in accordance with aspects of the disclosed technology.

FIG. 12 is a flow chart of a method 800 for analyzing an audio signal that is a superposition of a plurality of audio signals transmitted by a plurality of respective playback devices. The method may, for example, be at least partially performed by the receiving device 710a. Some method steps may be performed by one or more other devices, such as a controller device or a playback device or a remote server, for example.

At block 802, the method comprises detecting, by the receiving device 710a, an audio signal comprising a superposition of a plurality of audio signals transmitted by a plurality of respective playback devices. For example, a microphone of the receiving device 710a may detect the audio signal depicted in FIG. 11 as well as one or more other portions of the audio signal. The duration of time that the receiving device listens for the plurality of audio signals can be based on the total duration of time it takes to transmit one audio signal one or more times. For example, if the total duration for an audio signal is 700 ms and the audio signal is transmitted twice, the listening duration (or listening window) may be at 1400 ms. The audio signals may be transmitted with increasing volume levels (e.g., decibel) for the second and subsequent times.

After the complete audio signal has been detected, it can be analyzed by the receiving device 710a itself or another device, to determine or extract a time-frequency representation of the complete audio signal. Accordingly, at block 804, the method comprises determining a time-frequency representation of the audio signal. Since the audio signal could be a superposition of an unknown number of reference audio signals, the time-frequency representation of the audio signal may comprise a plurality of reference time-frequency representations.

Figure 13:
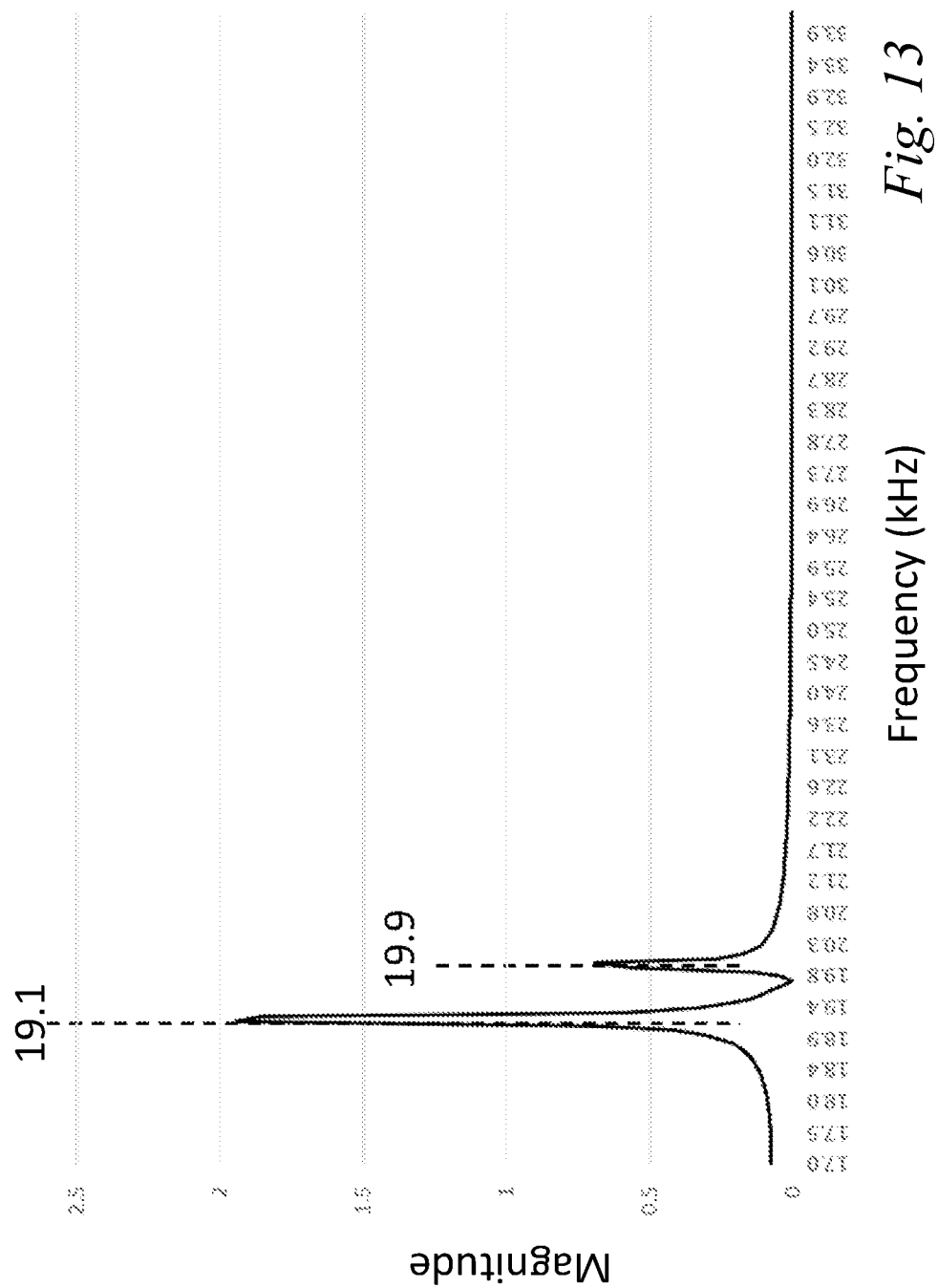
FIG. 13 is a representation of a Fourier transform of the signal of FIG. 11 in accordance with aspects of the disclosed technology.

In one example, determining a time-frequency representation of the audio signal involves performing Fourier transforms on portions of the audio signal. A Fourier transform of a time-varying signal (such as the portion of the audio signal depicted in FIG. 11) decomposes the signal into its constituent frequencies, thereby identifying the constituent frequencies within the audio signal. For example, performing a Fourier transform of the audio signal of FIG. 11 identifies that this portion of the detected audio signal has two constituent frequencies, as shown in FIG. 13. FIG. 13 therefore depicts the output of the Fourier transform of the portion of the audio signal in FIG. 11. In this example, the audio signal has two constituent frequencies, with a first frequency of 19.1 kHz and a second frequency of 19.9 kHz.

In the same way, Fourier transforms can be performed for all portions of the detected audio signal to identify the constituent frequencies as a function of time. This allows a time-frequency representation of the detected audio signal to be determined. In some examples, a constituent frequency may be determined to be present within the audio signal if the magnitude of the Fourier transform output (within a particular frequency bin) is greater than a predetermined threshold.

In another example, the audio signal is analyzed as the audio signal is received by the receiving device 710a in the form of input samples using a rolling time-frequency window. A short-time Fourier transform (STFT) can be performed on successive portions of the input samples with overlap between the successive portions. The duration of the time-frequency window can be based on the total amount of time to transmit the audio signal. For example, if the total amount of time to transmit each audio signal is 800 ms, the window duration could be 600 ms. There can be overlap in the samples processed by performing STFT at time 600 ms for a first block of samples and 1100 ms for a second block of samples. The samples in the two blocks would have a 100 ms overlap between them.

Figure 14:
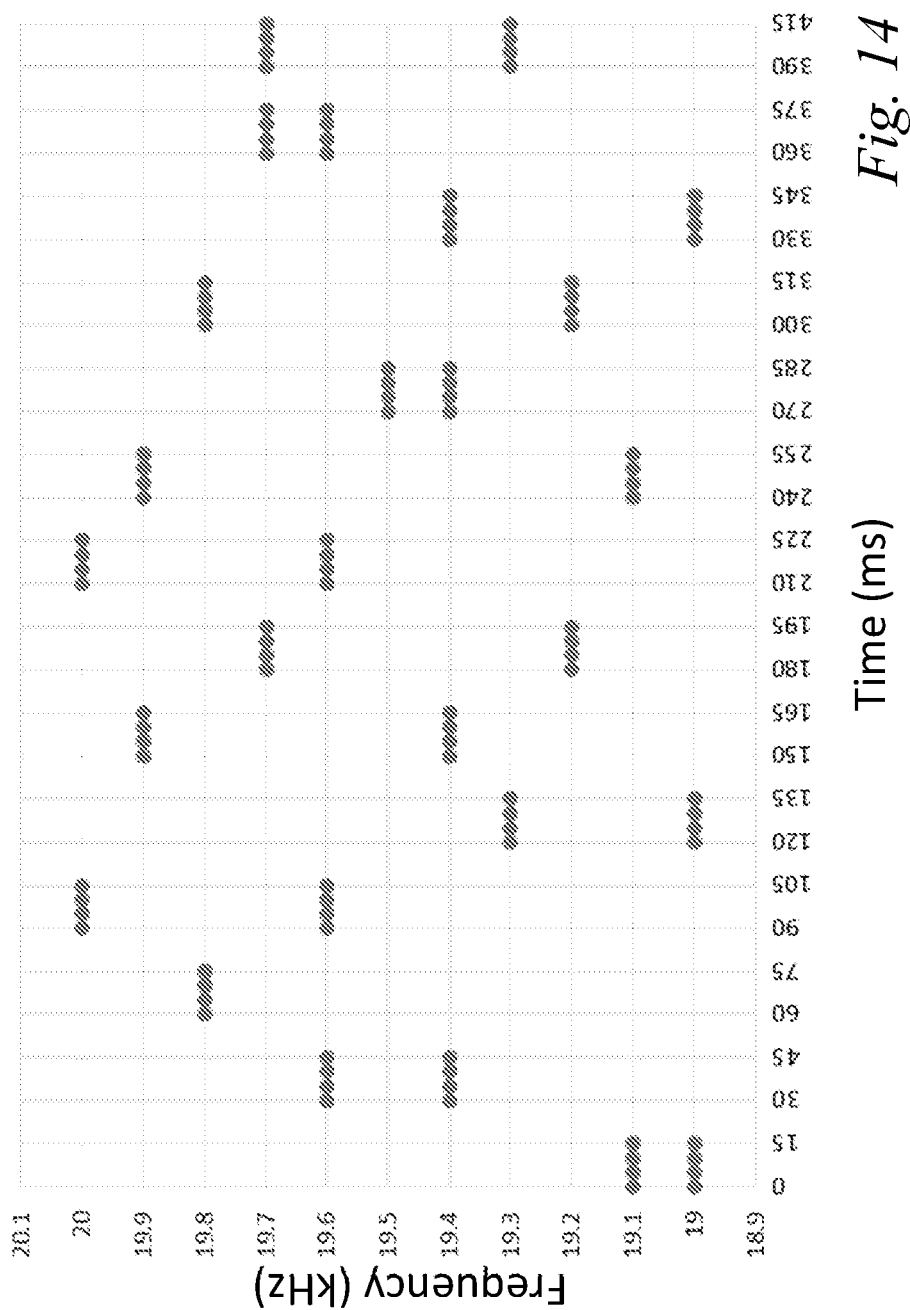
FIG. 14 is an example time-frequency representation of a detected audio signal in accordance with aspects of the disclosed technology.

FIG. 14 depicts an example time-frequency representation of a detected audio signal. Within examples, a signal of a constituent frequency is determined to be present if the magnitude of the Fourier Transform at that frequency (or within a particular frequency bin) is above a predetermined threshold. In this particular example, each portion of the detected audio signal contains two constituent frequencies, but in other examples each portion may contain any number of constituent frequencies, including zero constituent frequencies. FIG. 14 shows two constituent frequencies of 19.1 kHz and 19.9 kHz between 240 ms and 255 ms, so the Fourier Transform of FIG. 13 corresponds to the portion to the time-frequency representation from 240-255 ms in FIG. 14.

As mentioned, the time-frequency representation of the detected audio signal (shown in FIG. 14) may comprise a plurality of reference time-frequency representations. It therefore needs to be determined which of the reference time-frequency representations are present in the time-frequency representation of the detected audio signal. For example, it needs to be determined whether the first, second and/or third time-frequency representations depicted in FIGS. 10A, 10B, 10C are present in the time-frequency representation of the detected audio signal of FIG. 14. This analysis can be performed by reference to data that associates the playback devices with their respective reference audio signals, where each reference audio signal has a reference time-frequency representation.

Accordingly, the method 800 further comprises at block 806, obtaining data associating playback devices with respective reference audio signals. This data may be stored in memory of the receiving device, remote server, and/or other playback device, and may be stored within a database or a lookup table, among other examples. The data may associate a plurality of reference audio signals with respective playback devices. For example, the data may associate each playback device within the playback system with a respective reference audio signal. Block 806 may be performed by the same device that performs block 804.

Once the data has been obtained, the method 800 further comprises determining which of the plurality of reference audio signals are present within the detected audio signal. In a particular example, the method 800 therefore comprises, in block 808, determining that the audio signal comprises a superposition of a first audio signal transmitted by a first playback device and a second audio signal transmitted by a second playback device. This determination is based on the data obtained in block 806 and the time-frequency representation of the audio signal determined in block 804.

For example, the database can indicate that the first playback device is associated with the reference time-frequency representation depicted in FIG. 10A. In particular, the database may indicate that the reference time-frequency representation for the first playback device includes 14 tones and specify the frequency and duration of each tone. In addition to or instead of the frequency and duration of each of the tones, the database can identify the frequency offsets between each of the tone. For example, in FIG. 10A, the first tone is at 19.1 kHz and the second tone is at 19.4 kHz resulting in an offset of 0.3 kHz. The offsets may be used in addition to or instead of the frequencies for each tone to identify the transmitting playback device. It may be beneficial to use offsets since identification via offsets is less susceptible to misidentification because of the Doppler effect which impacts the frequency of the tones received at the receiving device.

In some examples, it may be assumed that the plurality of reference time-frequency representations are synchronized in time, so that there is no temporal offset between the plurality of reference time-frequency representations within the time-frequency representation of the detected audio signal. This would occur, for example, when the respective reference audio signals are output by the playback devices 110n, 110g, 110b at substantially the same time. However, in other examples, the respective reference audio signals may be output by the playback devices 110n, 110g, 110b at different times. This means that the time-frequency representation of the detected audio signal may comprise a plurality of reference time-frequency representations which are offset from each other in time. Accordingly, in some examples, the analysis to determine which reference time-frequency representations are present in the time-frequency representation of the detected audio signal takes into consideration this temporal offset.

Figure 15:
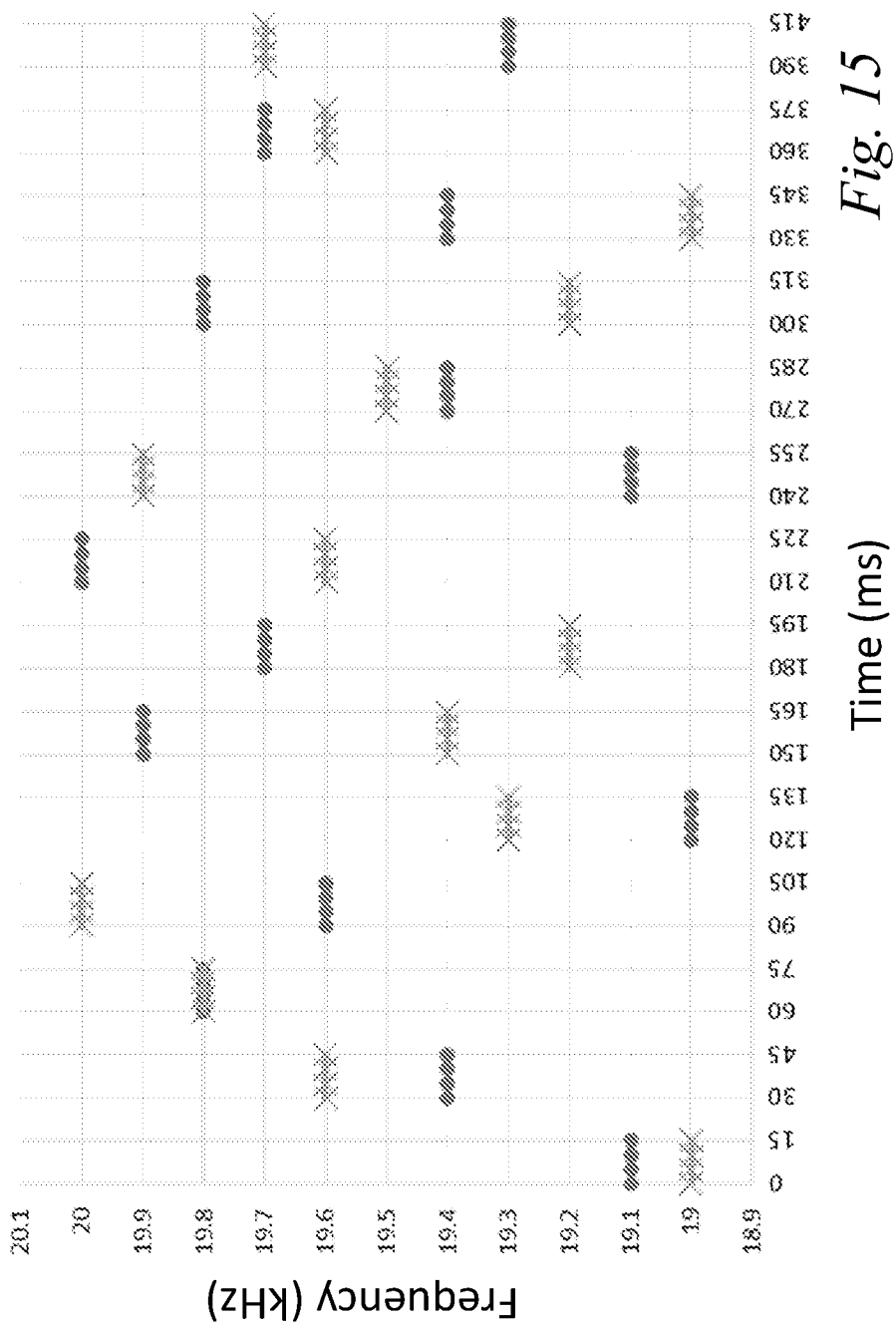
FIG. 15 is another example time-frequency representation of a detected audio signal in accordance with aspects of the disclosed technology.

In this particular example, the analysis determines that the first and second time-frequency representations are present in the time-frequency representation of FIG. 14. The detected audio signal therefore comprises a superposition of the first reference audio signal transmitted by the first playback device 110n and the second reference audio signal transmitted by the second playback device 110g. FIG. 15 depicts the first time-frequency representation of FIG. 10A overlaid with the second time-frequency representation of FIG. 10B. This resultant time-frequency representation corresponds to the time-frequency representation of FIG. 14. Furthermore, it can be determined that the audio signal detected by the receiving device does not contain the third reference audio signal transmitted by the third playback device 110b, possibly because the third playback device 110b is located in a different room to the receiving device 710a.

In some examples, it is determined that a particular reference time-frequency representation is present in the time-frequency representation of the detected signal only when all of the tones within the reference time-frequency representation are present in the time-frequency representation of the detected signal. In other examples, it may be determined that a particular reference time-frequency representation is present when a threshold quantity of the tones within the reference time-frequency representation are present. For example, it may be determined that the particular reference time-frequency representation is present within the time-frequency representation of the detected signal when greater than 80% or greater than 90% of the tones are present/matched within the time-frequency representation of the detected signal. Use of such a threshold accounts for analysis error and noise whereby certain tones may not be detected or mischaracterized.

After it has been determined which reference audio signals are present in the detected audio signal, it may be determined which of the playback devices is located nearest to the receiving device. In one example, this is achieved by determining a magnitude associated with each detected audio signal. For example, a first magnitude associated with the first reference audio signal transmitted by the first playback device 110n is determined, and a second magnitude associated with the second reference audio signal transmitted by the second playback device 110g is determined.

After this, the first and second magnitudes are compared to determine which is greatest. For example, if it is determined that the first magnitude is greater than the second magnitude it may be determined that the first playback device 110n is arranged closer than the second playback device 110g to the receiving device 710a. The magnitudes associated with each audio signal may be directly proportional to the sound pressure level of the audio signal. Thus, it may be assumed that the "loudest" audio signal (i.e. the audio signal with the highest magnitude) is located closest to the receiving device 710a.

In a particular example, the magnitudes are determined based on the Fourier transform(s) of the audio signal. For example, referring again to FIG. 13, the Fourier transform of a portion of the detected audio signal identifies two components, where a first component/tone (with a frequency of 19.1 kHz) is associated with the first reference audio signal output by the first playback device 110n, and a second component/tone (with a frequency of 19.9 kHz) is associated with the second reference audio signal output by the second playback device 110g. In this example, the magnitude of the first component associated with first reference audio signal is approximately 3 times greater than the magnitude of the second component associated with the second reference audio signal. Thus, for this portion of the detected audio signal, the magnitude of associated with the first reference audio signal is greater than the magnitude associated with the second reference audio signal. It may therefore be assumed that the first playback device 110n (which output the first reference audio signal) is closer than the second playback device 110g (which output the second reference audio signals).

Thus, in some examples, the magnitudes associated with the reference audio signals are determined from a single portion of the detected audio signal. However, in other examples, the magnitudes are average magnitudes based on a plurality of portions of the detected audio signal. For example, in the same way as described above, a plurality of magnitudes associated with each reference audio signal may be determined from a plurality of portions of the detected audio signal, and the magnitude may be the average of these.

In a particular example, the magnitude associated with each reference signal is a magnitude at a particular frequency to account for frequency variations of the magnitude. Thus, it may be more accurate to compare magnitudes of different signals at the same frequency.

After it has been determined which playback device is nearest, a playback session swap may occur between the nearest playback device and the receiving device 710a. In one example, the first playback device 110n is playing back audio content in a playback session, and is determined to be arranged nearest to the receiving device 710a. Accordingly, the playback session may transition from the first playback device 110n to the receiving device 710a, such that the receiving device 710a begins to play back the audio content. In another example, the receiving device 710a is playing back audio content in a playback session, and it is determined that the first playback device 110n is arranged nearest to the receiving device 710a. Accordingly, the playback session may transition from the receiving device 710a to the first playback device 110n, such that the first playback device 110n begins to play back the audio content.

Figure 16:
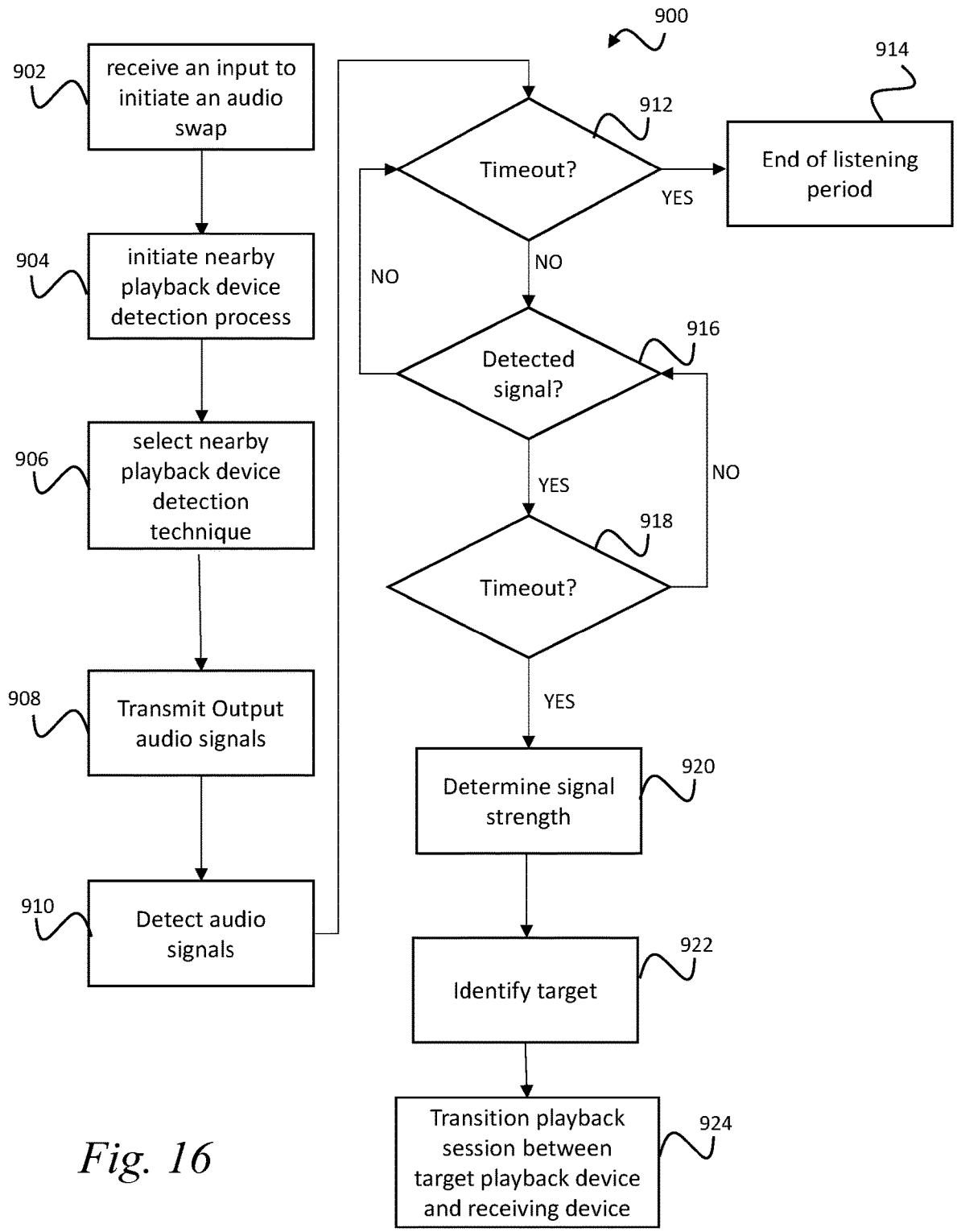
FIG. 16 is another example flow diagram of a method in accordance with aspects of the disclosed technology.

FIG. 16 depicts a flow diagram for a method 900 for performing presence detection of nearby playback devices. At block 902, the receiving device (e.g., portable playback device 710a) receives an input to initiate an audio swap. The input to initiate the audio swap may be a swap command received via an interface of the receiving device 710a (e.g., buttons, capacitive touch surface), determination of a state corresponding to detection of a predicted swap command corresponding to an input indicating a user's intent to provide a command to the receiving device, or a command received by the receiving device from a controller device over a network connection (e.g., Wi-Fi, Bluetooth, wired communication, local area network, wide area network).

The predicted swap command can be any type of user interaction with a control interface of the receiving device that may or might not result in the user providing a control command to the receiving device. For example, the swap gesture may be a press and hold of a button for two seconds on the playback device, and in response to detecting that the user has touched the button for 50 ms (e.g., an amount of time less than necessary to trigger a control command) and prior to completion of the swap gesture, the receiving device may proceed to block 904 and initiate presence detection of nearby playback devices. As yet another example, the receiving device may contain a movement sensor (e.g., accelerometer) and in response to detecting movement of the receiving device, the receiving device may predict a swap command is being inputted and proceed to block 904.

In some instances, the receiving device and a nearby playback device may both contain movement sensors, and in response to determining movement of both devices within a recent time period (e.g., 15 seconds, 30 seconds) corresponding to a physical interaction between the receiving device and a nearby playback device (e.g., bumping or tapping the receiver playback device and a nearby playback device against each other), the receiving device may proceed directly to block 922d and identify the nearby playback device as the swap target. In some instances, the tapping of playback devices against each other may be detected acoustically using microphones on both the receiving device and the nearby playback device. For example, if there was a peak in noise detected at both devices within a recent time period, a tap may have occurred. In some instances, the receiving device may consider the physical interaction a predicted swap command and wait for a swap command before proceeding to block 922.

In some instances, the availability of the predicted swap command may depend on whether a network connection (e.g., Bluetooth, Wi-Fi, wired network, wireless network, local area network, wide area network) is available to communicate with swap-capable playback devices. For example, the receiving device may communicate with the swap-capable playback devices over Wi-Fi, and the predicted swap command feature may be enabled after or while the receiving device is connected to Wi-Fi.

As yet another example, upon connecting to a wireless network, the receiving device may determine that there are other playback devices on the same wireless network and enable the predicted swap command feature. The receiving device may determine that other playback devices are on the same wireless network based on state information of the media playback system received from another playback device or from a server. In another example, one or more conditions may be required before enabling the predicted swap command feature such as connection to the same wireless network as other playback devices and determination that at least one other playback device is a swap-capable playback device. The state information may identify swap-capable playback devices.

At block 904, the receiving device initiates presence detection of nearby playback devices, and at block 906, the receiving device selects one or more nearby playback device presence detection techniques to use. The presence detection techniques include using an audio signal, wireless signal pattern analysis, Bluetooth beacon (e.g., Bluetooth low energy), ultrawideband (UWB) localization or other proximity or presence detection techniques. An example of determining nearby playback devices using wireless signal pattern analysis is described in U.S. patent application Ser. No. 16/775,212, filed on Jan. 28, 2020 and titled "Systems and Methods for Playback Device Management," which is incorporated by reference herein.

The selection of the presence detection techniques can be based on which technique is supported by the most devices in the media playback system, which technique results in the fastest determination of a nearby playback device, and/or which technique is the most reliable or accurate. One or more techniques for nearby device detection may be used sequentially, simultaneously, or concurrently. For example, if a first technique fails to detect nearby playback devices or encounters an error condition, then a second technique may be used.

At block 906, the receiving device selects audio chirp for the nearby playback device presence detection technique. At block 908, the receiving device sends a command to begin the audio chirp device detection technique. The command may be a command(s) that is broadcasted, multicasted, or transmitted individually to all devices in media playback system, among other examples. The command to begin the audio chirp may include parameters such as an identifier of the player receiving the command, code to be used by the player for the audio chirp, and/or an audio chirp time duration (e.g., seconds, minutes, etc.).

In some examples, the code to be used by the player for the audio chirp may be predetermined or assigned based on a code book and/or based on the number of devices in the media playback system. The available codes to use can be based on the number of devices such that when there are less devices in the media playback system the codes may be spaced further apart in the frequency spectrum to reduce interference and/or potential for collisions of audio signals between multiple playback devices.

At block 908, the playback devices 110b, 110g, 110n may receive a command from the portable playback device 710a to begin transmitting reference audio signals containing their respective plurality of tones. The command may be received via a wired or wireless connection, server(s), local area network, and/or wide area network. At block 910, the receiving device (such as the portable playback device 710a or controller), may begin listening for audio signals. The receiving device may listen for reference audio signals for a predetermined listening period which may be a length of time sufficient to allow the plurality of reference audio signals to be transmitted more than once. For example, if the playback devices transmit a reference audio signal three times, the listening period may be set for three times the total duration of one reference audio signal with an added buffer time to allow for variances in initiation of the audio signal transmission.

At block 912, the receiving device determines whether it has listened for full duration of the listening period. Block 912 may be performed at intervals that are less than the full duration of the listening period. If the receiving device determines it has listened for the full duration of the listening period, then the receiving device may proceed to block 9014 and end detection for audio signals. The method may proceed to block 914 when no reference audio signals have been detected during the listening period. If the receiving device determines that it has not yet listened for the full duration of the listening period, then the receiving device may proceed to block 916 to determine whether any time-frequency representations or portions thereof have been decoded or detected.

In some instances, the method 900 may proceed to block 914 if a particular playback device encounters error(s) in the process of transmitting an audio chirp. If a particular playback device encounters error(s) in the process of transmitting an audio chirp, the method 900 may return to block 906 and select a different presence detection technique. The playback device encountering the error may send a message to the portable playback device indicating an error occurred. The error message may include the identifier of the particular playback device. In some instances, the method 900 may proceed to block 922 if the portable playback device has identified a target device for the swap and sends a command to one or more playback device(s) to end the nearby device presence detection process.

If at block 916 no reference audio signals have been decoded or detected, then the receiving device returns to block 912. If at block 916 the receiving device has detected one or more time-frequency representations, then the receiving device may proceed to block 918 and determine whether it has listened for the full duration of the listening period. If at block 918 the receiving device has not listened for the full duration of the listening period, then the receiving device returns to block 916 to determine whether any additional time-frequency representations have been decoded. If at block 918 the receiving device has listened for the listening period, then the receiving device may proceed to block 92.

At block 920, the receiving device may detect the signal strength of each detected reference audio signal and sort the detected playback devices according to signal strength. The order may be in descending order of signal strength or ascending order. Alternatively, the receiving device may determine in block 920 which playback device is associated with the "strongest" audio signal. At block 922, the receiving device may determine that the detection of nearby playback devices is complete and identify the playback device with the strongest signal strength (i.e. the nearest playback device) as the target for the playback session swap.

At block 924, the playback session is transitioned between the receiving device and the target playback device for the playback session swap.

VIII. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example 1: A portable playback device, comprising: one or more microphones; one or more batteries; one or more processors; a non-transitory, computer-readable medium storing instructions that, when executed by the one or more processors, cause the portable playback device to perform functions comprising: receiving an indication to perform presence detection of one or more playback devices; transmitting one or more messages instructing the one or more playback devices to transmit respective audio signals for presence detection; after transmitting the one or more messages, receiving, via a first microphone, a first audio signal; determining a time-frequency representation of the first audio signal; based on the time-frequency representation of the first audio signal and data indicating respective reference audio signals, determining that the audio signal comprises a superposition of a second audio signal transmitted by a first playback device and a third audio signal transmitted by a second playback device; based on the audio signal, determining a first magnitude associated with the second audio signal and a second magnitude associated with the third audio signal; based on determining that the first magnitude is greater than the second magnitude, determining that the first playback is arranged in closer proximity than the second playback device to the portable playback device; and transitioning a playback session between the portable playback device and the first playback device.

Example 2: The portable device of Example 1, wherein receiving an indication to perform presence detection of one or more playback devices comprises: receiving data representing a first playback session swap input; and wherein transmitting one or more messages instructing one or more playback devices to transmit respective audio signals for presence detection comprises: based on receiving the data representing the first playback session swap input, transmitting the one or more messages instructing the one or more playback devices to transmit the respective audio signals for presence detection.

Example 3: The portable device of Example 1, wherein receiving an indication to perform presence detection of one or more playback devices comprises: detecting a user interaction with the portable playback device; and based on the user interaction, determining a predicted swap command state, and wherein transmitting one or more messages instructing one or more playback devices to transmit respective audio signals for presence detection comprises: based on determining the predicted swap command state, transmitting the one or more messages instructing the one or more playback devices to transmit the respective audio signals for presence detection.

Example 4: The portable device of Example 3, wherein detecting a user interaction with the portable playback device comprises: determining that an interaction has occurred on a control interface of the portable playback device.

Example 5: The portable device of Example 1, wherein the functions further comprise: determining available presence detection techniques of the one or more playback devices; and based on the available presence detection techniques, selecting an audio chirp technique as a presence detection technique.

Example 6: The portable device of Example 1, wherein the functions further comprise: connecting to a network; after connecting to the network, receiving state information of the one or more playback devices connected to the network; and based on the state information, determining that the first playback device and the second playback device are swap-capable playback devices.

Example 7: The portable device of Example 1, wherein transmitting one or more messages instructing the one or more playback devices to transmit respective audio signals for presence detection comprises: transmitting a message to all of the one or more playback devices to transmit respective audio signals for presence detection.

Example 8: One or more non-transitory, computer-readable media storing instructions that, when executed by one or more processors, cause a portable playback device to perform functions comprising: receiving an indication to perform presence detection of one or more playback devices; transmitting one or more messages instructing the one or more playback devices to transmit respective audio signals for presence detection; after transmitting the one or more messages, receiving, via a first microphone, a first audio signal; determining a time-frequency representation of the first audio signal; based on the time-frequency representation of the first audio signal and data indicating respective reference audio signals, determining that the audio signal comprises a superposition of a second audio signal transmitted by a first playback device and a third audio signal transmitted by a second playback device; based on the audio signal, determining a first magnitude associated with the second audio signal and a second magnitude associated with the third audio signal; based on determining that the first magnitude is greater than the second magnitude, determining that the first playback is arranged in closer proximity than the second playback device to the portable playback device; and transitioning a playback session between the portable playback device and the first playback device.

Example 9: The computer-readable medium of Example 8, wherein receiving an indication to perform presence detection of one or more playback devices comprises: receiving data representing a first playback session swap input; and wherein transmitting one or more messages instructing one or more playback devices to transmit respective audio signals for presence detection comprises: based on receiving the data representing the first playback session swap input, transmitting the one or more messages instructing the one or more playback devices to transmit the respective audio signals for presence detection.

Example 10: The computer-readable medium of Example 8, wherein receiving an indication to perform presence detection of one or more playback devices comprises:

detecting a user interaction with the portable playback device; and based on the user interaction, determining a predicted swap command state, and wherein transmitting one or more messages instructing one or more playback devices to transmit respective audio signals for presence detection comprises: based on determining the predicted swap command state, transmitting the one or more messages instructing the one or more playback devices to transmit the respective audio signals for presence detection.

Example 11: The computer-readable medium of Example 10, wherein detecting a user interaction with the portable playback device comprises: determining that an interaction has occurred on a control interface of the portable playback device.

Example 12: The computer-readable medium of Example 8, wherein the functions further comprise: determining available presence detection techniques of the one or more playback devices; and based on the available presence detection techniques, selecting an audio chirp technique as a presence detection technique.

Example 13: The computer-readable medium of Example 8, wherein the functions further comprise: connecting to a network; after connecting to the network, receiving state information of the one or more playback devices connected to the network; and based on the state information, determining that the first playback device and the second playback device are swap-capable playback devices.

Example 14: The computer-readable medium of Example 8, wherein transmitting one or more messages instructing the one or more playback devices to transmit respective audio signals for presence detection comprises: transmitting a message to all of the one or more playback devices to transmit respective audio signals for presence detection.

Example 15: A media playback system, comprising: a portable playback device; a first playback device; a second playback device; one or more non-transitory, computer-readable media storing instructions that when executed by one or more processors cause the media playback system to perform functions comprising: receiving, via the portable playback device, an indication to perform presence detection of one or more playback devices; transmitting, via the portable playback device, one or more messages instructing the one or more playback devices to transmit respective audio signals for presence detection; transmitting, via the first playback device, a first audio signal; transmitting, via the second playback device, a second audio signal; after transmitting the one or more messages, receiving, via the portable playback device, a third audio signal comprising the first audio signal and the second audio signal; determining, via the portable playback device, a time-frequency representation of the third audio signal; based on the time-frequency representation of the third audio signal and data indicating respective reference audio signals, determining, via the portable playback device, that the audio signal comprises a superposition of a second audio signal transmitted by the first playback device and a third audio signal transmitted by the second playback device; based on the third audio signal, determining, via the portable playback device, a first magnitude associated with the second audio signal and a second magnitude associated with the third audio signal; based on determining that the first magnitude is greater than the second magnitude, determining, via the portable playback device, that the first playback is arranged in closer proximity than the second playback device to the portable playback device; and transitioning, via the portable playback device, a playback session between the portable playback device and the first playback device.

Example 16: The media playback system of Example 15, wherein receiving, via the portable playback device, an indication to perform presence detection of one or more playback devices comprises: receiving data representing a first playback session swap input; and wherein transmitting, via the portable playback device, one or more messages instructing one or more playback devices to transmit respective audio signals for presence detection comprises: based on receiving the data representing the first playback session swap input, transmitting the one or more messages instructing the one or more playback devices to transmit the respective audio signals for presence detection.

Example 17: The media playback system of Example 15, wherein receiving, via the portable playback device, an indication to perform presence detection of one or more playback devices comprises: detecting a user interaction with the portable playback device; and based on the user interaction, determining a predicted swap command state, and wherein transmitting, via the portable playback device, one or more messages instructing one or more playback devices to transmit respective audio signals for presence detection comprises: based on determining the predicted swap command state, transmitting the one or more messages instructing the one or more playback devices to transmit the respective audio signals for presence detection.

Example 18: The media playback system of Example 17, wherein detecting, via the portable playback device, a user interaction with the portable playback device comprises: determining that an interaction has occurred on a control interface of the portable playback device.

Example 19: The media playback system of Example 15, wherein the functions further comprise: determining, via the portable playback device, available presence detection techniques of the one or more playback devices; and based on the available presence detection techniques, selecting, via the portable playback device, an audio chirp technique as a presence detection technique.

Example 20: The media playback system of Example 15, wherein the first audio signal and the second audio signal are in a frequency range of 18-20 kHz.

Example 21: A method performing the functions of any of Examples 1-20.

We claim:
1. A receiving device comprising:
   a microphone configured to receive an audio signal comprising a superposition of a plurality of audio signals transmitted by a plurality of respective playback devices;
   one or more processors; and
   a non-transitory, computer-readable medium storing instructions that, when executed by the one or more processors, instruct the receiving device to:

determine a time-frequency representation of the audio signal received by the microphone;
obtain data associating playback devices with respective reference audio signals, each reference audio signal having a predefined time-frequency representation;
based on the time-frequency representation of the audio signal and the data, determine that the audio signal comprises a superposition of a first audio signal transmitted by a first playback device and a second audio signal transmitted by a second playback device;
based on the audio signal, determine a first magnitude associated with the first audio signal and a second magnitude associated with the second audio signal;
determine that the first magnitude is greater than the second magnitude;
determine that the first playback device is arranged in closer proximity than the second playback device to the receiving device; and
transition a playback session between the receiving device and the first playback device.

2. The receiving device of claim 1, wherein the first playback device is playing back audio content in the playback session, and wherein instructing the receiving device to transition the playback session between the receiving device and the first playback device comprises instructing the receiving device to:
transition the playback session from the first playback device to the receiving device, such that the receiving device plays back the audio content.

3. The receiving device of claim 1, wherein the receiving device is playing back audio content in the playback session, and wherein instructing the receiving device to transition the playback session between the receiving device and the first playback device comprises instructing the receiving device to:
transition the playback session from the receiving device to the first playback device, such that the first playback device plays back the audio content.

4. The receiving device of claim 1, wherein each reference audio signal comprises a plurality of tones, wherein each of the plurality of tones has a predefined frequency and initiation time.

5. The receiving device of claim 4, wherein at least some of the plurality of tones are spaced apart in time by an interval of time.

6. The receiving device of claim 4, wherein the predefined frequencies are selected from a predefined set of frequencies and wherein a frequency difference between each frequency within the predefined set of frequencies is greater than about 50 Hz.

7. The receiving device of claim 1, further comprising a network interface configured to transmit, to the plurality of playback devices, a command to cause the plurality of playback devices to output respective reference audio signals concurrently.

8. A method comprising:
detecting, during a time period by a receiving device, an audio signal comprising a superposition of a plurality of audio signals transmitted by a plurality of respective playback devices;
determining a time-frequency representation of the audio signal;
obtaining data associating playback devices with respective reference audio signals, each reference audio signal having a predefined time-frequency representation; and
based on the time-frequency representation of the audio signal and the data, determining that the audio signal comprises a superposition of a first audio signal transmitted by a first playback device and a second audio signal transmitted by a second playback device.

9. The method of claim 8, further comprising:
based on the audio signal, determining a first magnitude associated with the first audio signal and a second magnitude associated with the second audio signal;
determining that the first magnitude is greater than the second magnitude; and
determining that the first playback device is arranged closer than the second playback device to the receiving device.

10. The method of claim 9, wherein the first playback device is playing back audio content in a playback session, and the method further comprises transitioning the playback session from the first playback device to the receiving device, such that the receiving device plays back the audio content.

11. The method of claim 8, wherein determining the time-frequency representation of the audio signal comprises:
decomposing a first portion of the audio signal into constituent frequencies, wherein the first portion of the audio signal is received during a first portion of the time period; and
decomposing a second portion of the audio signal into constituent frequencies, wherein the second portion of the audio signal is received during a second portion of the time period.

12. The method of claim 8, wherein each reference audio signal comprises a plurality of tones, wherein each of the plurality of tones has a predefined frequency and initiation time.

13. The method of claim 12, wherein at least some of the plurality of tones are spaced apart in time by an interval of time.

14. The method of claim 13, wherein the interval of time is between about 10 ms and about 50 ms.

15. The method of claim 14, wherein a first interval of time within the reference audio signal differs to at least another interval of time within the reference audio signal.

16. The method of claim 12, wherein the predefined frequencies are selected from a predefined set of frequencies and wherein a frequency difference between each frequency within the predefined set of frequencies is greater than about 50 Hz.

17. The method of claim 12, wherein the predefined frequencies are selected from a predefined set of frequencies, and wherein each frequency within the predefined set of frequencies is greater than about 18 kHz.

18. The method of claim 12, wherein each of the plurality of tones has a duration of between about 10 ms and about 20 ms.

19. The method of claim 8, wherein each reference audio signal has a duration of between about 400 ms and about 800 ms.

20. The method of claim 8, further comprising causing the plurality of playback devices to output respective reference audio signals.

* * * * *

UNITED STATES PATENT AND TRADEMARK OFFICE
CERTIFICATE OF CORRECTION

PATENT NO. : 11,988,784 B2
APPLICATION NO. : 17/460708
DATED : May 21, 2024
INVENTOR(S) : Jones et al.

Page 1 of 1

It is certified that error appears in the above-identified patent and that said Letters Patent is hereby corrected as shown below:

On the Title Page

Item (54), in Column 1, in "Title", Lines 1-3, delete "DETECTING AN AUDIO SIGNAL WITH A MICROPHONE TO DETERMINE PRESENCE OF A PLAYBACK DEVICE" and insert
-- ULTRASONIC TRANSMISSION FOR PRESENCE DETECTION --, therefor.

In the Specification

In Column 1, Lines 1-3, delete "DETECTING AN AUDIO SIGNAL WITH A MICROPHONE TO DETERMINE PRESENCE OF A PLAYBACK DEVICE" and insert -- ULTRASONIC TRANSMISSION FOR PRESENCE DETECTION --, therefor.

Signed and Sealed this
Twenty-seventh Day of August, 2024

Katherine Kelly Vidal
*Director of the United States Patent and Trademark Office*